United States Patent
Kim et al.

(10) Patent No.: US 10,812,168 B2
(45) Date of Patent: Oct. 20, 2020

(54) APPARATUS AND METHOD FOR TRANSMITTING OR RECEIVING SIGNAL USING BEAMFORMING IN WIRELESS COMMUNICATION SYSTEM

(71) Applicant: SAMSUNG ELECTRONICS CO., LTD., Suwon-si (KR)

(72) Inventors: Yohan Kim, Suwon-si (KR); Chulhee Jang, Suwon-si (KR); Eunyong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/217,206

(22) Filed: Dec. 12, 2018

(65) Prior Publication Data

US 2019/0181941 A1   Jun. 13, 2019

(30) Foreign Application Priority Data

Dec. 12, 2017   (KR) .................. 10-2017-0170686

(51) Int. Cl.
   *H04B 7/06*   (2006.01)
   *H04W 72/04*   (2009.01)
   *H04B 7/08*   (2006.01)

(52) U.S. Cl.
   CPC ......... *H04B 7/0695* (2013.01); *H04B 7/0619* (2013.01); *H04B 7/088* (2013.01); *H04W 72/042* (2013.01); *H04W 72/046* (2013.01)

(58) Field of Classification Search
   CPC .... H04B 7/0695; H04B 7/088; H04B 7/0617; H04B 7/0408; H04B 7/0417; H04W 72/042; H04W 72/046
   (Continued)

(56) References Cited

U.S. PATENT DOCUMENTS 9,294,160 B2    3/2016  Hou et al.
2004/0014429 A1*  1/2004  Guo .................. H04B 7/0632
                                        455/73

(Continued)

FOREIGN PATENT DOCUMENTS

EP           3 280 068 A1     2/2019
KR    10-2012-0113279 A      10/2012

(Continued)

OTHER PUBLICATIONS

NTT Docomo, Inc. et al., "DL MIMO transmission schemes for beam management", 3GPP TSG RAN WG1 NR Ad-hoc, 5.1.2.1, R1-1700592, XP051208119, Spokane, Washington, US, Jan. 16, 2017, 4 pages, Retrieved from URL: <http://www.3gpp.org/ftp/Meetings_3GPP_SYNC/RAN1/Docs/>.

(Continued)

*Primary Examiner* — Emmanuel Bayard
(74) *Attorney, Agent, or Firm* — Sughrue Mion, PLLC

(57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). In a wireless communication system, a base station apparatus may include at least one transceiver, and at least one processor operatively coupled with the at least one transceiver. The at least one transceiver may transmit, to a terminal, configuration information associated with a primary beam and a secondary beam. The processor may determine the primary beam and the secondary beam based on feedback information regarding beams of the base station, received from the terminal. The at least one transceiver may be configured to transmit, to the terminal, indication information for identifying the primary beam and the secondary beam, perform communication with the terminal by using the primary beam, and perform communication with the terminal by (Continued)

using the primary beam and the secondary beam based on a determination of a change of a communication state for the primary beam.

20 Claims, 28 Drawing Sheets

(58) Field of Classification Search
USPC .............................. 375/267, 299, 347–349
See application file for complete search history.

(56) References Cited

U.S. PATENT DOCUMENTS

| | | | | |
|---|---|---|---|---|
| 2004/0204111 | A1* | 10/2004 | Ylitalo | H04W 16/28 455/562.1 |
| 2014/0086351 | A1* | 3/2014 | Nammi | H04L 25/03929 375/267 |
| 2014/0211731 | A1* | 7/2014 | Inoue | H04B 7/0456 370/329 |
| 2015/0063203 | A1* | 3/2015 | Kim | H04B 7/18513 370/326 |
| 2016/0366687 | A1* | 12/2016 | Guo | H04L 1/1812 |
| 2018/0042000 | A1* | 2/2018 | Zhang | H04B 7/04 |
| 2018/0049190 | A1* | 2/2018 | Abedini | H04W 56/001 |
| 2018/0331794 | A1* | 11/2018 | Nagaraja | H04B 7/0695 |
| 2019/0132828 | A1* | 5/2019 | Kundargi | H04B 7/088 |
| 2019/0320430 | A1* | 10/2019 | Kim | H04W 74/0833 |
| 2020/0028651 | A1* | 1/2020 | Xu | H04L 5/0023 |

FOREIGN PATENT DOCUMENTS

| | | |
|---|---|---|
| WO | 2016/165128 A1 | 10/2016 |
| WO | 2017/099831 A1 | 6/2017 |

OTHER PUBLICATIONS

Huawei et al., "Multi-beam transmission for robustness", 3GPP TSG RAN WG1 Meeting #89, 7.1.2.2.3, R1-1708136, XP051273332, Hangzhou, China, May 14, 2017, 5 pages, Retrieved from URL: <http://www.3gpp.org/ftp/Meetings_3GPP_SYNC/RAN1/Docs/>.
Communication dated Mar. 29, 2019, issued by the European Patent Office in counterpart European Application No. 18211920.6.
Communication dated Dec. 6, 2019, issued by the European Patent Office in counterpart European Application No. 18 211 920.6.
Communication dated Jul. 7, 2020, issued by the European Patent Office in counterpart European Application No. 18211920.6.

* cited by examiner

APPARATUS AND METHOD FOR TRANSMITTING OR RECEIVING SIGNAL USING BEAMFORMING IN WIRELESS COMMUNICATION SYSTEM

CROSS-REFERENCE TO RELATED APPLICATION(S)

This application is based on and claims priority under 35 U.S.C. § 119 to Korean Patent Application No. 10-2017-0170686, filed on Dec. 12, 2017, in the Korean Intellectual Property Office, the disclosure of which is incorporated by reference herein in its entirety.

BACKGROUND

Field

The disclosure relates to a wireless communication system, and in particular to an apparatus and method for transmitting or receiving a signal through beamforming in the wireless communication system.

Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid Frequency Shift Keying (FSK) and Quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G communication system operates to increase a signal gain by using a beamforming scheme in order to overcome a problem of a path loss caused by a characteristic of a millimeter wave band (e.g., mmWave). Meanwhile, in case of a link established through beamforming, a channel environment may change rapidly according to a directivity characteristic, and it may be difficult to ensure a wireless environment suitable for communication.

SUMMARY

The disclosure provides an apparatus and method for operating a secondary beam to compensate for a communication disabled state of a primary beam in a wireless communication system.

In addition, the disclosure provides an apparatus and method for identifying a primary beam and a secondary beam in a wireless communication system.

According to an aspect, there is provided a method of establishing a communication by a base station in a wireless communication system, the method comprising: transmitting, to a terminal, configuration information for determining a primary beam and a secondary beam of the base station; determining the primary beam and the secondary beam based on feedback information received from the terminal; transmitting, to the terminal, indication information for identifying the primary beam and the secondary beam; performing communication with the terminal by using the primary beam; and performing communication with the terminal by using the primary beam and the secondary beam based on a determination of a change in a communication state for the primary beam.

The configuration information may comprise duration information indicating a time period in which a first signal is transmitted using the primary beam and a second signal is transmitted using the secondary beam.

The duration information may comprise mode information indicating one of a first mode configured to instruct the terminal to always attempt to receive the first signal and the second signal, a second mode configured to instruct the terminal to periodically attempt to receive the first signal and the second signal, or a third mode configured to instruct the terminal to attempt to receive the first signal and the second signal in a specific time period.

The performing of the communication with the terminal using the primary beam and the secondary beam may comprise: transmitting a first control signal using the primary beam through a first resource region allocated for the primary beam; and transmitting a second control signal using the secondary beam through a second resource region allocated for the secondary beam, wherein the configuration information comprises resource information indicating the first resource region and the second resource region.

The performing of the communication using the primary beam and the secondary beam comprises: transmitting a first data signal to the terminal using the primary beam; and transmitting a second data signal to the terminal using the secondary beam, wherein the first data signal and the second data signal include the same data and are transmitted in the same time-frequency resource, and wherein the first data signal or the second data signal is received by the terminal using a respective beam of the terminal corresponding to one of the primary beam and the secondary beam.

The performing of the communication using the primary beam and the secondary beam may comprise: receiving an uplink signal from the terminal using the primary beam and the secondary beam in the same time-frequency resource, wherein the uplink signal is transmitted using a beam of the terminal corresponding to one of the primary beam and the secondary beam.

The performing of the communication using the primary beam may comprise: transmitting downlink signals using the primary beam; and detecting the change in the communication state for the primary beam based on a determination that a value corresponding to acknowledgement information for each of the downlink signals is equal to or greater than a threshold value, wherein the acknowledgement information is based on whether an acknowledgement is received for each of the downlink signals.

The performing of communication using the primary beam may comprise: transmitting downlink signals using the primary beam; and detecting the change in the communication state for the primary beam based on request information received from the terminal, wherein the request information is based on a determination that a channel quality of each of the downlink signals transmitted using the primary beam is less than or equal to a threshold.

The method may further comprise receiving, from the terminal, capability information comprising information indicating that the terminal is capable of supporting beamforming using the primary beam and the secondary beam, wherein the configuration information is transmitted in response to reception of the capability information.

The determining of the primary beam and the secondary beam may comprise: identifying a first beam with a highest channel quality, among a plurality of beams of the base station, based on the feedback information; identifying a second beam satisfying a path independency with respect to the first beam, among the plurality of beams of the base station excluding the first beam, based on the feedback information; and determining the first beam as the primary beam, and the second beam as the secondary beam, wherein whether the path independency is satisfied is determined based on a physical property of a path established by each of the first beam and the second beam or a statistical property of a channel for each of the first beam and the second beam.

The first beam maybe associated with a first Transmission and Reception Point (TRP) and wherein the second beam is a beam with a highest channel quality among a plurality of beams of a second TRP different from the first TRP associated with the first beam.

The determining of the primary beam and the secondary beam may comprise: identifying a first beam with a highest channel quality and a second beam with a second highest channel quality among beams of the base station based on the feedback information; and determining the first beam as the primary beam, and the second beam as the secondary beam based on a determination that a first TRP associated with the first beam is different from a second TRP associated with the second beam.

According to another aspect, there is provided a method for establishing a communication by a terminal in a wireless communication system, the method comprising: receiving, from a base station, configuration information from determining a primary beam and secondary beam of the base station; transmitting, to the base station, feedback information corresponding to the configuration information; receiving, from the base station, indication information identifying the primary beam and secondary beam of the base station, the primary beam and the secondary beam being determined based on the feedback information; receiving a first signal corresponding to the primary beam and a second signal corresponding to the secondary beam; and performing communication with the base station using a beam of the terminal corresponding to the primary beam or secondary beam determined based on the first signal or the second signal.

The configuration information may comprise duration information indicating a time period in which the terminal attempts to receive the first signal transmitted using the primary beam and the second signal transmitted using the secondary beam.

The duration information may comprise mode information indicating one of a first mode configured to instruct the terminal to always attempt to receive the first signal and the second signal, a second mode configured to instruct the terminal to periodically attempt to receive the first signal and the second signal, or a third mode configured to instruct the terminal to receive the first signal and the second signal in a specific time period.

The receiving of the first signal and the second signal may comprise: receiving the first signal through a first resource region allocated for the primary beam; and receiving the second signal through a second resource region allocated for the secondary beam, wherein the configuration information comprises resource information indicating the first resource region and the second resource region, wherein the first signal is a first control signal including control information, and wherein the second signal is a second control signal including the control information.

The performing of the communication may comprise: identifying a beam of the terminal between a first beam of the terminal corresponding to the primary beam and a second beam of the terminal corresponding to the secondary beam based on a first channel quality of the first control signal received through the first beam of the terminal and a second channel quality of the second control signal received through the second beam of the terminal; and transmitting an uplink signal to the base station or receiving a downlink signal from the base station by using the identified beam.

The method may further comprise: transmitting request information to the base station based on a determination that a channel quality of each of downlink signals transmitted from the base station using the primary beam is less than or equal to a threshold, wherein the request information instructs the base station to transmit a downlink signal to the terminal or receive an uplink signal by using the secondary beam upon reception of the request information.

The method may further comprise: transmitting capability information to the base station, the capability information comprising information indicating that the terminal is capable of supporting beamforming using the primary beam and the secondary beam, wherein the configuration information is received from the base station based on the capability information.

According to another aspect, there is provided a base station apparatus in a wireless communication system, the apparatus comprising: at least one transceiver; and at least one processor operatively coupled with the at least one transceiver, wherein the at least one transceiver transmits, to a terminal, configuration information for determining a primary beam and a secondary beam of the base station, wherein the processor determines the primary beam and the secondary beam based on feedback information received from the terminal, the feedback information corresponding to the configuration information, and wherein the at least one transceiver is configured to: transmit, to the terminal, indication information for identifying the primary beam and the secondary beam; perform communication with the terminal by using the primary beam; and perform communication with the terminal by using the primary beam and the secondary beam based on a determination of a change in a communication state for the primary beam.

The configuration information may comprise duration information indicating a time period in which a first signal is transmitted using the primary beam and a second signal is transmitted using the secondary beam.

The duration information may comprise mode information indicating one of a first mode configured to instruct the terminal to always attempt to receive the first signal and the second signal, a second mode configured to instruct the terminal to periodically attempt to receive the first signal and the second signal, or a third mode configured to instruct the terminal to attempt to receive the first signal and the second signal in a specific time period.

The at least one transceiver maybe configured to: transmit a first control signal using the primary beam through a first resource region allocated for the primary beam; and transmit a second control signal using the secondary beam through a second resource region allocated for the secondary beam, wherein the configuration information comprises resource information indicating the first resource region and the second resource region.

The at least one transceiver maybe configured to: transmit a first data signal to the terminal using the primary beam; and transmit a second data signal to the terminal using the secondary beam, wherein the first data signal and the second data signal include the same data and are transmitted in the same time-frequency resource, and wherein the first data signal or the second data signal is received by the terminal using a respective beam of the terminal corresponding to one of the primary beam and the secondary beam.

The at least one transceiver maybe configured to: receive an uplink signal from the terminal using the primary beam and the secondary beam in the same time-frequency resource, wherein the uplink signal is transmitted using a beam of the terminal corresponding to one of the primary beam and the secondary beam.

The at least one transceiver maybe further configured to transmit downlink signals using the primary beam, and wherein the at least one processor is further configured to detect the changed in the communication state for the primary beam based on a determination that a value corresponding to acknowledgement information for each of the downlink signals is equal to or greater than a threshold value, wherein the acknowledgement information is based on whether an acknowledgement is received for each of the downlink signals.

The at least one transceiver maybe further configured to transmit downlink signals using the primary beam, and wherein the at least one processor is further configured to detect that the change in the communication state for the primary beam based on request information received from the terminal, wherein the request information is based on a determination that a channel quality of each of the downlink signals transmitted by using the primary beam is less than or equal to a threshold.

The at least one transceiver maybe further configured to receive, from the terminal, capability information compressing information indicating that the terminal is capable of supporting beamforming using the primary beam and the secondary beam, and wherein the configuration information is transmitted in response to reception of the capability information.

The at least one processor maybe configured to: identify a first beam with a highest channel quality, among a plurality of beams of the base station, based on the feedback information; identify a second beam satisfying a path independency with respect to the first beam, among the plurality of beams of the base station excluding the first beam, based on the feedback information; and determine the first beam as the primary beam, and the second beam as the secondary beam, wherein whether the path independency is satisfied is determined based on a physical property of a path established by each of the first beam and the second beam or a statistical property of a channel for each of the first beam and the second beam.

The first beam maybe associated with a first Transmission and Reception Point (TRP) and the second beam maybe a beam with a highest channel quality among a plurality of beams of a second TRP different from the first TRP associated with the first beam.

In order to determine the primary beam and the secondary beam, the at least one processor maybe further configured to: identify a first beam with a highest channel quality and a second beam with a second highest channel quality among beams of the base station based on the feedback information; and determine the first beam as the primary beam, and the second beam as the secondary beam based on a determination that a first TRP associated with the first beam is different from a second TRP associated with the second beam.

According to an aspect there is provided, a terminal apparatus in a wireless communication system, the apparatus comprising: at least one transceiver; and at least one processor operatively coupled with the at least one transceiver, wherein the at least one transceiver is configured to: receive, from a base station, configuration information from determining a primary beam and secondary beam of the base station; transmit, to the base station, feedback information corresponding to the configuration information; receive, from the base station, indication information identifying the primary beam and secondary beam of the base station, the primary beam and the secondary beam being determined based on the feedback information; receive a first signal corresponding to the primary beam and a second signal corresponding to the secondary beam; and perform communication with the base station using a beam of the terminal corresponding to the primary beam or secondary beam determined based on the first signal or the second signal.

The configuration information may comprise duration information indicating a time period in which the terminal attempts to receive the first signal transmitted using the primary beam and the second signal transmitted using the secondary beam.

The duration information may comprise mode information indicating one of a first mode configured to instruct the terminal to always attempt to receive the first signal and the second signal, a second mode configured to instruct the terminal to periodically attempt to receive the first signal and the second signal, or a third mode configured to instruct the terminal to receive the first signal and the second signal in a specific time period.

In order to receive the first signal and the second signal, the at least one transceiver maybe configured to: receive the first signal through a first resource region allocated for the primary beam; and receive the second signal through a second resource region allocated for the secondary beam, wherein the configuration information comprises resource information indicating the first resource region and the second resource region, wherein the first signal is a first control signal including control information, and wherein the second signal is a second control signal including the control information.

In order to perform the communication, the at least one processor maybe configured to identify a beam of the terminal between a first beam of the terminal corresponding to the primary beam and a second beam of the terminal corresponding to the secondary beam based on a first channel quality of the first control signal received through the first beam of the terminal and a second channel quality of the second control signal received through the second beam of the terminal; wherein the at least one transceiver is further configured to transmit an uplink signal to the base station or receiving a downlink signal from the base station by using the identified beam.

The at least one transceiver maybe further configured to transmit request information to the base station based on a determination that a channel quality of each of downlink signals transmitted from the base station using the primary beam is less than or equal to a threshold, and wherein the request information instructs the base station to transmit a downlink signal to the terminal or receive an uplink signal by using the secondary beam upon reception of the request information.

The at least one transceiver maybe further configured to transmit capability information to the base station, the capability information comprising information indicating that the terminal is capable of supporting beamforming using the primary beam and the secondary beam, wherein the configuration information is received from the base station based on the transmission of the capability information.

According to another aspect, there is provided a base station comprising: at least one processor configured to: receive characteristic information about a plurality of beams of the base station, the characteristic information corresponding to a terminal to be connected with the base station; determine a first beam and a second beam, among the plurality of beams of the base station, based on the characteristic information; control a communicator of the base station to transmit an identification information identifying the first beam and the second beam to the terminal; transmit data to the terminal using the first beam; and transmit the data to the terminal using one of the second beam or both the first beam and the second beam, based on a determination of a change in a communication state of the transmission of the data using the first beam, wherein both the first beam and the second beam are determined prior to the transmission of data using the first beam.

The at least one processor maybe configured to determine the change in the communication state in the transmission of the data using the first beam based on a determination that a value corresponding to acknowledgement information for each of a plurality of downlink signals using the first beam is equal to or greater than a threshold value, wherein the acknowledgement information is based on whether an acknowledgement is received for each of the downlink signals.

The at least one processor maybe configured to determine the change in the communication state in the transmission of the data using the first beam based on a determination that a channel quality of the data transmitted using the first beam is less than or equal to a threshold.

According to an aspect, there is provided a method of establishing a connection between the base station and the terminal comprising: receiving, by the base station, characteristic information about a plurality of beams of the base station, the characteristic information corresponding to a terminal to be connected with the base station; determining, by the base station, first beam and a second beam, among the plurality of beams of the base station, based on the characteristic information; controlling, by the base station, a communicator of the base station to transmit an identification information identifying the first beam and the second beam to the terminal; transmitting, by the base station, data to the terminal using the first beam; and transmitting, by the base station, the data to the terminal using one of the second beam or both the first beam and the second beam, based on a determination of a change in a communication state of the transmission of the data using the first beam, wherein both the first beam and the second beam are determined prior to the transmission of data using the first beam.

The method may further comprising: determining, by the base station, the change in the communication state in the transmission of the data using the first beam based on a determination that a value corresponding to acknowledgement information for each of a plurality of downlink signals using the first beam is equal to or greater than a threshold value, wherein the acknowledgement information is based on whether an acknowledgement is received for each of the downlink signals.

The method may further comprise: determining, by the base station, the change in the communication state in the transmission of the data using the first beam based on a determination that a channel quality of the data transmitted using the first beam is less than or equal to a threshold.

An apparatus and method according to various embodiments of the present disclosure can perform communication robust to a rapid channel change by operating a secondary beam to compensate for a primary beam.

Advantages acquired in the present disclosure are not limited to the aforementioned advantages. Other advantages not mentioned herein can be clearly understood by those skilled in the art to which the present disclosure pertains from the following descriptions.

DETAILED DESCRIPTION OF EMBODIMENTS

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art corresponding to the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in an embodiment of the disclosure described hereinafter. However, since one or more embodiments of the disclosure include a technique in which hardware and software are both used, a software-based approach is not excluded in the embodiments of the disclosure.

Hereinafter, one or more embodiments of the disclosure relate to an apparatus or method for operating a primary beam and a secondary beam, and compensating for the primary beam by considering a channel change in a wireless communication system. Specifically, one or more embodiments of the disclosure may describe a technique for operating the primary beam and the secondary beam, such as a configuration associated with the primary beam and the secondary beam, a technique for signaling between a base station and a terminal for indicating the primary beam and the secondary beam, a condition for using the secondary beam, or the like in the wireless communication system.

Terms used hereinafter to refer to signal-related variables (e.g., signals, information, and messages), network entities (e.g., a Transmission Point (TP), a Reception Point (RP), a Transmission and Reception Point (TRP), a base station), components (e.g., an allocation unit and a generation unit) of a device, or the like are exemplified for convenience of explanation. Therefore, the disclosure is not limited to the terms described below, and thus other terms have the same technical meaning may also be used.

In addition, although the disclosure also describes an embodiment by using terms used in some communication standards (e.g., $3^{rd}$ Generation Partnership Project (3GPP)), this is for exemplary purposes only. An embodiment of the disclosure may be easily modified, and thus may also be applied to other communication systems.

Figure 1:
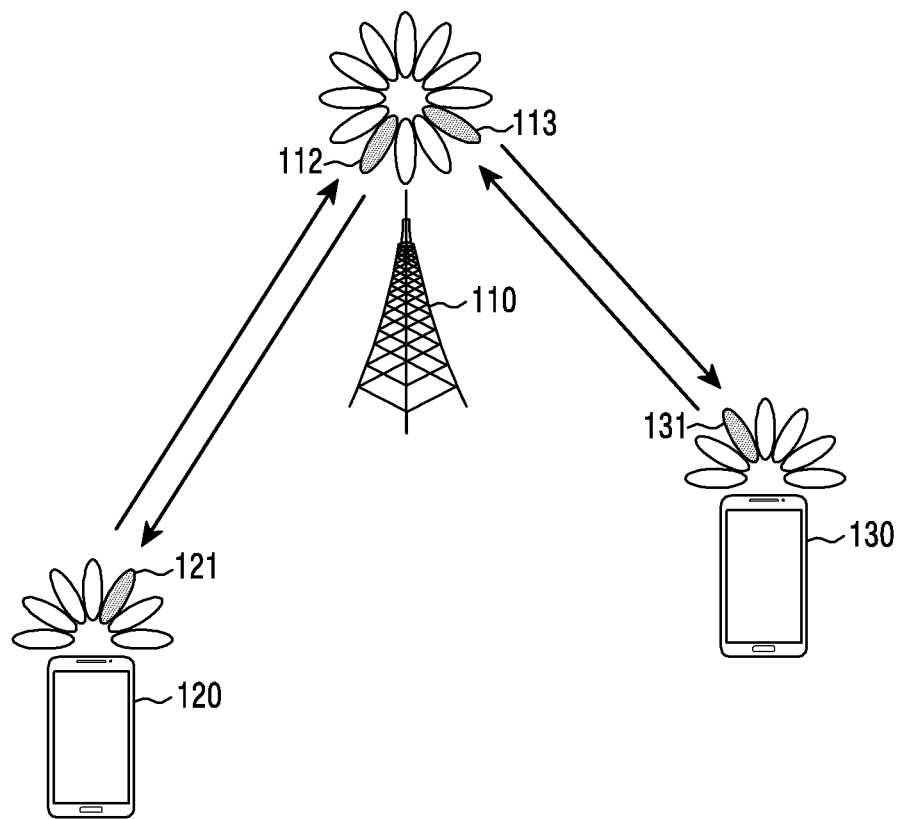
FIG. 1 illustrates a wireless communication system according to an embodiment of the disclosure.

FIG. 1 illustrates a wireless communication system according to an embodiment of the disclosure. The wireless communication system includes, as part of nodes which use a wireless channel in a wireless communication system, a base station 110, a terminal 120, and a terminal 130 as illustrated in FIG. 1.

The base station 110 is a network infrastructure which provides a radio access to the terminals 120 and 130. The base station 110 has a coverage defined as a specific geographic region on the basis of a distance in which a signal can be transmitted. In addition to the term 'base station', the base station 110 may be referred to as an 'Access Point (AP)', an 'eNodeB (eNB)', a '$5^{th}$ Generation (5G) node', a 'wireless point', or other terms having equivalent technical meanings. According to an embodiment, the base station 110 may be coupled with one or more Transmission/Reception Points (TRPs). The base station 110 may transmit a downlink signal to the terminal 120 or the terminal 130 through the one or more TRPs, or may receive an uplink signal.

According to an embodiment, each of the terminals 120 and 130 may be a device used by a user to communicate with the base station 110 through the wireless channel. Optionally, at least one of the terminals 120 and 130 may be operated without user involvement. That is, as a device for performing Machine Type Communication (MTC), at least one of the terminals 120 and 130 may not be carried by the user. In addition to the term 'terminal', each of the terminals 120 and 130 may be referred to as a 'User Equipment (UE)', a 'mobile station', a 'subscriber station', a Customer Premises Equipment (CPE), a 'remote terminal', a 'wireless terminal', an electronic device, a 'user device', or other terms having equivalent technical meanings.

The base station 110, the terminal 120, and the terminal 130 may transmit and receive a radio signal at a millimeter Wave (mmWave) band (e.g., 28 GHz, 30 GHz, 38 GHz, 60 GHz). In this case, to improve a channel gain, the base station 110, the terminal 120, and the terminal 130 may perform beamforming. Herein, the beamforming may include transmission beamforming and reception beamforming. That is, the base station 110, the terminal 120, and the terminal 130 may assign a directivity to a transmission signal and or a reception signal. For this, the base station 110 and the terminals 120 and 130 may select serving beams 112, 113, 121, and 131 through a beam search or beam management procedure. After the serving beams 112, 113, 121, and 131 are selected, subsequent communication may be performed through a resource having a Quasi Co-Located (QCL) relation with a resource used to transmit the serving beams 112, 113, 121, and 131.

Figure 2A:
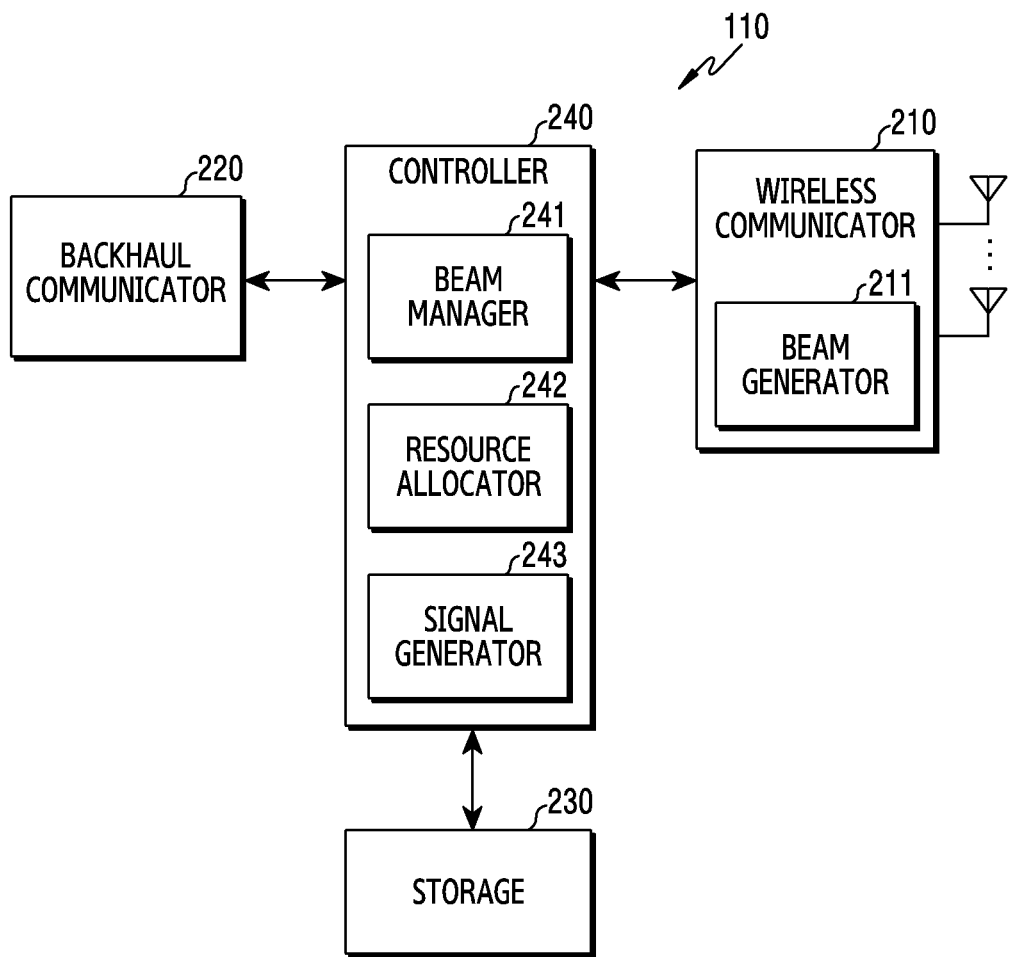
FIG. 2A illustrates a structure of a base station in a wireless communication system according to an embodiment of the disclosure.

FIG. 2A illustrates a structure of a base station in a wireless communication system according to an embodiment of the disclosure. The exemplary structure of FIG. 2A may be understood as a structure of the base station 110.

Referring to FIG. 2A, the base station 110 includes a wireless communicator 210, a backhaul communicator 220, a storage 230, and a controller 240. One or more components of the base station 110 may be implemented in hardware or software or in combination of the hardware and the software. According to an embodiment, one or more components of the base station 110 may be implemented as a "unit". Hereinafter, the term "unit" may describe a unit of processing at least one function or operation, and may be implemented in hardware or software or in combination of the hardware and the software.

The wireless communicator 210 performs functions for transmitting and receiving a signal through a wireless channel. For example, the wireless communicator 210 performs a function of conversion between a baseband signal and a bit-stream according to a physical layer standard of a system. For example, in data transmission, the wireless communicator 210 generates complex symbols by coding and modulating a transmission bit-stream. In addition, in data reception, the wireless communicator 210 restores a reception bit-stream by demodulating and decoding a baseband signal. In addition, the wireless communicator 210 up-converts a baseband signal into a Radio Frequency (RF) signal and thereafter transmits it through an antenna, and down-converts an RF signal received through the antenna into a baseband signal.

For this, the wireless communicator 210 may include a transmission filter, a reception filter, an amplifier, a mixer, an oscillator, a Digital to Analog Converter (DAC), an Analog to Digital Converter (ADC), or the like. In addition, the wireless communicator 210 may include a plurality of transmission/reception paths. Further, the wireless communicator 210 may include at least one antenna array constructed of a plurality of antenna elements. According to an embodiment, the wireless communicator 210 may be constructed of a digital unit and an analog unit, and the analog unit may be constructed of a plurality of sub-units according to operating power, operation frequency, or the like. The wireless communicator 210 may include a beam generator 211 for performing beamforming. In order to assign a directivity based on the configuration of the controller 240 to a signal to be transmitted/received, the beam generator 211 may apply a beamforming weight to the signal.

The wireless communicator 210 transmits and receives a signal as described above. Accordingly, the wireless communicator 210 may be referred to as a transmitter, a receiver, or a transceiver. In addition, in the following description, transmission and reception performed through a wireless channel may imply that the aforementioned processing is performed by the wireless communicator 210.

The backhaul communicator 220 provides an interface for preforming communication with different nodes in a network. That is, the backhaul communicator 220 converts a bit-stream transmitted from the base station 110 to a different node, e.g., a different access node, a different base station, an upper node, a core network, or the like, into a physical signal, and converts a physical signal received from the different node into a bit-stream.

The storage 230 stores data such as a basic program, application program, configuration information, or the like for an operation of the base station 110. The storage 230 may be constructed of a volatile memory, a non-volatile memory, or a combination of the volatile memory and the non-volatile memory. In addition, the storage 230 provides the stored data according to a request of the controller 240. According to an embodiment, the base station 110 may include physical information and statistical information for each of beams of the base station 110. The physical information may include information on a direction of each beam, information on a TRP for providing each beam, and information on an association level between beams. The statistical information may include information on how frequently communication is disconnected per beam, a change pattern of per-beam signal strength, or the like.

The controller 240 controls overall operations of the base station 110. For example, the controller 240 may transmit and receive a signal via the wireless communicator 210 or the backhaul communicator 220. In addition, the controller 240 may write data to the storage 230, and read the data. Further, the controller 240 may perform functions of a protocol stack required in a communication standard. For this, the controller 240 may include at least one processor. According to an embodiment, the controller 240 may include a beam manager 241 for controlling a primary beam and a secondary beam, a resource allocator 242 for managing a resource region for each of beams to be used, and a signal generator 243 for generating a message and a signal for communication with the terminal. Herein, as an instruction set or code stored in the storage 230, the beam manager 241, the resource allocator 242, and the signal generator 243 may be a storage space in which the instruction/code is stored as an instruction/code temporarily resided in the controller 240, or may be part of a circuitry which constitutes the controller 240. According to an embodiment, the controller 240 may control the base station 110 to perform operations according to various embodiments described below.

Figure 2B:
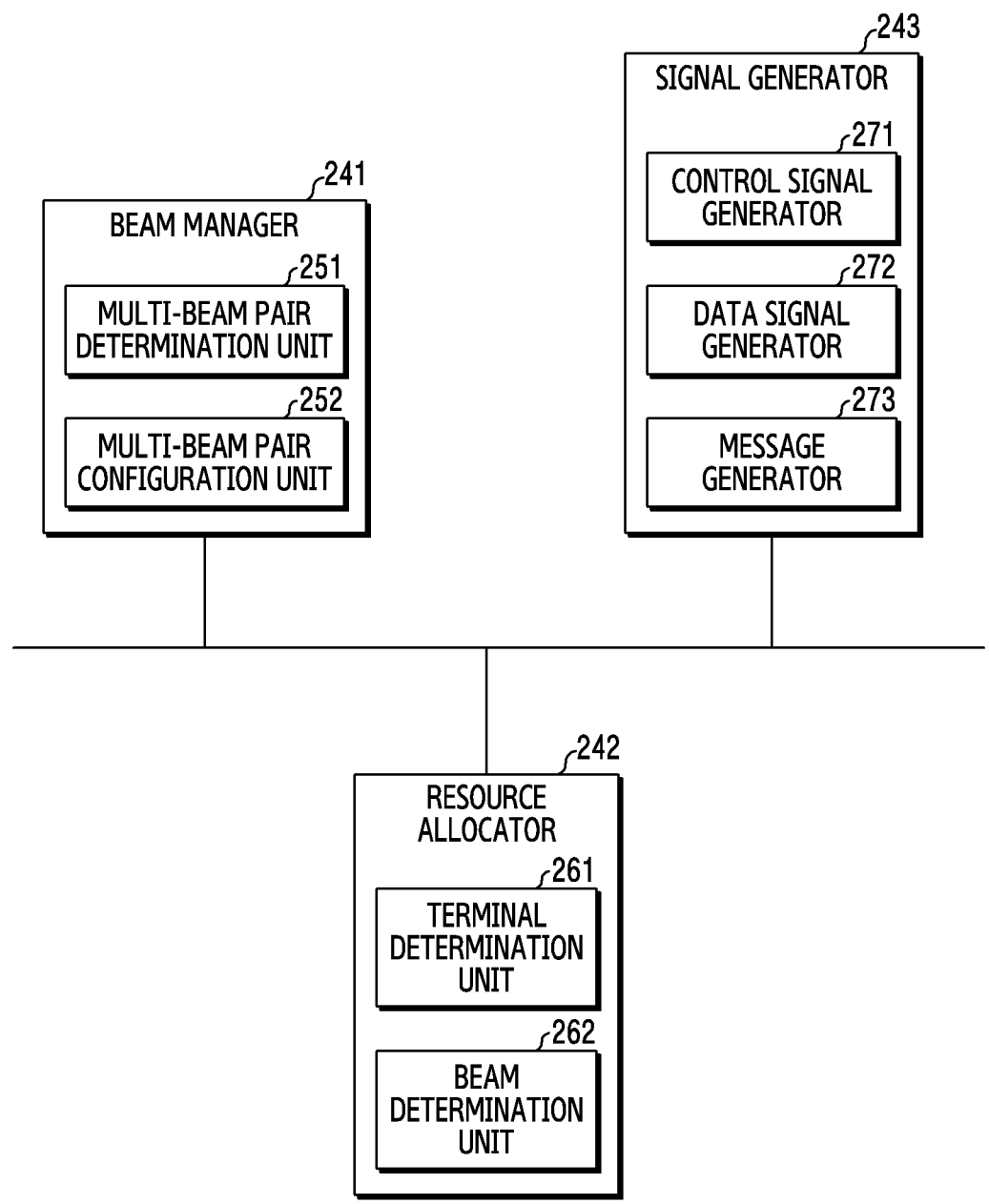
FIG. 2B illustrates an example of a functional structure of a control unit of a base station in a wireless communication system according to an embodiment of the disclosure.

FIG. 2B illustrates an example of a functional structure of a controller 240 of a base station 110 in a wireless communication system according to an embodiment of the disclosure. The exemplary structure of FIG. 2B may be understood as a structure of the controller 240.

Referring to FIG. 2B, the controller 240 may include the beam manger 241, the resource allocator 242, and the signal generator 243. The beam manager 241 may include a multi-beam pair determination unit 251 and a multi-beam pair configuration unit 252. The multi-beam pair determination unit 251 may determine a primary beam and a secondary beam among beams of the base station. The primary beam is a beam of the base station in a primary beam pair, and the secondary beam is a beam of the base station in a secondary beam pair.

In one or more embodiments, the base station may designate beams, of which TRPs are different from each other, as the primary beam and the secondary beam. The multi-beam pair configuration unit 252 may configure an operation type (e.g., always, periodic, dynamic) of the primary beam and the secondary beam, a resource region associated the primary beam and the secondary beam, or the like.

The resource allocator 242 may include a terminal determination unit 261 and a beam determination unit 262. The terminal determination unit 261 may determine a target (i.e., a terminal) to which a resource is to be allocated. Herein, the terminal may be a terminal which provides feedback information for a beam of the base station. The beam determination unit 262 may determine a beam to be applied to a signal transmitted through an allocated resource. The beam determination unit 262 may determine whether a resource is to be allocated to the primary beam or the secondary beam. In one or more embodiments, the base station may further include a scheduling device for transmitting a first signal of the primary beam and a second signal of the secondary beam in the respective TRPs by using a proper resource.

The signal generator 243 may include a control signal generator 271, a data signal generator 272, and a message generator 273. The control signal generator 271 may generate a control signal to be transmitted to the terminal. For example, the control signal generator 271 may generate control information (e.g., DCI) transmitted through a control channel (e.g., a Physical Downlink Control Channel (PDCCH), an NR-PDCCH). The data signal generator 272 may generate a data signal to be transmitted to the terminal. For example, the data signal generator 272 may transmit downlink data to be transmitted through a shared channel (e.g., a Physical Downlink Shared Channel (PDSCH)).

The message generator 273 may generate a message to be transmitted to the terminal. According to one or more embodiments, the message generator 273 may generate a message including configuration information associated with the primary and secondary beams for the terminal. The configuration information may include a resource region of a signal transmitted using the primary beam or the secondary beam, a configuration required to the terminal in order to operate the primary beam and the secondary beam. In addition, according to one or more embodiments, the message generator 273 may generate a message including indication information for indicating the primary and secondary beams for the terminal. The indication information may include an index indicating the primary beam and the secondary beam or resources (e.g., symbols, slots) in which the primary beam and the secondary beam are used.

Although not shown in FIG. 2B, in one or more embodiments, the base station may further include an additional device or interface to provide control for each TRP. The base station may further include a device for controlling a TRP which is physically identified. In addition, the base station may further include an interface through which an operation scheme of a multi-beam pair, resource allocation information of the multi-beam pair, and data to be actually transmitted/received are shared between the TRPs. In addition, the base station may further include a scheduling device for controlling an operation and resource allocation for each TP.

The structure of the controller 240 of FIG. 2B is only an example of the controller 240, and thus may be partially added, deleted, or changed according to one or more embodiments.

Figure 3A:
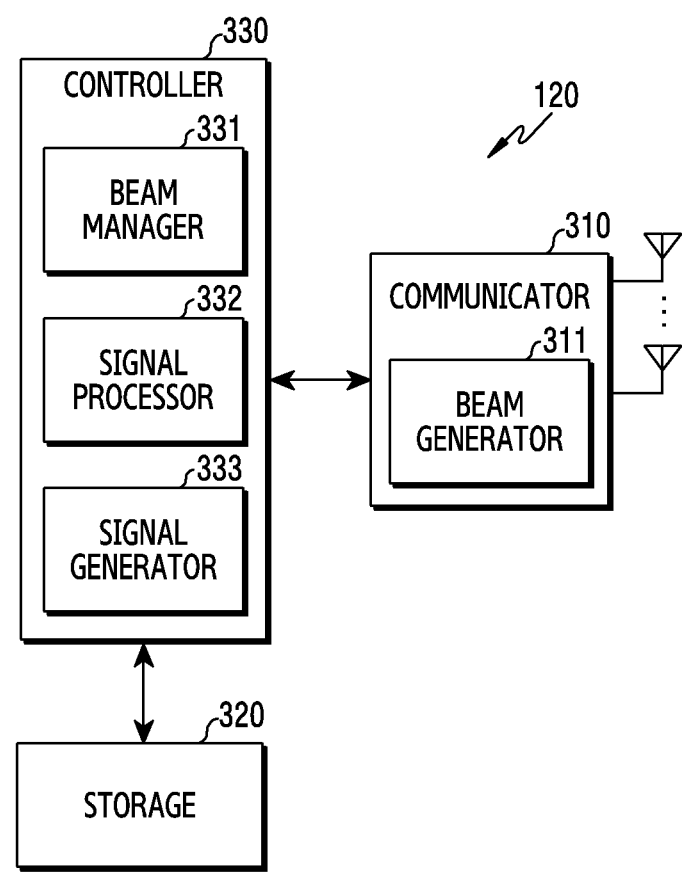
FIG. 3A illustrates a structure of a terminal in a wireless communication system according to an embodiment of the disclosure.

FIG. 3A illustrates an exemplary structure of a base station in a wireless communication system according to one or more embodiments of the disclosure. The exemplary structure of FIG. 3A may be understood as a structure of the terminal 120. Hereinafter, the term ' . . . unit', ' . . . device', or the like implies a unit of processing at least one function or operation, and may be implemented in hardware or software or in combination of the hardware and the software.

Referring to FIG. 3A, the terminal 120 includes a communicator 310, a storage 320, and a controller 330.

The communicator 310 performs functions for transmitting and receiving a signal through a wireless channel. For example, the communicator 310 performs a function of conversion between a baseband signal and a bit-stream according to a physical layer standard of a system. For example, in data transmission, the communicator 310 generates complex symbols by coding and modulating a transmission bit-stream. In addition, in data reception, the communicator 310 restores a reception bit-stream by demodulating and decoding a baseband signal. In addition, the communicator 310 up-converts a baseband signal into a Radio Frequency (RF) signal and thereafter transmits it through an antenna, and down-converts an RF signal received through the antenna into a baseband signal. For this, the communicator 310 may include a transmission filter, a reception filter, an amplifier, a mixer, an oscillator, a DAC, an ADC, or the like.

In addition, the communicator 310 may include a plurality of transmission/reception paths. Further, the communicator 310 may include at least one antenna array constructed of a plurality of antenna elements. From a hardware aspect, the communicator 310 may be constructed of a digital circuit and an analog circuit (e.g., a Radio Frequency Integrated Circuit (RFIC)). Herein, the digital and the analog circuit may be implemented as one package. In addition, the communicator 310 may include a plurality of RF chains. Further, the communicator 310 may include a beam generator 311 for performing beamforming. In order to assign a directivity based on the configuration of the controller 330 to a signal to be transmitted/received, the beam generator 311 may apply a beamforming weight to the signal.

In addition, the communicator 310 may include different communication modules to process signals of different frequency bands. Further, the communicator 310 may include a plurality of communication modules to support a plurality of different radio access technologies. For example, the different radio access technologies may include a Bluetooth Low Energy (BLE), Wireless Fidelity (Wi-Fi), WiFi Gigabyte (WiGig), a cellular network (e.g., Long Term Evolution (LTE), New Radio (NR)), or the like. In addition, the different frequency bands may include a Super High Frequency (SHF) (e.g., 2.5 GHz, 5 Ghz) band and a millimeter wave (mmWave) (e.g., 38 GHz, 60 GHz, etc.) band. According to various embodiments, the communication module may include at least one sensor. The sensor mounted on the communication module may provide measurement information (or sensor information) for directivity control to a processor (e.g., a Communication Processor (CP)) in the communication module.

The communicator 310 transmits and receives a signal as described above. Accordingly, the communicator 310 may be referred to as a transmitter, a receiver, or a transceiver. In addition, in the following description, transmission and reception performed through a wireless channel are used to imply that the aforementioned processing is performed by the communicator 310.

The storage 320 stores data such as a basic program, application program, configuration information, or the like for an operation of the terminal 120. The storage 320 may be constructed of a volatile memory, a non-volatile memory, or a combination of the volatile memory and the non-volatile memory. In addition, the storage 320 provides the stored data according to a request of the controller 330. According to various embodiments, the storage 320 may store indication information for indicating a primary beam or a secondary beam. For example, the storage 320 may store the indication information in a form of a resource index indicating the primary beam or the secondary beam. For another example, the storage 320 may store information regarding each of a first reception beam of the terminal 120 corresponding to the primary beam of the base station and a second reception beam of the terminal 120 corresponding to the secondary beam of the base station. According to various embodiments, the storage 320 may store information regarding a first resource region (e.g., a Physical Downlink Control Channel (PDCCH)) for attempting to receive (e.g., decode) a signal transmitted through the primary beam and a second resource region for attempting to receive (e.g., decode) a signal transmitted through the secondary beam.

The controller 330 controls overall operations of the terminal 120. For example, the controller 330 may transmit and receive a signal via the communicator 310. In addition, the controller 330 writes data to the storage 320, and reads the data. Further, the controller 330 may perform functions of a protocol stack required in a communication standard. For this, the controller 330 may include at least one processor or micro-processor, or may be part of the processor. In addition, part of the communicator 310 and the controller 330 may be referred to as a CP. The controller 330 may include various modules for performing communication.

According to various embodiments, the controller 330 may include a beam manager 331 for operating the primary beam and the secondary beam. In addition, the controller 330 may include a signal processor 332 for processing a message, control signal, or data signal received from the base station. In addition, the controller 330 may include a signal generator 333 for generating a signal or message for communication with the base station.

Herein, as an instruction set or code stored in the storage 320, the beam manager 331, the signal processor 332, and the signal generator 333 may be a storage space in which the instruction/code is stored as an instruction/code temporarily resided in the controller 330, or may be part of a circuitry which constitutes the controller 330 or a module for performing a function of the controller 330. According to various embodiments, the controller 330 may control the terminal to perform operations according to various embodiments described below.

Figure 3B:
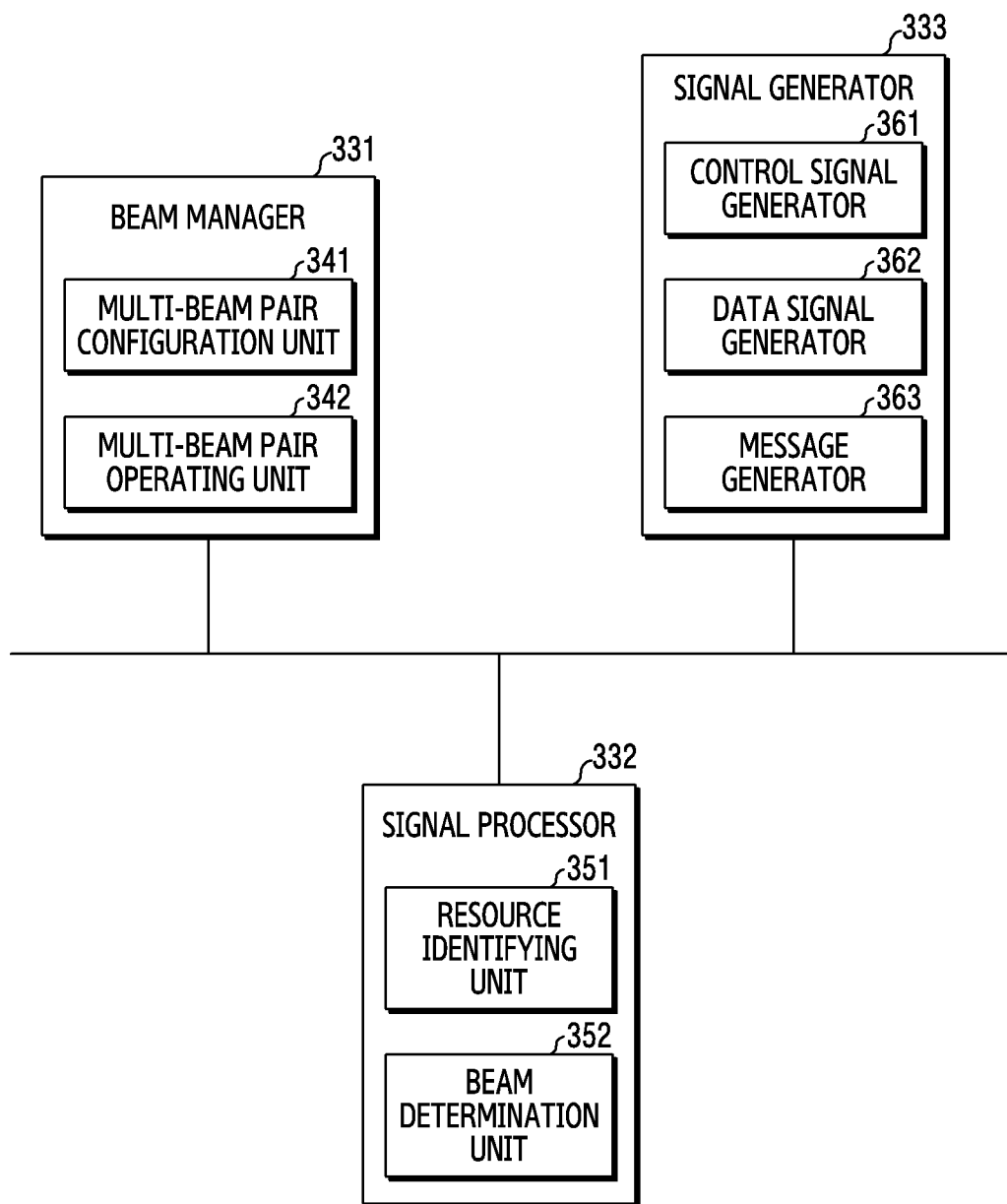
FIG. 3B illustrates an example of a functional structure of a control unit of a terminal in a wireless communication system according to an embodiment of the disclosure.

FIG. 3B illustrates an example of a functional structure of a control unit of a terminal in a wireless communication system according to various embodiments of the disclosure. The exemplary structure of FIG. 3B may be understood as a structure of the controller 330.

Referring to FIG. 3B, the controller 330 may include the beam manager 331, the signal processor 332, and the signal generator 333. The beam manager 331 may include a multi-beam pair configuration unit 341 and a multi-beam pair operating unit 342. The multi-beam pair configuration unit 341 may set values required for a multi-beam pair, according to various embodiments. The multi-beam pair may include a primary beam pair (PB) and a secondary beam pair (SB). For example, the multi-beam pair configuration unit 341 may configure a duration for attempting reception (or decoding) on signals transmitted using the primary beam and the secondary beam. A resource region (e.g., a band, a bandwidth, a symbol, a slot) for receiving the signals transmitted using the primary beam and the secondary beam may be pre-configured. The multi-beam pair operating unit 342 may control an operating scheme regarding whether to use the primary beam or the secondary beam or both of the primary and the secondary beam according to a signal type.

The signal processor 332 may include a resource identifying unit 351 and a beam determination unit 352. The resource identifying unit 351 may identify a resource of a signal to be transmitted from the base station or may identify a resource allocated to a signal to be transmitted to the base station. For example, the resource identifying unit 351 may identify a resource of a control signal to be transmitted using the primary beam or the secondary beam according to the configuration information. In addition, for example, the resource identifying unit 351 may identify a resource of an uplink signal to be transmitted to the base station. The beam determination unit 352 may determine a beam to be used in communication with the base station. For example, the beam determination unit 262 may determine a beam applied to a signal to be transmitted from the base station, or may determine a beam for transmitting a signal to the base station, or a beam for receiving a signal to be transmitted from the base station. The beam determination unit 352 may determine whether to use the primary beam or the secondary beam in a corresponding resource (e.g., symbol).

The signal generator 333 may include a control signal generator 361, a data signal generator 362, and a message generator 363. The control signal generator 361 may generate a control signal to be transmitted to the base station. For example, the control signal generator 361 may generate feedback information for a beam of the base station. The data signal generator 362 may generate a data signal to be transmitted to the base station. For example, the data signal generator 362 may generate uplink data to be transmitted through a shared channel (e.g., a Physical Uplink Shared Chanel (PUSCH)).

The message generator 363 may generate a message to be transmitted to the base station. According to various embodiments, the message generator 363 may transmit a message (e.g., UE capability information) including information indicating that an operation of a multi-beam pair is possible, to the base station through the primary beam and the secondary beam.

The structure of the controller unit 330 of FIG. 3B is only an example of the controller 330, and thus may be partially added, deleted, or change according to various embodiments.

Figure 4A:
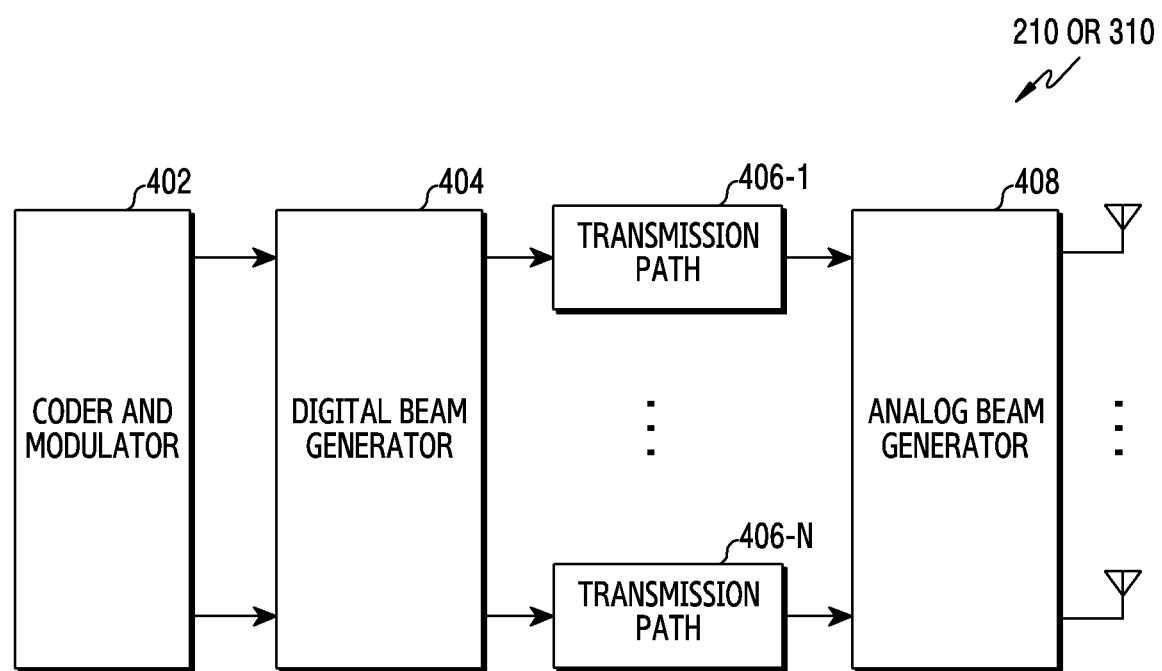
FIGS. 4A, 4B and 4C illustrate a structure of a communication unit in a wireless communication system according to an embodiment of the disclosure.
Figure 4B:
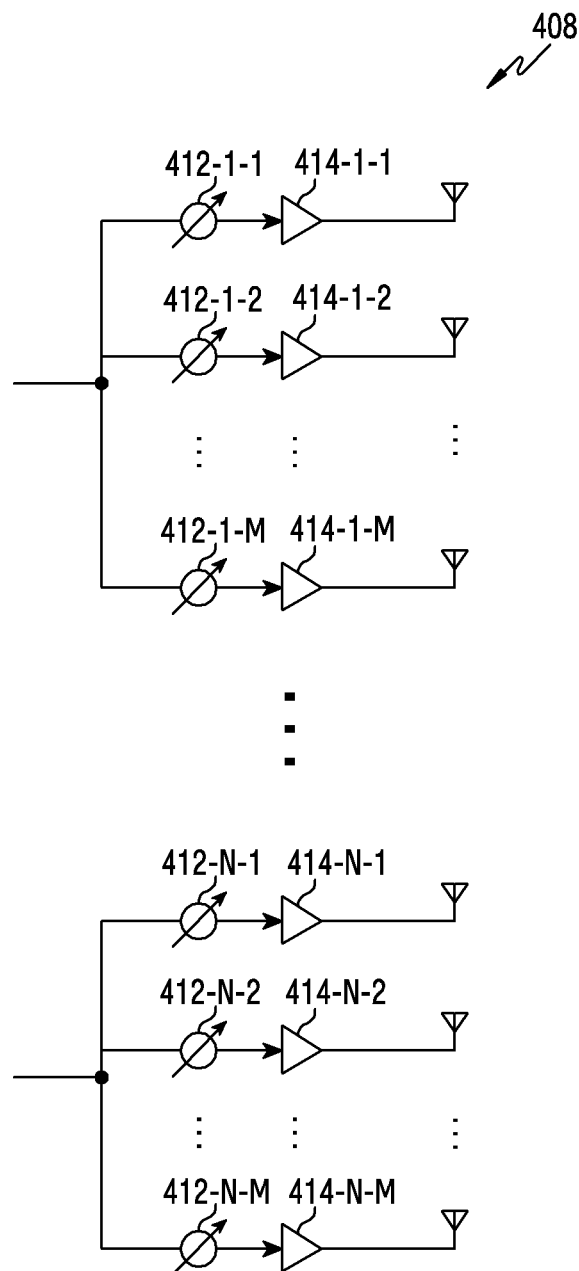
Figure 4C:
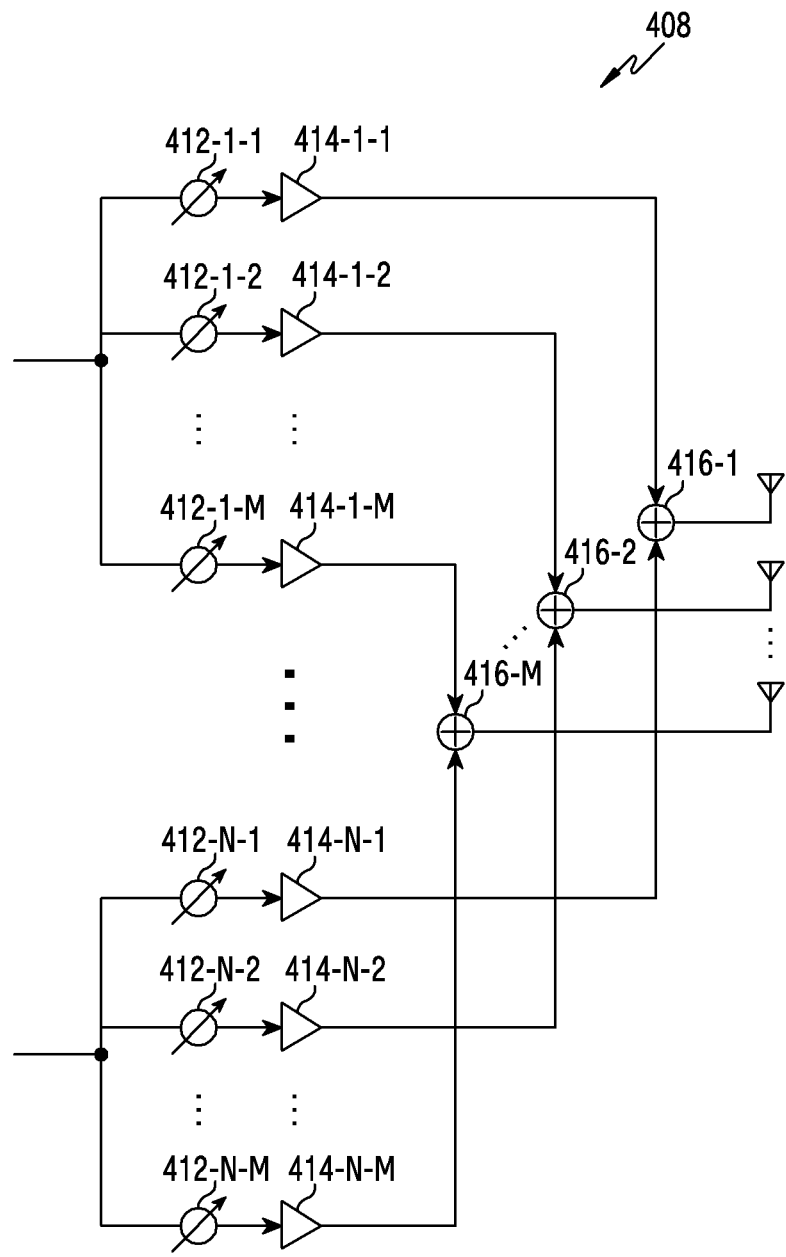

FIGS. 4A, 4B and 4C illustrate a structure of a communication unit in a wireless communication system according to various embodiments of the disclosure. An example for a detailed structure of the wireless communicator 210 of FIG. 2A or the communicator 310 of FIG. 3A is illustrated in FIGS. 4A, 4B and 4C. Specifically, components for performing beamforming are exemplified in FIGS. 4A, 4B and 4C, as part of the wireless communicator 210 of FIG. 2A or the communicator 310 of FIG. 3A.

Referring to FIG. 4A, the wireless communicator 210 or the communicator 310 includes a coder and modulator 402, a digital beam generator 404, a plurality of transmission paths 406-1 to 406-N, and an analog beam generator 408.

The coder and modulator 402 performs channel encoding. For the channel encoding, at least one of a Low Density Parity Check (LDPC) code, a convolution code, and a polar code may be used. The coder and modulator 402 generates modulation symbols by performing constellation mapping.

The digital beam generator 404 performs beamforming on a digital signal (e.g., modulation symbols). For this, the digital beam generator 404 multiplies the modulation symbols by beamforming weights. Herein, the beamforming weights are used to change a magnitude and phase of a signal, and may be referred to as a 'preceding matrix', a 'precoder', or the like. The digital beam generator 404 outputs modulation symbols subjected to digital beamforming to the plurality of transmission paths 406-1 to 406-N. In this case, according to a Multiple Input Multiple Output (MIMO) transmission scheme, the modulation symbols may be multiplexed, or the same modulation symbols may be provided to the plurality of transmission paths 406-1 to 406-N.

The plurality of transmission paths 406-1 to 406-N convert the digital signals subjected to digital beamforming into an analog signal. For this, each of the plurality of transmission paths 406-1 to 406-N may include an Inverse Fast Fourier Transform (IFFT) calculation unit, a Cyclic Prefix (CP) inserting unit, a DAC, an up-conversion unit. The CP inserting unit is for an Orthogonal Frequency Division Multiplexing (OFDM) scheme, and may be excluded when a different physical layer scheme (e.g., Filter Bank Multi-Carrier (FBMC)) is applied. That is, the plurality of transmission paths 406-1 to 406-N provide an independent signal processing process for a plurality of streams generated through digital beamforming. However, according to an implementation scheme, some of components of the plurality of transmission paths 406-1 to 406-N may be commonly used.

The analog beam generator 408 performs beamforming on an analog signal. For this, the digital beam generator 404 multiplies the analog signals by beamforming weights. Herein, the beamforming weights are used to change a magnitude and phase of a signal. Specifically, according to a connection structure between the plurality of transmission paths 406-1 to 406-N and antennas, the analog beam generator 408 may be configured as shown in FIG. 4B or FIG. 4C.

Referring to FIG. 4B, signals input to the analog beam generator 408 are subjected to operations of phase/magnitude modification and amplification, and then are transmitted via the antennas. In this case, signals of respective paths are transmitted through different antenna sets, that is, antenna arrays. Regarding processing of a signal input through a first path, the signal is converted into a signal stream having a different or identical phase/magnitude by phase/magnitude modification units 412-1-1 to 412-1-M, is amplified by amplifiers 414-1-1 to 414-1-M, and thereafter are transmitted via the antennas.

Referring to FIG. 4C, signals input to the analog beam generator 408 are subjected to operations of phase/magnitude modification and amplification, and then are transmitted via the antennas. In this case, signals of respective paths are transmitted through different antenna sets, that is, antenna arrays. Regarding processing of a signal input through a first path, the signal is converted into a signal stream having a different or identical phase/magnitude by the phase/magnitude modification units 412-1-1 to 412-1-M, and is amplified by the amplifiers 414-1-1 to 414-1-M. In addition, the amplified signals are added by adders 416-1-1 to 416-1-M with respect to an antenna element, and thereafter are transmitted via the antennas, so as to be transmitted via one antenna array.

An example in which an independent array is used for each transmission path is illustrated in FIG. 4B, and an example in which transmission paths share one antenna array is illustrated in FIG. 4C. However, according to another embodiment, some transmission paths may use an independent antenna array, and the remaining transmission paths may share one antenna array. Further, according to another embodiment, a structure which may change adaptively based on a situation may be used by applying a switchable structure between transmission paths and antenna arrays.

The base station may perform a beam search procedure to identify a beam suitable for performing communication with the terminal. After identifying the suitable beam, according to a channel change, a beam acquired through the beam search procedure may not be able to provide an optimal communication quality. Therefore, a method for increasing robustness in data transmission/reception by additionally operating another beam other than one beam is described in the disclosure.

Hereinafter, although one or more embodiments of a Downlink (DL) beam search procedure of the terminal and the base station is described in FIG. 5 to FIG. 24 for convenience of explanation, this disclosure is not limited thereto. A multi-beam pair operation according to an embodiment of the disclosure may be utilized in not only the DL beam search procedure but also an Uplink (UL) beam search procedure, a beam search procedure in communication between terminals (e.g., SideLink (SL)), and all procedures using extra beams. In addition, although a procedure of transmitting/receiving a signal through a plurality of beams for effective beamforming is referred to as beam search in the disclosure, beam management or beam training may also be used as the same or similar meaning.

Figure 5:
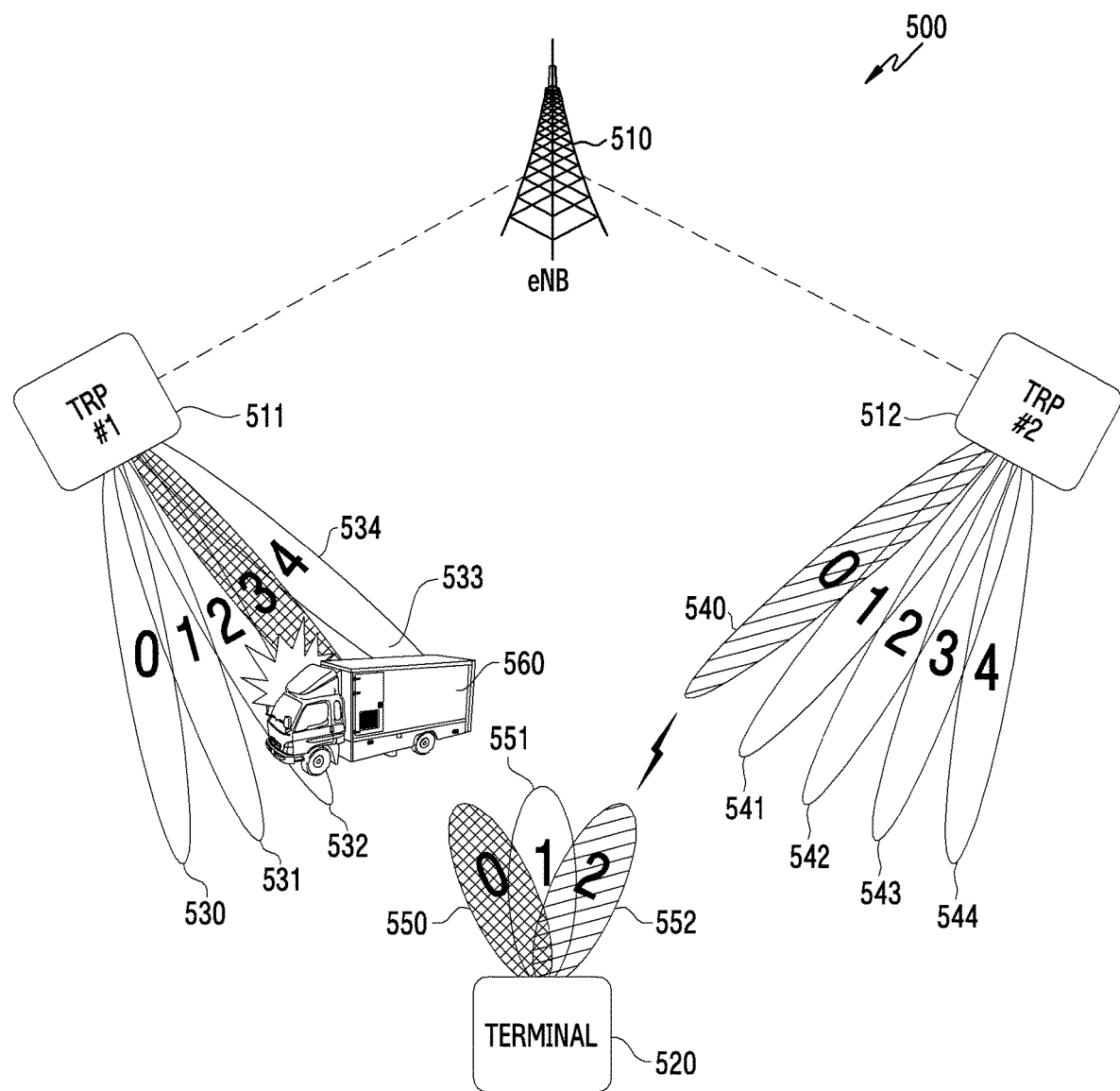
FIG. 5 illustrates a wireless communication environment for a beam pair operation according to an embodiment of the disclosure.

FIG. 5 illustrates a wireless communication environment for a beam pair operation according to an embodiment of the disclosure. Hereinafter, for example, a situation is described in which a base station is coupled with Transmission and Reception Points (TRPs) to serve a terminal at multiple points.

Referring to FIG. 5, a wireless communication environment 500 may include a base station 510, a first TRP 511, a second TRP 512, and a terminal 520. The first TRP 511 and the second TRP 512 may be coupled with a base station (e.g., the base station 510). According to an embodiment, a situation is illustrated in which each of the first TRP 511 and the second TRP 512 can form 5 beams, and the terminal 520 can form 3 beams. The first TRP 511 may communicate with the terminal 520 by using at least one of a beam0 530, a beam1 531, a beam2 532, a beam3 533, and a beam4 534. The second TRP 512 may communicate with the terminal by using at least one of a beam0 540, a beam1 541, a beam2 542, a beam3 543, and a beam4 544. The terminal 520 may communicate with the base station 510 by using at least one of a beam0 550, a beam1 551, and a beam2 552.

The base station 510 may communicate with the terminal 520 by using the beam3 533 of the first TRP. The terminal 520 may communicate with the base station 510 by using the beam0 550. Herein, a link may be established between the base station 510 and the terminal 520 through the beam3 533 of the first TRP 511 and the beam0 550 of the terminal 520. The link established through beamforming may be referred to as a beam pair or a Beam Pair Link (BPL).

After the base station 510 and the terminal 520 establish the link through the beam pair, a moving object 560 may enter the wireless channel environment 500. For example, the moving object 560 may be located on the link established by the beam3 533 of the first TRP 511 and the beam0 550 of the terminal 520. Accordingly, the base station 510 or the terminal 520 may experience deterioration of a reception quality, or a communication disabled state may be caused. When a wireless path via the first TRP 511 is in the communication disabled state, the base station 510 or the terminal 520 cannot receive a response for a signal. To overcome the communication disabled state, the base station 510 or the terminal 520 may use a new beam pair, i.e., a new wireless path.

In order to establish a new path, the base station 510 or the terminal 520 may use a recovery procedure. For example, the base station 510 or the terminal 520 may attempt to recover a connection state (e.g., retransmission, Random Access Procedure (RACH), beam recovery). In addition, if a channel quality is persistently low, the terminal 520 declares a recover failure (e.g., a Radio Link Failure (RLF)), and attempts a reconnection (e.g., Radio Resource Control (RRC) Reestablishment (RRE)). The terminal 520 may release a configuration, resource allocation, or the like which is maintained when it is connected, and may perform again an initial access procedure and a related configuration procedure. Since the RRE is performed, data may not be transmitted and received during a specific duration.

If the aforementioned procedure is repeated whenever a new path needs to be established, the base station 510 or the terminal 520 cannot transmit data during a specific duration, which may lead to a decrease in efficiency. Therefore, the base station 510 and the terminal 520 according to an embodiment of the disclosure may operate a plurality of beam pairs to configure a robust channel environment in a beamforming system. The base station may establish a plurality of beam pairs for the terminal.

A beam pair which primarily operates between the base station 510 and the terminal 520 may be referred to as a primary beam pair (PB). A beam of the base station 510 or terminal 520 corresponding to the primary beam pair may be referred to as a primary beam. For example, the primary beam pair may be an optimal beam pair identified through a beam search procedure or the like. According to an embodiment, an additional beam pair is established in addition to the primary beam pair, thereby ensuring continuity of communication. The additional beam pair operates when a connectivity of the primary beam pair is not reliable, that is, in preparation for a change of a communication state. The additional beam pair may be referred to as a secondary beam pair. A beam of a base station 510 or terminal 520 corresponding to the secondary beam pair may be referred to as a secondary beam. When in a communication disabled state, the terminal 520 may maintain a connection state with the base station 510 by rapidly switching to a beam pair for which communication is enabled, i.e., the secondary beam pair. Although the following description is based on an embodiment in which the primary beam and one secondary beam are configured, the disclosure is not limited thereto. According to an embodiment, a plurality of secondary beams may be configured for the base station and the terminal.

Meanwhile, since it is not necessary for the base station 510 to recognize a beam used in the terminal 520, the base station 510 may perform beam management in unit of a beam of the base station 510, instead of the beam pair. Likewise, the terminal 520 may perform beam management in unit of a beam of the terminal 520, instead of the beam pair. Hereinafter, the base station 510 and the terminal 520 operate the primary and secondary beams of the base station 510 on a DL basis. The base station 510 operates the primary beam and secondary beam of the base station 510 as a transmission beam. The terminal 520 operates a beam corresponding to each of the primary beam and secondary beam of the base station as a reception beam. However, the disclosure does not exclude embodiments in which the base station 510 or the terminal 520 manages not only its own beam but also a beam of the terminal or the other party.

As shown in FIG. 5, since a secondary beam pair (e.g., the beam0 540 of the second TRP 512 and the beam2 552 of the terminal 520) is configured in addition to a primary beam pair (e.g., the beam3 533 of the first TRP 511 and the beam0 550 of the terminal 520), even if the moving object 560 blocks a channel of the primary beam pair, the terminal 520 may maintain a connection state with respect to the base station 510. The terminal 520 may maintain the connection with the base station by using at least one of the beam0 550 and the beam2 552.

As described above, the disclosure proposes an operating scheme capable of maintaining a connectivity between the base station and the terminal without communication disconnection such as an attempt for reconnection or the like in a beamforming-based system even if a channel quality deteriorates rapidly. Hereinafter, in the disclosure, a scheme of operating a plurality of beam pairs without having to attempt reconnection may be referred to as a multi-beam pair operation, a PB/SB operation, a beam pair diversity, a link diversity, a path diversity, or a spare beam pair operation. In addition, the secondary beam (or the secondary beam pair) is for immediately establishing a path in a communication disabled state of the primary beam (or the primary beam pair), and may be referred to as not only the secondary beam but also a spare beam, an extra beam, a potential beam, a candidate beam, a reserved beam, or a backup beam.

In addition, similarly to the example of FIG. 5, various situations may be considered in addition to a situation in which a moving object enters a gap in an established wireless path. For example, even if the terminal moves again to a serving cell after moving to a neighboring cell on a fixed path, the terminal may prevent a ping-pong phenomenon through switching between the primary beam and the secondary beam. In addition, for another example, when a handover is performed with the movement of the terminal, the terminal may perform a handover to a target TRP from a TRP which provides the primary beam and may maintain a connection with a serving base station through the secondary beam. A communication disconnection can be minimized by using a plurality of beams.

In addition, although the beam pair of the base station and terminal is described for example in FIG. 5, an embodiment of the disclosure may also be applied to a situation where any one of a transmitting end and a receiving end is served through an omni-directional beam. For example, even if the terminal 520 is served with an omni-directional beam in FIG. 5, a connection between the terminal 520 and the base station 510 may be maintained by configuring the beam3 533 of the first TRP 511 as the primary beam of the base station 510 and by configuring the beam0 540 of the second TRP 512 as the secondary beam.

In addition, although a situation where one base station 510 provides a service to the terminal 520 by being coupled with a plurality of TRPs is described for example in FIG. 5, a multi-beam pair operation of the disclosure may be applied to various communication environments. For example, even if there is only one access point (e.g., one TRP) for providing a service to the terminal, each of the base station and the terminal may operate the primary beam and the secondary beam. It is required to satisfy a path independency between the primary beam and the secondary beam. The path independency implies that a path established by each beam provides a path which is distinct spatially. In other words, the path independency implies that channel correlation provided by different beam pairs is less than or equal to a specific level. An access state or physical information including parameters indicating a space and statistical information indicating how frequently a change occurs in a channel may be used to determine the path independency.

For another example, a multi-beam pair operation may be applied also in an environment in which TRPs are dependent on different base stations (or an environment in which two independent base station are provided instead of the TRPs). In this case, the base station may exchange configuration information related to the primary beam and the secondary beam or indication information of the primary beam and the secondary beam through a backhaul network connected between the base stations or an upper network entity.

The disclosure proposes one or more embodiments related to not only a structure for simply switching the primary beam to the secondary beam but also a configuration for identifying the primary beam and the secondary beam, resource allocation, and signaling related thereto, operations required to the terminal, a condition for performing an operation of determining a channel change, or the like. When it is determined that a channel quality of the primary beam deteriorates, both of the primary beam and the secondary beam may operate according to a configuration, instead of simply performing switching between the primary beam and the secondary beam, and optionally may operate only the secondary beam. In addition, one or more embodiments may describe not only procedures for maintaining a connection between the terminal and the base station through a primary beam pair and/or a secondary beam pair but also a reconnection (e.g., RRE) procedure performed by the terminal after attempting a connection through the secondary beam pair may be understood as an embodiment.

Hereinafter, operations of a base station and a terminal are described for a multi-beam pair operation with reference to FIG. 6 and FIG. 7. In the disclosure, the multi-beam pair operation includes not only a structure of transmitting/receiving a control signal or data signal between the base station and the terminal through the secondary beam in addition to the primary beam but also signaling and configurations required to identify the primary beam and the secondary beam.

Figure 6:
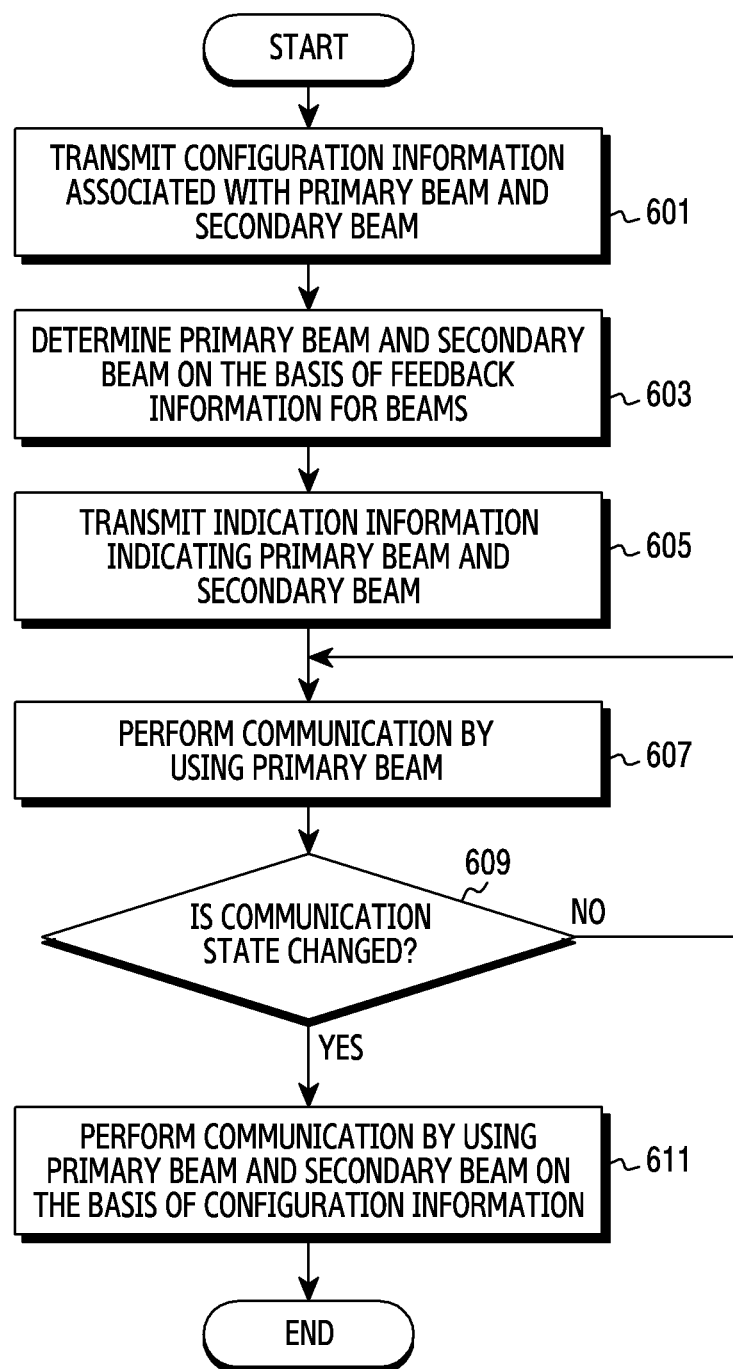
FIG. 6 is a flowchart illustrating a procedure for operating a multi-beam pair by a base station in a wireless communication system according to an embodiment of the disclosure.

FIG. 6 is a flowchart illustrating a procedure for operating a multi-beam pair by a base station in a wireless communication system according to an embodiment of the disclosure. The base station may be the base station 110 of FIG. 1.

Referring to FIG. 6, in operation 601, the base station may transmit configuration information associated with a primary beam and a secondary beam to the terminal. The configuration information may include a configuration associated with an operation of the primary beam and the secondary beam. For example, the configuration information may include a configuration for a procedure to be performed by the terminal for a multi-beam pair operation. In addition, for example, the configuration information may include information regarding a resource of a signal to be transmitted using the primary beam or the secondary beam. The base station may transmit the configuration information to the terminal, so that the terminal receives a signal to be transmitted using the primary beam and the secondary beam. The configuration information may be transmitted from the base station to the terminal through system information, high layer signaling, a Medium Access Control (MAC) Control Element (CE), or Downlink Control Information (DCI). According to an embodiment, the configuration information maybe used for determining or establishing a primary beam and a secondary beam.

In operation 603, the base station may determine the primary beam and the secondary beam on the basis of feedback information for beams. The base station may perform a beam discovery procedure to serve the terminal. The base station may identify a beam (a DL transmission beam) to be used in DL communication through the beam discovery procedure. The base station may transmit a DL signal to the terminal by using each of the plurality of beams of the base station. Herein, the DL signal may be a signal used to estimate a channel environment in the base station. For example, the DL signal may include at least one of a Beam Reference Signal (BRS), a Beam Refinement Reference Signal (BRRS), a Cell-Specific reference Signal (CRS), a Channel State Information-Reference Signal (CSI-RS), a DeModulation-Reference Signal (DM-RS), and a Synchronization Signal (SS). The DL signals may correspond to the respective beams of the base station. That is, the DL signals may be transmitted by varying the beam.

The base station may receive, from the terminal, feedback information regarding the DL signals transmitted for a beam search. The terminal may measure each of the DL signals transmitted by varying the beam, and may transmit feedback information including a measurement result to the base station. The feedback information may include information for indicating at least one beam among the beams of the base station. Herein, the at least one beam may be a beam in which a channel quality of a corresponding DL signal is greater than or equal to a threshold or a beam corresponding to N DL signals (where N is an integer number) with a high channel quality among all DL signals. Herein, in addition to Beam Reference Signal Received Power (BRSRP) and Reference Signal Received Power (RSRP), the channel quality may be, for example, at least one of Reference Signal Received Quality (RSRQ), a Received Signal Strength Indicator (RSRI), a Signal to Interference and Noise Ratio (SINR), a Carrier to Interference and Noise Ratio (CINR), a Signal to Noise Ratio (SNR), a Bit Error Rate (BER), and a Block Error Rate (BLER). Hereinafter, in the disclosure, the high channel quality implies that a channel quality value related to a signal magnitude is great or a channel quality value related to an error rate is small. The high channel quality may imply that a smooth wireless communication environment is guaranteed. In addition, an optimal beam may imply a beam with a highest channel quality.

The base station may determine the primary beam and the secondary beam among the beams of the base station. Specifically, the base station may determine an optimal beam as the primary beam. In other words, the base station may determine a beam with a highest channel quality, i.e., a highest channel quality of a DL signal, among the beams of the base station as the primary beam.

Also, the base station may determine the secondary beam based on the feedback information. The base station may determine a beam with a highest channel quality, i.e., a beam with a highest channel quality of a DL signal, among beams which satisfy a path independency with respect to the primary beam, as the secondary beam. As described above, the path independency implies that a communication path established for each beam is distinct. According to various embodiments, when a radio access point which forms a beam is distinct, for example, beams formed in different TRPs may satisfy the path independency. In addition, the path independency may be satisfied even in case of the same radio access point. For example, even if beams are formed in the same TRP, when a path established between beams is physically distinct or provides a different channel state statistically, the path independency may be satisfied. According to an embodiment, the base station (or the terminal) may determine whether the path independency between the primary beam and another beam is satisfied among the beams of the base station (or the terminal). In addition, irrespective of whether it is the same TRP or the different TRP, the base station or the terminal may determine the path independency between beams on the basis of physical information or statistical information.

In operation 605, the base station may transmit indication information indicating the primary beam and the secondary beam. The base station may transmit the indication information to the terminal. The indication information may be transmitted from the base station to the terminal through high layer signaling, a MAC CE, or Downlink Control Information (DCI). Meanwhile, the base station may transmit the indication information to the terminal not only explicitly but also implicitly. For example, the base station may transmit indication information indicating only the primary beam or the secondary beam to the terminal on the basis of feedback information received in operation 603. For example, the base station may transmit indication information indicating a beam not included in the feedback information from either the primary beam or the secondary beam. In addition, for another example, the base station may provide the indication information indicating the primary beam or the secondary beam to the terminal through resource mapping. The base station and the terminal may be configured such that a designated resource indicates a specific beam.

In operation 607, the base station may perform communication by using the primary beam. The base station may perform communication with the terminal by using the primary beam determined in operation 603. The base station may transmit a DL control signal to the terminal by using the primary beam as a DL transmission beam, or may transmit DL data. In addition, the base station may receive a UL control signal or data from the terminal by using the primary beam as a UL reception beam.

In operation 609, the base station may determine whether a communication state is changed. Herein, the communication state implies a connection state or quality of a link established by using the primary beam. The base station may determine whether the link using the primary beam with respect to the terminal is in a communication disabled state. In other words, the base station may determine whether the link using the primary beam is changed from a communication enabled state to the communication disabled state. According to one or more embodiments, the communication state may be determined through feedback information on the primary beam received from the terminal, or may be determined based on Acknowledge (ACK)/Negative-ACK (NACK) received from the terminal. For example, when a channel quality for the primary beam is detected to be less than a threshold for at least a specific time, the base station may determine that the communication state has been changed. For another example, when ACK is not received by at least a specific count, the base station may determine that the communication state has been changed.

When the communication state is not changed, the base station may perform operation 607. The base station may persistently perform communication with the terminal by using the primary beam. When the communication state is changed, the base station may perform operation 611. The base station may perform communication by using a multi-beam pair.

In operation 611, the base station may perform communication by using the primary beam and the secondary beam on the basis of configuration information. The base station may transmit a signal to the terminal or receive the signal from the terminal by using both of the primary beam and the secondary beam. The base station may transmit a control signal to the terminal by using the primary beam and the secondary beam. The base station may identify a first resource region for the primary beam and a second resource region for the secondary beam on the basis of the configuration information. The base station may transmit a first control signal to the terminal by using the primary beam through the first resource region. The base station may transmit a second control signal to the terminal by using the secondary beam through the second resource region. According to an embodiment, the first resource region and the second resource region may be different time resources (e.g., symbols, slots, subframes) or different frequency resources (Resource Blocks (RBs), subcarriers).

The base station may transmit a data signal to the terminal by using each of the primary beam and the secondary beam as a DL transmission beam. According to an embodiment, the base station may allocate the same time-frequency resource to both of a first data signal transmitted using the primary beam and a second data signal transmitted using the secondary beam. The first data signal and the second data signal may correspond to the same transport block. The terminal may receive the data signal by using at least one of a first reception beam corresponding to the primary beam and a second reception beam corresponding to the secondary beam in the same time-frequency resource. Since the same time-frequency resource is allocated to two signals, resource efficiency is increased.

The base station may receive the control signal or the data signal from the terminal by using each of the primary beam and the secondary beam as a UL reception beam. According to an embodiment, similarly to DL data, the base station may receive a signal from the terminal by using each of the primary beam and the secondary beam in the same time-frequency resource.

As shown in the embodiment described with reference to FIG. 6, the base station may operate a plurality of beams. Accordingly, the base station may perform communication with the terminal through two beams to provide a communication environment robust to a rapid change of a channel environment.

Although not shown in FIG. 6, in one or more embodiments, the base station may receive UE capability information related to a multi-beam operation from the terminal prior to operation 601. The base station may determine whether to operate the multi-beam pair on the basis of the UE capability information. In this case, when it is determined to use the multi-beam pair, the base station may perform the procedure of FIG. 6.

In operation 611 of FIG. 6, the primary bean and the secondary beam are used. However, according to another embodiment, the base station may perform communication with the terminal by using only the secondary beam. For example, when a channel quality of a radio link using the primary beam is persistently low, the base station may perform communication with the terminal by using only the secondary beam. Further, when both of a radio link using the primary beam and a radio link using the secondary beam have a channel quality lower than a threshold, the terminal may perform a recovery procedure or the terminal may declare a recovery failure (e.g., RLF). The base station may release a connection with the terminal, and the terminal may establish a new connection with the base station or may establish a connection with another base station.

Figure 7:
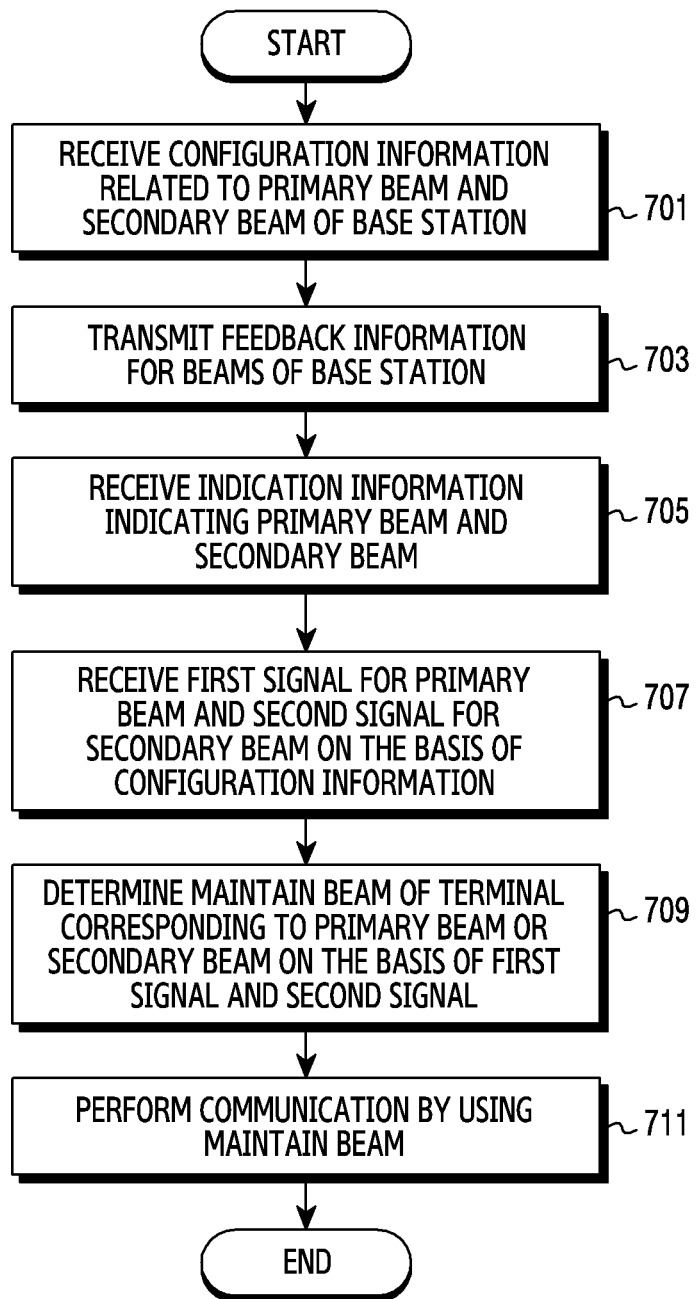
FIG. 7 is a flowchart illustrating a procedure for operating a multi-beam pair by a terminal in a wireless communication system according to an embodiment of the disclosure.

FIG. 7 is a flowchart illustrating a procedure for operating a multi-beam pair by a terminal in a wireless communication system according to an embodiment of the disclosure. The terminal may be the terminal 120 of FIG. 1.

Referring to FIG. 7, in operation 701, the terminal may receive configuration information related to a primary beam and secondary beam of a base station. The terminal may receive the configuration information from the base station. The configuration information may include information regarding a resource of each of the primary beam and secondary beam of the base station. The configuration information may include a first resource region of a signal transmitted using the primary beam or a second resource region of a signal transmitted using the secondary beam. The terminal may identify the first resource region for the primary beam and the second resource region for the secondary beam on the basis of the configuration information. According to an embodiment, the first resource region and the second resource region may be different time-frequency resources. According to an embodiment, the configuration information may be used for determining or establishing the primary beam and the secondary beam.

The terminal may determine that a multi-beam pair is configured with respect to the base station through the configuration information. The terminal may receive the configuration information to perform operations for the multi-beam pair operation. The configuration information may indicate operations of the terminal for the multi-beam pair operation. For example, the configuration information may indicate an operation mode of the terminal for the multi-beam pair operation. The terminal may determine a time point at which both of a signal transmitted using the primary beam and a signal transmitted using the secondary beam are received, on the basis of the operation mode indicated through the configuration information.

In operation 703, the terminal may transmit feedback information for beams of the base station. The terminal may receive DL signals transmitted using the beams of the base station from the base station. The terminal may measure a channel quality of each of the DL signals, and may transmit feedback information including a measurement result of the DL signals to the base station. When performing a DL beam search procedure with respect to the base station, the terminal may acquire information regarding a reception beam (hereinafter, reception beam information) of the terminal corresponding to a transmission beam of the base station. Since operation 703 corresponds to operation 603 of FIG. 6, detailed descriptions thereof will be omitted to avoid redundancy.

According to an embodiment, the terminal may be configured to transmit feedback information for a secondary beam operation to the base station. The terminal may feed back a plurality of beams or channel quality information regarding the plurality of beams to the base station. For example, upon receiving the configuration information, the terminal may be configured to transmit feedback information for two or more beams among the beams of the base station. In addition, for example, the terminal may be configured to identify one optimal beam for each TRP and to transmit feedback information including an optimal beam for each TRP and a channel quality thereof to each TRP.

In operation 705, the terminal may receive indication information indicating the primary beam and the secondary beam. The terminal may receive indication information indicating a beam formed as the primary beam and a beam formed as the secondary beam among the beams of the base station. On the basis of the information acquired in operation 703, the terminal may identify a reception beam of the terminal corresponding to the primary beam or secondary beam of the base station. That is, the terminal may identify a first reception beam corresponding to the primary beam of the base station and a second reception beam of the terminal corresponding to the secondary beam on the basis of indication information and reception beam information. Since operation 705 corresponds to operation 605 of FIG. 6, detailed descriptions thereof will be omitted to avoid redundancy.

In operation 707, the terminal may receive a first signal of the primary beam and a second signal of the secondary beam on the basis of the configuration information. First, the terminal may determine a monitoring duration in a first resource region and a second resource region on the basis of the configuration information. For example, the terminal may periodically attempt to receive a signal transmitted using the primary beam and a signal transmitted using the secondary beam, in the first resource region and the second resource region. According to an embodiment, the terminal is unaware of a time point at which the base station transmits a signal by using both of the primary beam and the secondary beam, and thus the terminal may attempt reception in both of the first resource region and the second resource region in a duration based on the configuration information.

The terminal may receive the first signal transmitted using the primary beam through the first resource region. The terminal may receive the second signal transmitted using the secondary beam through the second resource region. Since the base station transmits signals by using both the primary beam and the secondary beam, the terminal may receive the second signal transmitted using the secondary beam. According to a monitoring result of the second resource region, when an attempt for receiving the second signal is successful, that is, decoding of a channel on which the second signal is transmitted is successful, the terminal may identify that a multi-beam pair operation is initiated in the base station.

According to an embodiment, the terminal may receive the first signal transmitted using the primary beam and the second signal transmitted using the secondary beam, on the basis of reception beam information acquired in a beam search procedure. The terminal may receive the first signal and the second signal by using a first reception beam and second reception beam identified in operation 705.

In operation 709, the terminal may determine a maintain beam of the terminal corresponding to the primary beam or the secondary beam, on the basis of the first signal and the second signal. Herein, the maintain beam maybe a beam to be used to maintain a connection with the base station. The terminal may determine a beam with a better channel environment between a primary beam pair and a secondary beam pair as the maintain beam. The terminal may determine the maintain beam between the first reception beam and second reception beam used in reception of the first signal and the second signal in operation 707.

The terminal may compare a channel quality of the first signal transmitted using the primary beam and a channel quality of the second signal transmitted using the secondary beam to identify one of them. For example, the terminal may compare RSRP of the first signal and RSRP with the second signal, and may identify the second signal when RSRP of a second control signal is greater. Since the channel quality of the second signal transmitted through the second resource region is higher, the terminal may use a secondary beam pair (a secondary beam and a second reception beam) for reliable communication. The terminal may identify a second reception beam of the terminal corresponding to the secondary beam of the base station, on the basis of reception beam information stored in a beam search procedure with respect to the base station. The terminal may determine the identified second reception beam as the maintain beam of the terminal.

In operation 711, the terminal may perform communication by using the maintain beam. The terminal may receive a DL signal from the base station by using the maintain beam as a reception beam, and may transmit a UL signal to the base station by using the maintain beam as a transmission beam.

The terminal may accurately acquire whether a communication state for a primary beam which is changed until a specific time point is continued or whether the base station transmits a signal by using the secondary beam until a specific time point. Therefore, the terminal may repeatedly perform a procedure of attempting to receive a first signal of the primary beam and a second signal of the secondary beam and determining a reception beam of a satisfactory signal of the two as a maintain beam. For example, within designated TTIs, the terminal may identify a maintain beam for each of at least one TTI, and may perform communication with the base station by using the identified beam.

Instead of switching immediately or directly to the second reception beam corresponding to the secondary beam, the maintain beam is identified repeatedly between the first reception beam and the second reception beam, and thus the terminal can maintain a connection state with an optimal channel quality with respect to the base station. In addition, the terminal may repeatedly identify the maintain beam, thereby preventing a ping-pong phenomenon depending on a temporary communication error.

Although not shown in FIG. 7, if a channel quality of a radio link which uses the primary beam is persistently low during the multi-beam pair operation, the terminal may perform communication with the base station by using only a reception beam corresponding to the secondary beam. In addition, if a channel quality of both of a radio link which uses the primary beam and a radio link which uses the secondary beam is lower than a threshold, the terminal may declare a recovery failure, and may perform a reconnection procedure (e.g., RRE) to search for a new beam.

Overall procedures of the multi-beam pair operation procedure of the disclosure have been described with reference to FIG. 5 to FIG. 7. According to the disclosure, a communication disabled situation caused by a rapid deterioration in a channel of a serving beam can be effectively prevented in a beamforming system. Hereinafter, detailed operations, signaling, additional procedures, or additional procedures of the base station and the terminal in each procedure, and required information, messages, and parameters are described with reference to FIG. 8 to FIG. 23.

Before the configuration for the multi-beam pair operation, the base station may be requested to recognize whether the terminal can use a plurality of beam pairs, that is, whether a multi-beam pair can be configured. Signaling for determining whether the base station and the terminal can configure the multi-beam pair will be described with reference to FIG. 8.

Multi-Beam Pair Support

Figure 8:
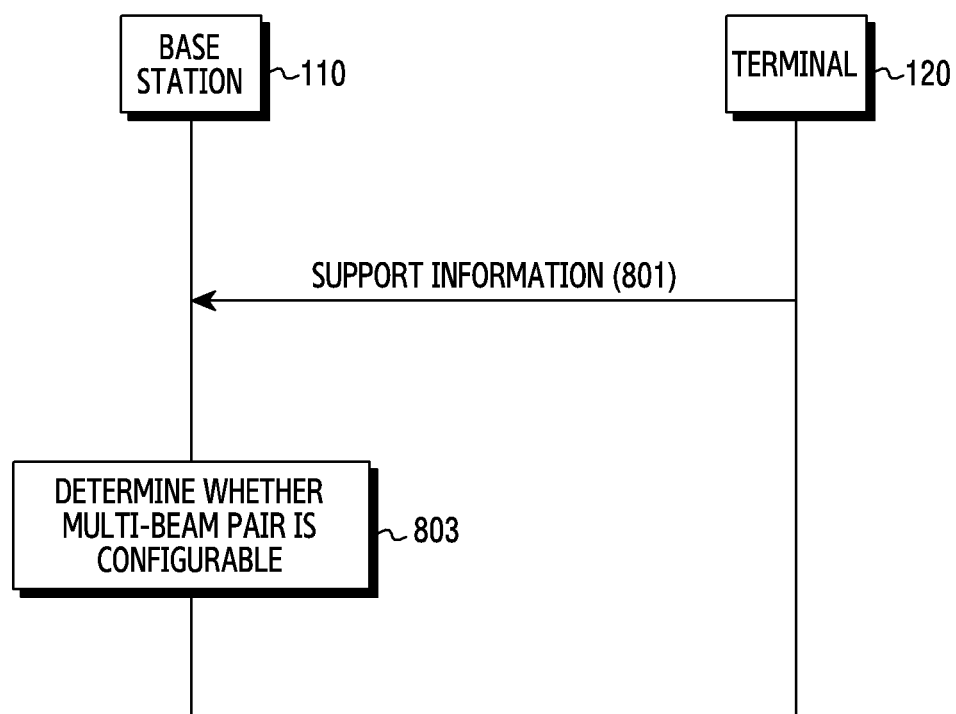
FIG. 8 illustrates a signal flow for determining whether a multi-beam pair is configured according to an embodiment of the disclosure.

FIG. 8 illustrates a signal flow for determining whether a multi-beam pair is configured according to an embodiment of the disclosure. A base station of FIG. 8 may be an example of the base station 110 of FIG. 1, and a terminal may be the terminal 120 of FIG. 1.

Referring to FIG. 8, in operation 801, the terminal may transmit support information to the base station. The support information may indicate whether an operation of a multi-beam pair is supported.

According to an embodiment, the terminal may transmit a UE capability information message including the support information to the base station. The support information may indicate whether the operation of the multi-beam pair is supported. The UE capability information message may include an Information Element (IE) indicating whether the multi-beam pair is supported, that is, the support information. For example, the support information may be included in the UE capability information message in the following form.

| | |
|---|---|
| UE-EUTRA-Capability ::= | SEQUENCE { |
| ... | |
| phyLayerParameters | PhyLayerParameters, |
| PhyLayerParameters ::= | SEQUENCE { |
| uc-TxAntennaSelectionSupported | BOOLEAN, |
| ue-SpecificRefSigsSupported | BOOLEAN |
| .... | |
| ue-MultiplelinkSupported | BOOLEAN |
| ... | |
| } | |
| ... | |
| } | |

Although not shown in FIG. 8, in one or more embodiments, the UE capability information message may further include multi-beam reception information related to reception capability of the terminal. Herein, the multi-beam reception information indicates whether the terminal can receive a signal by using a plurality of beams in the same time resource (or the same time-frequency resource). For example, the same time resource may be an OFDM symbol in a PDCCH. When the terminal can receive the signal by using the plurality of beams in the same time resource, the base station may allocate the same time resource (or time-frequency resource) to transmit a signal transmitted using a primary beam and a signal transmitted using a secondary beam.

In operation 803, the base station may determine whether the multi-beam pair can be configured for the terminal. If the support information indicates that the terminal can configure the multi-beam pair, configuration information to be described below may be transmitted to the terminal. In addition, in one or more embodiments, the base station may determine whether the same time resource can be allocated to the primary beam and the secondary beam. For example, if the multi-beam reception information indicates that the terminal can receive a signal by using the plurality of beams, the base station may allocate the same time-frequency resource to the primary beam and the secondary beam when a DL control signal is transmitted.

Meanwhile, although the UE capability information message is described for example in FIG. 8, in addition to the UE capability information message, other RRC messages and other UL signals (e.g., a Random Access Channel (RACH)) may be used as signaling including the support information.

The base station may determine whether the multi-beam pair can operate according to the support information received from the terminal. Upon determining that the multi-beam pair can operate, the terminal may be configured to operate the multi-beam pair according to one or more embodiments described with reference to FIG. 9 to FIG. 12.

Multi-Beam Pair Configuration

Figure 9:
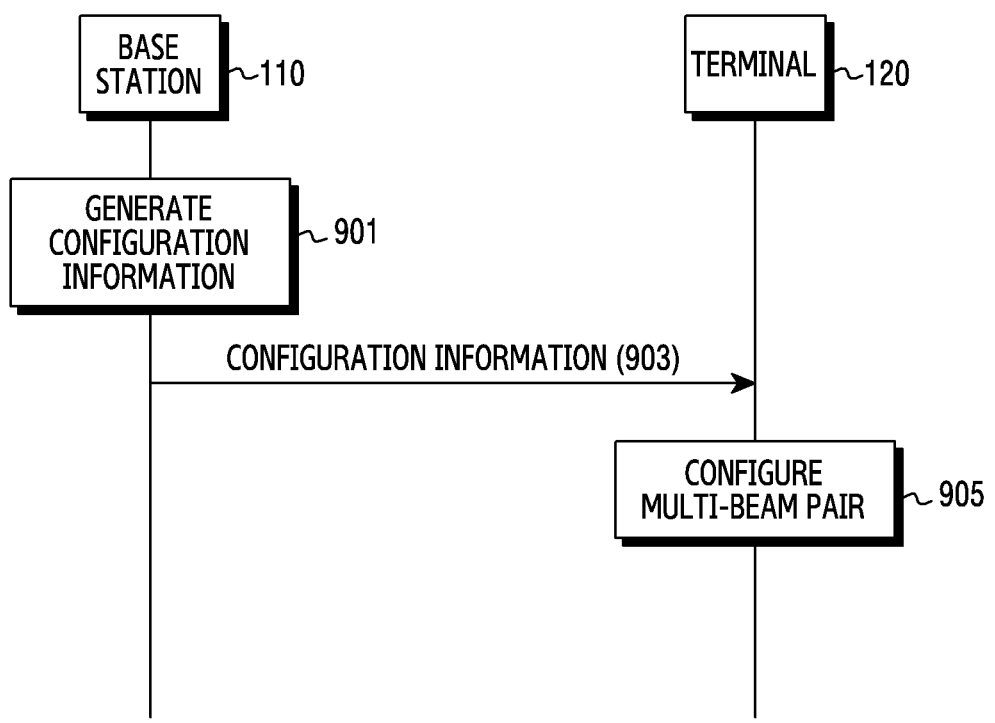
FIG. 9 illustrates a signal flow for configuring a multi-beam pair according to an embodiment of the disclosure.

FIG. 9 illustrates a signal flow for configuring a multi-beam pair according to an embodiment of the disclosure. A base station of FIG. 9 may be an example of the base station 110 of FIG. 1, and a terminal may be the terminal 120 of FIG. 1.

Referring to FIG. 9, in operation 901, the base station may generate configuration information. The configuration information may be information for configuring a multi-beam pair. The configuring of the multi-beam pair may include, as a multi-beam pair, allocating a resource to each of a plurality of beam pairs, associating parameters with an operation of the multi-beam pair, and determining an operation mode of the base station or terminal for operating the multi-beam pair.

According to an embodiment, the configuration information may include resource information. The resource information may include information regarding a first resource region of a signal transmitted using a primary beam or a second resource region of a signal transmitted using a secondary beam. In one or more embodiments, the first resource region and the second resource region may be different regions in a time domain (e.g., the first resource region is a first OFDM symbol of a control region, and the second resource region is a second OFDM symbol). In addition, according to an embodiment, the first resource region and the second resource region may include time resources differently in the same Component Carrier (CC). According to another embodiment, the first resource region and the second resource region may correspond to different CCs. In addition, in one or more embodiments, the first resource region and the second resource region may be different resources in a frequency domain (e.g., the first resource region is a first RB, and the second resource region is a second RB). In addition, in one or more embodiments, the first resource region and the second resource region may be resources corresponding to different channels (e.g., a PDCCH and an Enhanced PDCCH (EPDCCH)). In addition, in one or more embodiments, the first resource region and the second resource region may be different Control Resource Sets (CORESETs).

According to one or more embodiments, the configuration information may not include resource information regarding the first resource region. That is, the configuration information may include only resource information regarding the second resource region. For example, the first resource region may be pre-configured, and the terminal may identify only the second resource region through the configuration information.

The configuration information may indicate operations of the terminal for operating the primary beam and the secondary beam. In one or more embodiments, the configuration information may include mode information indicating an operation mode of the terminal. The base station may control the terminal to perform operations for operating the secondary beam, by indicating the operation mode of the terminal in the configuration information. For example, the base station may control the terminal to always decode a control region corresponding to both of the primary beam and the secondary beam through the mode information. For another example, the base station may control the terminal to periodically decode the control region. For another example, the base station may control the terminal to dynamically decode the control region. In some other embodiments, the configuration information may not indicate the operation mode of the terminal. Operations to be performed by the terminal after receiving the configuration information may be pre-configured.

The configuration information may include parameters associated with operations of the base station and/or the terminal to operate the primary beam and the secondary beam. For example, the configuration information may include information regarding a duration in which the terminal has to decode both of the primary beam and the secondary beam, information regarding a period, or the like.

In operation 903, the base station may transmit the configuration information to the terminal. The base station may use signaling to provide the configuration information to the terminal. In one or more embodiments, the base station may provide the configuration information to the terminal through system information. The system information may include resource information regarding the primary beam and the secondary beam and mode information associated with operations of the terminal. For example, the base station may provide the terminal with the configuration information including the resource information and the mode information through one piece of system information. For another example, the base station may provide the terminal with the resource information through first system information, and may provide the terminal with the mode information indicating detailed operations of the terminal through second system information.

According to another embodiment, the base station may provide the configuration information through an RRC message. For example, the base station may transmit the configuration information to the terminal by including the configuration information in an RRC Reconfiguration message as the RRC message. According to an embodiment, the base station may transmit to the terminal the RRC message including mode information indicating one of three operation modes of the terminal described above in operation 903. The base station may control the terminal to perform operations for operating the secondary beam through the mode information. For example, the mode information may be included in the RRC message in the following form.

```
RRCConnectionReconfiguration::= SEQUENCE {
    ...
    radioResourceConfigDedicated           RadioResourceConfigDedicated
    OPTIONAL, -- Cond HO-toEUTRA
        RadioResourceConfigDedicated ::=   SEQUENCE {
            ...
            physicalConfigDedicated        PhysicalConfigDedicated
            OPTIONAL, --
        ...
                { MultipleLink-Mode        CHOICE { Always, Periodic,
    Dynamic}
        ...
}
```

Here, MultipleLink-Mode may indicate mode information, 'Always' may indicate an operation mode in which the terminal is allowed to always attempt to receive the multi-beam pair, 'Periodic' may indicate an operation mode in which the terminal is allowed to periodically attempt to receive the multi-beam pair and 'Dynamic' may indicate an operation mode in which the terminal is allowed to dynamically attempt to receive the multi-beam pair.

According to another embodiment, the base station may implicitly provide the configuration information to the terminal through signaling. Each of the first resource region and the second resource region for the primary beam and the secondary beam may be pre-configured. Operations of the terminal for operating the secondary beam may also be pre-configured. The base station may configure the terminal to operate a multi-beam pair, without having to explicitly include the configuration information, through signaling indicating the multi-beam pair operation. For example, the base station may activate the pre-configured multi-beam pair configuration of the terminal, by transmitting a MAC CE to the terminal.

According to one or more embodiments, the base station may transmit configuration information related to the primary beam and may transmit configuration information related to the secondary beam, instead of concurrently transmitting the configuration information related to the primary beam and the secondary beam. That is, the base station may transmit the configuration information related to the primary beam and the configuration information related to the secondary beam to the terminal through different time resources.

In operation 905, the terminal may be configured to operate the multi-beam pair according to the configuration information. On the basis of the configuration information, the terminal may identify the first resource region of the first signal transmitted using the primary beam and the second resource region of the second signal transmitted using the secondary beam. The terminal may monitor a signal transmitted using the primary beam in the first resource region and monitor a signal transmitted using the secondary beam in the second resource region, that is, may attempt reception (hereinafter, multi-beam pair reception). According to an embodiment, if the configuration information indicates symbols in a PDCCH, the terminal may attempt to receive a signal of a primary beam pair in a first symbol and a signal of a secondary beam pair in a second symbol. According to another embodiment, if the configuration information indicates a CORESET (e.g., a UE-specific CORESET), the terminal may configure a plurality of CORESETs. The terminal may be configured to receive a control signal by using a different beam for each CORESET. In the disclosure, a reception attempt may include a decoding attempt of a received signal. The terminal may attempt to decode, for example, a control channel.

The terminal may receive a multi-beam pair during a duration determined based on the configuration information. In one or more embodiments, after a time of receiving the configuration information, the terminal may receive the multi-beam pair for each Transmission Time Interval (TTI). In some other embodiments, the terminal may periodically receive the multi-beam pair. The configuration information may include period information. In some other embodiments, the terminal may receive the multi-beam pair in a specific duration. The configuration information may include a parameter for identifying the specific duration.

The terminal may receive not only the first signal transmitted using the primary beam but also the second signal transmitted using the secondary beam, and may determine at least one of the primary beam and the secondary beam after measuring a channel quality. The terminal may compare a channel quality of the first signal received through the first resource region and a channel quality of the second signal received through the second resource region to identify a reception beam included in one of the primary beam pair and the secondary beam pair. The terminal may determine the identified reception beam as a beam to be used in communication. The terminal may be configured to perform communication with the base station, by using the reception beam of the terminal corresponding to the determined beam.

Hereinafter, an example of configuration information and an operation of a base station and a terminal according to the configuration information is described with reference to FIG. 10 to FIG. 12.

In order to determine a resource for operating a secondary beam, a method of designating a resource of a DL control signal may be considered. That is, data transmission/reception and main operations of a base station and a terminal may be indicated by control information transmitted through a control channel (e.g., a PDCCH). If the terminal can receive only control information even in a very poor situation where data is not transmitted/received, a connectivity with the base station may not be lost and communication with the base station may be maintained. Accordingly, a resource which uses a secondary beam is described according to an embodiment by taking the control channel for example.

Figure 10:
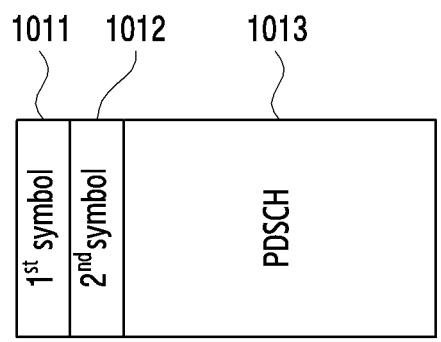
FIG. 10 illustrates an example of a resource configuration for configuring a multi-beam pair according to an embodiment of the disclosure.

FIG. 10 illustrates an example of a resource configuration for configuring a multi-beam pair according to an embodiment of the disclosure. Referring to FIG. 10, a base station may allocate a first resource region 1011 to a terminal for a primary beam. The first resource region 1011 may be a first symbol of a PDCCH 13. The base station may allocate a second resource region 1012 to the terminal for a secondary beam. The second resource region 1012 may be a second symbol of the PDCCH 13.

In a multi-beam pair operation, the base station may transmit a first control signal which uses the primary beam through the first resource region 1011, and may transmit a second control signal which uses a secondary beam to the terminal through the second resource region 1012. The terminal may attempt to receive the first control signal through the first resource region 1011, and may attempt to receive the second control signal through the second resource region 1012. The terminal may attempt decoding of a control channel in a designated resource, for example, in each of the first resource region 1011 and the second resource region 1012, i.e., in each of a first symbol and second symbol of the control channel.

According to an embodiment, an operation of transmitting the first control signal using the primary beam and the second control signal using the secondary beam in one TTI may be persistently performed as shown in FIG. 10. In this case, control information may be included in an RRC message in the following form, so that the first control signal and the second control signal are always received in a designated resource.

```
physicalConfigDedicated          PhysicalConfigDedicated    OPTIONAL, --
    ...
        { MultipleLink-Mode      CHOICE { Always}
          PrimaryLink-Resource   CHOICE {1st_sym, 2nd_sym,
3rd_sym}
          SecondaryLink-Resource CHOICE {1st_sym, 2nd_sym,
3rd_sym}
    ...
```

Here, MultipleLink-Mode may indicate 'Always' as mode information, and PrimaryLink-Resource may indicate one symbol as part of a region in which a control signal of the primary beam is transmitted, i.e., a PDCCH region 1013. For example, PrimaryLink-Resource may indicate the first resource region 1011 which is a first symbol. SecondaryLink-Resource may indicate one symbol as part of a region in which a control signal of the secondary beam is transmitted, i.e., a PDCCH region 1013. For example, SecondaryLink-Resource may indicate the second resource region 1012 which is a second symbol.

Figure 11:
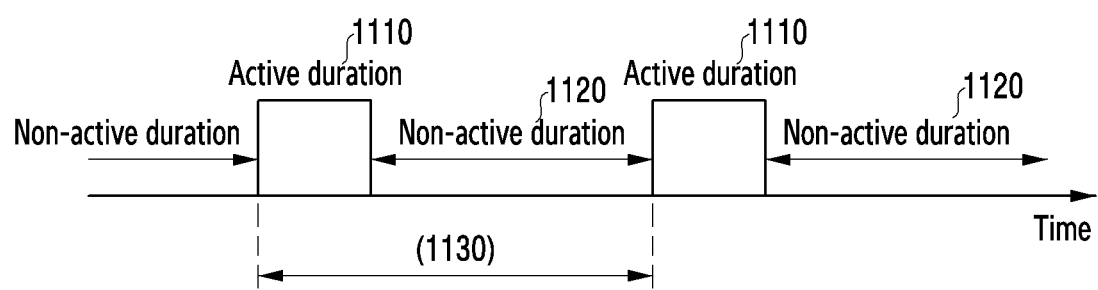
FIG. 11 illustrates an example of periodically activating a multi-beam pair according to an embodiment of the disclosure.

FIG. 11 illustrates an example of periodically activating a multi-beam pair according to an embodiment of the disclosure. A terminal may attempt to periodically receive a first signal transmitted using a primary beam and a second signal transmitted using a secondary beam in a designated resource. In other words, the terminal may periodically receive a multi-beam pair.

Referring to FIG. 11, the terminal may receive the multi-beam pair in an active duration 1110. The terminal may attempt to receive a signal transmitted using the secondary beam during the active duration 1110. The terminal may not receive the multi-beam pair in a non-active duration 1120. The terminal may attempt to receive only a signal transmitted using the primary beam in the non-active duration 1120. The terminal may repeat the active duration 1110 and the non-active duration 1120 according to a period 1130 to attempt to receive a signal transmitted from the base station. For example, when a first resource region and second resource region are configured respectively for the primary beam and secondary beam as shown in FIG. 10, the terminal may attempt decoding on both of a first symbol and second symbol of a PDCCH in the active duration 1110. In addition, the terminal may attempt decoding only in the first symbol of the PDCCH in the non-active duration 1120.

According to an embodiment, configuration information may include mode information indicating a periodic operation of the terminal and parameters for the periodic operation. The parameter may include at least one of an active period, an active duration, and a non-active duration. The active duration or the non-active duration may be indicated by a time resource unit (e.g., a slot, a subframe, a frame).

According to one or more embodiments, the configuration information may be transmitted by being included in an RRC message in the following form.

```
physicalConfigDedicated                        PhysicalConfigDedicated
    OPTIONAL, --
    ...
        { MultipleLink-Mode                    CHOICE { Periodic}
          PrimaryLink-Resource                 CHOICE {1st_sym,
2nd_sym, 3rd_sym}
          SecondaryLink-Resource               CHOICE {1st_sym,
2nd_sym, 3rd_sym}
          ActiveDuration                       CHOICE {10sf,
20sf, 30sf, 40sf, ...}
          nonActiveDuration                    CHOICE {10sf,
20sf, 30sf, ....}
    ...
```

Here, MultipleLink-Mode may indicate 'Periodic' as mode information and PrimaryLink-Resource may indicate a resource region in which a control signal of a primary beam is transmitted, and SecondaryLink-Resource may indicate a resource region in which a control signal of a secondary beam is transmitted. The active duration may indicate a duration in which multi-beam pair is received, i.e., an active duration. The non-active duration may indicate a duration in which multi-beam pair is not received, i.e., a duration in which reception for only a signal transmitted using the primary beam is attempted, i.e., a non-active duration. For example, each of the active duration and the non-active duration may indicate any one of 10 SubFrames (SFs), 20 SFs, 30 SFs, and 40 SFs.

Figure 12:
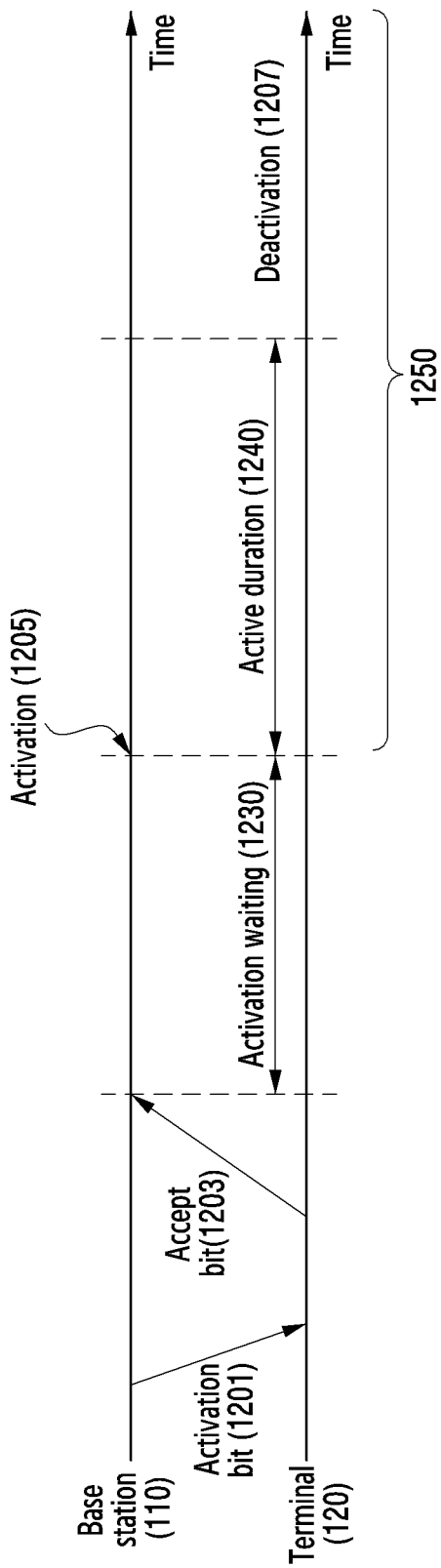
FIG. 12 illustrates an example of dynamically activating a multi-beam pair according to an embodiment of the disclosure.

FIG. 12 illustrates an example of dynamically activating a multi-beam pair according to an embodiment of the disclosure. When a base station requires activation of an operation of the multi-beam pair, that is, requires utilization of a secondary beam, a terminal may be configured to attempt to receive a signal transmitted using the secondary beam. The terminal may attempt to receive a second signal transmitted using the secondary beam, in addition to a first signal transmitted using a primary beam only when the base station is configured, in a designated resource. In other words, the terminal may dynamically receive the multi-beam pair according to an indication of the base station. Herein, the base station may be the base station 110 of FIG. 1, and the terminal may be the terminal 120 of FIG. 1.

Referring to FIG. 12, in operation 1201, the base station may transmit an activation bit to the terminal. The base station may transmit the activation bit to the terminal so that the terminal maybe activated to receive the multi-beam pair. The activation bit may be referred to as a secondary beam activation bit, an SB activation bit, or a multi-beam pair activation bit. In one or more embodiments, the base station may transmit the activation bit to the terminal through a control channel such as a PDCCH. The base station may transmit DCI including the activation bit to the terminal. By receiving the activation bit from the base station, the terminal may detect that a multi-beam pair operation is initiated with respect to the base station.

In operation 1203, the terminal may transmit an accept bit to the base station. Herein, the accept bit may be an acknowledgement ACK for the activation bit of operation 1201.

In operation 1205, the base station and the terminal may activate an operation of the multi-beam pair. According to an embodiment, after the accept bit is transmitted, each of the base station and the terminal may activate the operation of the multi-beam pair after a waiting time (hereinafter, activation waiting) 1230 elapses. The activating waiting period 1230 may be referred to as secondary beam SB activation waiting period since a configuration related to the secondary beam is activated.

The base station may not only transmit a first signal by using the primary beam but also transmit a second signal to the terminal by using the secondary beam. A first resource region in which the first signal is transmitted and a second resource region in which the second signal is transmitted may be provided in advance to the terminal through resource information included in configuration information. After being activated, the terminal may attempt to not only receive a signal in the first resource region but also receive a signal in the second resource region. For example, the terminal may attempt decoding of a signal transmitted using the secondary beam in a second symbol of a PDCCH as shown in FIG. 10.

According to an embodiment, the terminal may acquire the activation waiting period 1230 through the configuration information. The configuration information may include a parameter for indicating the activation waiting. For example, the configuration information may include the parameter indicating the activation waiting period 1230 by using 5 subframes. The terminal may activate the operation of the multi-beam pair from a $5^{th}$ subframe n+5 after a subframe n in which the accept bit is transmitted. Meanwhile, in another embodiment, the terminal may acquire the activation waiting according to a predetermined rule. For example, the terminal may activate the operation of the multi-beam pair from a $4^{th}$ subframe n+4 after the subframe n in which the accept bit is transmitted.

In operation 1207, the base station and the terminal may deactivate the operation of the multi-beam pair. After the operation of the multi-beam pair is activated, each of the base station and the terminal may deactivate the operation of the multi-beam pair after an active duration 1240. The active duration 1240 is a time in which a configuration related to the secondary beam is activated, and thus may be referred to as an active time, a duration for SB, or an SB active time.

The base station may attempt to receive a signal transmitted using the secondary beam during the active duration, in the second resource region.

According to an embodiment, the terminal may acquire the active duration through configuration information. The configuration information may include a parameter for indicating the active duration. For example, the configuration information may include the parameter indicating the active duration by using 10 subframes. After a subframe n in which the operation of the multi-beam pair is activated, the terminal may deactivate the operation of the multi-beam pair from a $10^{th}$ subframe n+10. Meanwhile, unlike in the aforementioned description, the parameter indicating the active duration may also be pre-configured.

When conforming to an embodiment of the disclosure, dynamic multi-beam pair activation may be periodically performed. That is, the dynamic multi-beam pair activation of FIG. 12 may include the periodic multi-beam pair activation of FIG. 11. The configuration information may include a parameter indicating the number of times of the periodic multi-beam pair activation in addition to an active duration and a non-active duration. For example, the configuration information may include a parameter indicating to perform the multi-beam pair activation three times. The terminal may repeat the active duration and the non-active duration, i.e., an active cycle 1250, three times and thus may attempt to receive a signal transmitted using the secondary beam. According to one or more embodiments, the configuration information may be transmitted by being included in an RRC message in a form described below.

```
physicalConfigDedicated              PhysicalConfigDedicated   OPTIONAL, --
    ...
        { MultipleLink-Mode          CHOICE { Dynamic}
            PrimaryLink-Resource         CHOICE {1st_sym, 2nd_sym,
3rd_sym}
            SecondaryLink-Resource       CHOICE {1st_sym, 2nd_sym,
3rd_sym}
            ActiveDuration           CHOICE {10sf, 20sf,
30sf, 40sf,...}
            nonActiveDuration        CHOICE {10sf, 20sf,
30sf, ....}
            N_activeDuration         CHOICE {num1, num2,
num3,...}
            SB_activationWaitingDuration CHOICE {5sf, 6sf,
7sf, ....}
```

Here, MultipleLink-Mode may indicate 'Dynamic' as mode information, PrimaryLink-Resource may indicate a resource region in which a control signal of a primary beam is transmitted, SecondaryLink-Resource may indicate a resource region in which a control signal of a secondary beam is transmitted, ActiveDuration may indicate an active duration, nonActiveDuration may indicate a non-active duration, N_activeDuration may indicate a repetition count of each of the active duration and the non-active duration and SB_activationWaitingDuration may indicate activation waiting.

After the operation of the multi-beam pair is determined as described above with reference to FIGS. 9 to 12, each of the base station and the terminal may perform a process for measuring quality of a channel established from a beam. Such a procedure may be referred to as a beam search procedure, a Beam State Information (BSI) process, P-1, P-2, P-3 procedures, or the like. Such a beam search procedure includes a process (e.g., beam reporting) in which the base station feeds back an identifier of a beam (e.g., an ID of a beam or an ID of a resource in which the beam is used) of a best base station and a reception quality of the beam from the terminal at the request of the base station. A situation in which a reception quality is fed back from a plurality of beams is assumed according to an embodiment of the disclosure. For example, the terminal may feed back beams identified through the beam search procedure to the base station on a group basis.

The base station may identify the primary beam and the secondary beam on the basis of feedback information received from the terminal. Thereafter, the base station may configure which beam is a primary beam (or a primary beam pair (PB)) and a secondary beam (or a secondary beam pair (SB)) to the terminal. Hereinafter, a procedure of identifying the primary beam and the secondary beam and a procedure of configuring the primary beam and the secondary beam to the terminal will be described with reference to FIGS. 13 to 17.

Multi-Beam Pair Indication

Figure 13:
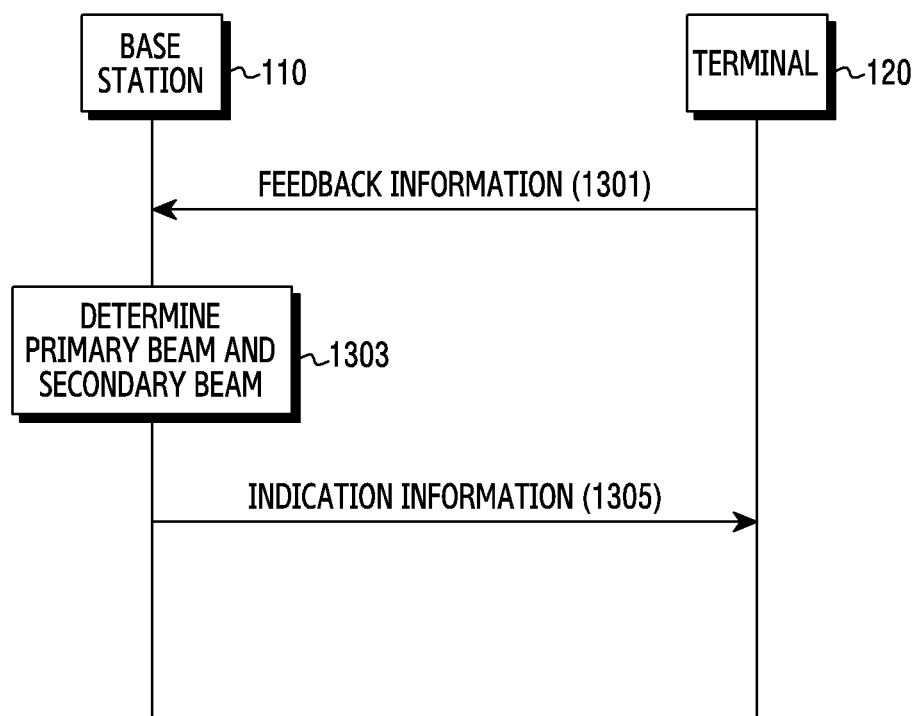
FIG. 13 illustrates a signal flow for indicating a multi-beam pair according to an embodiment of the disclosure.

FIG. 13 illustrates a signal flow for indicating a multi-beam pair according to an embodiment of the disclosure. Herein, a base station may be the base station 110 of FIG. 1, and a terminal may be the terminal 120 of FIG. 1.

Referring to FIG. 13, in operation 1301, the terminal may transmit feedback information to the base station. The feedback information may be feedback information for signals to be transmitted using beams of the base station. For example, the signal may be a CSI-RS or an SS block including a synchronization signal. The terminal may measure a channel quality for each of the beams of the base station through the signals. The feedback information may include beam information indicating at least one of the beams, for example, an index for the beam. Alternatively, the feedback information may include information indicating a resource (e.g., a symbol, a block, etc.) corresponding to a beam, for example, an index for the resource. In addition to the beam information, the feedback information may include a channel quality value for a beam indicated by the beam information. For example, the feedback information may include an RSRP value of a specific beam.

According to an embodiment, the base station may receive feedback information indicating two or more beams from the terminal. In the disclosure, the base station is required to identify a secondary beam in advance in addition to a primary beam, and thus the feedback information may indicate two or more beams.

In one or more embodiments, the terminal may feed back beam information to the base station on a group basis. For example, the base station may receive feedback information indicating two or more beams in one group from the terminal. Herein, the group may include beams in which a mutual path independency is satisfied between intra beams. For another example, the base station may receive feedback information indicating one or more beams in each of two or more groups from the terminal. For example, the group may be configured on a TRP basis. The base station may configure a beam group for each TRP, and the terminal may transmit feedback information indicating one or more optimal beams for each beam group to the base station. For another example, the group may be a set of beams which share similar channel properties. A signal measured to identify the optimal beam may be configured in a group specific manner according to a TRP ID or a beam group ID. The base station may configure a group implicitly through resource allocation to the terminal (e.g., the same group is allocated to the same subframe) or explicitly through signaling (e.g., an identifier indicating the group is transmitted).

In one or more embodiments, the terminal may feed back beam information to the base station on a non-group basis. The terminal may feed back N (where N is an integer number) transmission beams of the base station to the base station when feedback transmission is performed one time according to a configuration of the base station. The base station may transmit a message including a parameter indicating N to the terminal when it is connected to the terminal.

According to an embodiment, the feedback information may include reception beam information regarding a transmission beam. For example, the feedback information may indicate transmission beams corresponding to reception beams of different terminals. Herein, since the reception beams of the terminals are different from one another, each reception beam may constitute a beam pair which is physically distinct together with the transmission beam.

In operation S1303, the base station may determine a primary beam and a secondary beam. The base station may determine the primary beam and the secondary beam on the basis of the feedback information received from the terminal. The base station may identify the primary beam and the secondary beam among the beams of the base station on the basis of the feedback information. According to an embodiment, the base station may sequentially identify the primary beam and the secondary beam according to a channel quality of each beam included in the feedback information. The base station may identify a beam with a highest channel quality as the primary beam. The base station may identify the secondary beam among the beams of the base station excluding the primary beam on the basis of the channel quality.

According to an embodiment, the secondary beam may be required to establish a link which is spatially separated from the primary beam. For example, a TRP which provides the secondary beam may be a TRP different from a TRP which provides the primary beam. For another example, the secondary beam may be a beam in which an angle formed by a radiation direction of the primary beam and a radiation direction of the secondary beam is greater than or equal to a threshold angle. For another example, the secondary beam may be a beam which does not have a QCL relation with the primary beam. Herein, when it is said that QCL is achieved, it may imply that a wide range property of a wireless channel to be experienced by a signal transmitted through the secondary beam is the same as a wide range property of a wireless channel to be experienced by a signal transmitted through the primary beam. For example, the wide range property may include delay spread, Doppler spread, average delay, or the like. According to a level of the wide range property, various QCL types may be defined.

In operation 1305, the base station may transmit indication information to the terminal. The base station may transmit, to the terminal, first indication information indicating the primary beam and second indication information indicating the secondary beam. The indication information may be transmitted from the base station to the terminal through RRC signaling, a MAC CE, or DCI. According to an embodiment, the first indication information and the second indication information may be transmitted together to the terminal. According to another embodiment, the first indication information and the second indication information may be transmitted separately to the terminal.

Figure 14:
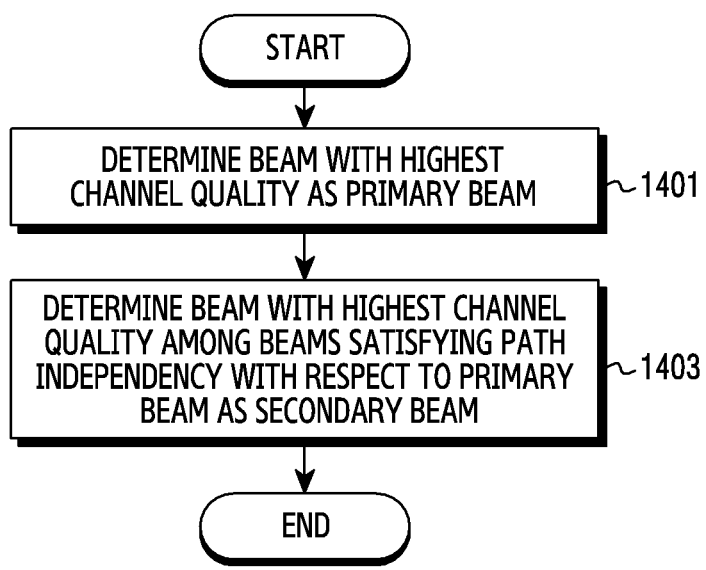
FIG. 14 is a flowchart illustrating a procedure for determining a primary beam and a secondary beam by a base station according to an embodiment of the disclosure.

FIG. 14 is a flowchart illustrating a procedure for determining a primary beam and a secondary beam by a base station according to an embodiment of the disclosure. The base station may be the base station 110 of FIG. 1. Operations of the base station of FIG. 14 correspond to the operations of the base station in operation 1303 of FIG. 13.

In operation 1401, the base station may determine a beam with a highest channel quality as the primary beam. The base station may determine the beam with the highest channel quality among beams of the base station indicated by feedback information as the primary beam. The feedback information may include a channel quality of each beam. For example, the terminal may perform a DL beam search procedure with respect to the base station, and may transmit N transmission beams (where N is an integer value greater than or equal to 2) among the beams of the base station and feedback information including an RSRP value of each transmission beam. The base station may determine a transmission beam of a base station with a greatest RSRP value as the primary beam. For another example, the terminal may feed back one beam for each TRP to the base station. The base station may determine a beam of a serving TRP among beams of the respective TRPs as the primary beam.

In operation 1403, the base station may determine a beam with a highest channel quality among beams satisfying a path independency with respect to the primary beam as the secondary beam. Herein, the path independency may be a communication path established for each beam proceeds in a distinct direction. When the path independency between beams is satisfied, the communication path of each beam is required to proceed in a physically different direction. When it is expected that a signal corresponding to each beam does not experience a similar channel since the communication path of each beam proceeds in the physically different direction, a path independency of two beams may be satisfied. According to an embodiment, a QCL relation of the two beams may not be achieved.

The base station may determine at least one beam satisfying a path independency with respect to the primary beam as the secondary beam among the feedback beams. According to an embodiment, the base station may determine whether any beam satisfies the path independency with respect to the primary beam. For example, the base station may determine the secondary beam on the basis of physical parameters related to a radiation path of each beam. That is, the base station may determine a beam with a highest channel quality among beams, excluding the primary beam, which has a communication path that is different from the communication path of the primary beam. For another example, the base station may determine the secondary beam on the basis of statistical information related to a communication state for each beam (e.g., a channel quality change for each beam, how frequently a communication is disconnected for each beam). For another example, the base station may determine the secondary beam on the basis of a TRP which provides each beam. For another example, the base station may determine the secondary beam on the basis of feedback information on a group basis.

Figure 15:
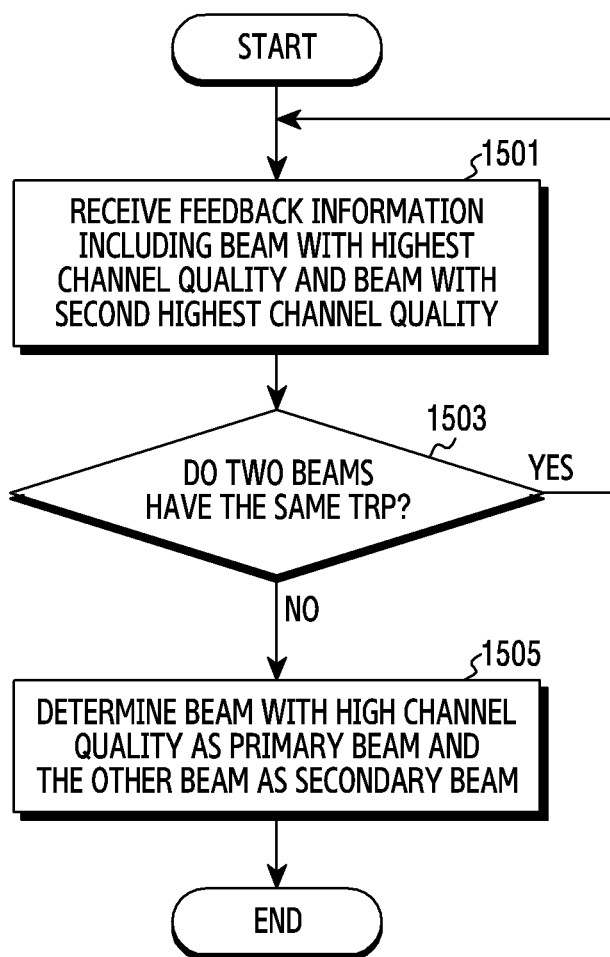
FIG. 15 is flowchart illustrating a procedure for determining a primary beam and a secondary beam by a base station according to another embodiment of the disclosure.

FIG. 15 is a flowchart illustrating a procedure for determining a primary beam and a secondary beam by a base station according to another embodiment of the disclosure. The base station may be the base station 110 of FIG. 1. Operations of the base station of FIG. 15 may correspond to the operations of the base station in operation 1301 and 1303 of FIG. 13.

According to an embodiment illustrated in FIG. 15, it may be assumed that beams from TRPs physically separated from each other satisfy a mutual path independency. That is, the beams from the TRPs physically separated from each other may be configured respectively as the primary beam and the secondary beam. This is because there is a high possibility that signals received from the same TRP are transmitted through a similar path. Therefore, even if another beam of the base station is used in the same TRP as the secondary beam pair, when a channel quality of the primary beam pair is low, a channel quality of the secondary beam pair may also be low. On the other hand, since there is a high possibility that beams from different TRPs establish a path physically distinct, even if the channel quality of the primary beam pair is low, the channel quality of the secondary beam pair may be high. In other words, when the TRPs are different, there is a high possibility that the channel quality of the secondary beam pair is independent of the channel quality of the primary beam pair.

Referring to FIG. 15, in operation 1501, the base station may receive feedback information including a beam with a highest channel quality and a beam with a second highest channel quality from the terminal. Herein, each of the two beams included in the feedback information may be a beam identified according to a result of measuring a channel quality for each beam. That is, the terminal may generate feedback information including the beam with the highest channel quality and the beam with the second highest channel quality among the measured beams. For example, the feedback information may include an index of a beam with greatest RSRP and a beam with a second greatest RSRP. In addition, when the feedback information indicates three or more beams, the terminal may identify the beam with the highest channel quality and the beam with the second highest channel quality among the beams included in the feedback information. For example, the base station may identify the beam with the greatest RSRP and the beam with the second greatest RSRP among the beams included in the feedback information.

In operation 1503, the base station may determine whether the two beams are provided in the same TRP. By determining whether the two beams with the high channel quality among the beams included in the feedback information are provided in the same TRP, the base station may determine whether the identified two beams experience different wireless channels, that is, whether each path is independent. If the identified two beams are provided in the same TRP, the base station may perform operation 1503 again. That is, the base station may receive the feedback information again, in order to determine the primary beam and secondary beam which satisfy the path independency. If the identified two beams are not provided in the same TRP, the base station may perform operation 1505.

In operation 1505, the base station may determine the primary beam and the secondary beam. The base station may determine a beam with a higher channel quality between the two beams as the primary beam, and may determine the other beam as the secondary beam.

Figure 16:
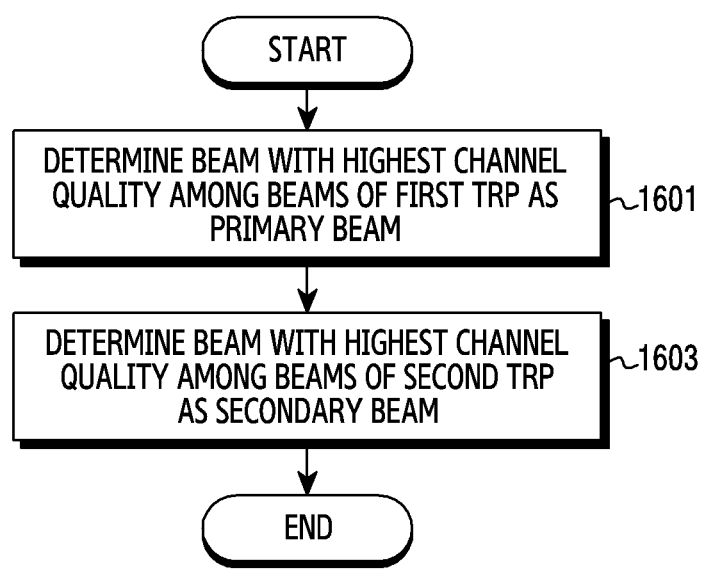
FIG. 16 is flowchart illustrating a procedure for determining a primary beam and a secondary beam according to another embodiment of the disclosure.

FIG. 16 is a flowchart illustrating a procedure for determining a primary beam and a secondary beam by a base station according to an embodiment of the disclosure. The base station may be the base station 110 of FIG. 1.

In operation 1601, the base station may determine a beam with a highest channel quality as the primary beam among beams of a first TRP. According to an embodiment, the base station may determine the first TRP. For example, the base station may determine a TRP, which provides a beam with a highest channel quality among beams included in feedback information, as the first TRP. The base station may maintain a smooth communication environment with respect to a terminal by using an optimal beam until a change of a channel quality occurs. For another example, the base station may determine a serving TRP, which provides a service to the terminal, as the first TRP. The base station may provide a priority for the primary beam to the serving TRP. Accordingly, the base station may serve the terminal by using a serving beam (e.g., a serving beam in initial access) before configuring a multi-beam pair.

The base station may identify beams provided by the first TRP determined among beams included in feedback information. The base station may determine a beam with a highest channel quality as the primary beam among the beams provided by the first TRP. When conforming to an embodiment, the base station and the terminal may configure the primary beam pair consisting of the primary beam (e.g., a DL transmission beam) and a beam (e.g., a DL reception beam) of the terminal corresponding to the primary beam.

In operation 1603, the base station may determine a beam with a highest channel quality among beams of a second TRP as the secondary beam. According to an embodiment, the base station may determine the second TRP. For example, the base station may determine the second TRP different from the first TRP. The second TRP may be coupled with the same base station of the first TRP or different base stations. Herein, when the second TRP is coupled with a base station different from the base station of the first TRP, the two base stations may be coupled with each other to share resource information related to multi-beam pair reception and indication information of configuration-related parameters.

The base station may identify beams of the second TRP, determined among the beams included in the feedback information. The base station may identify a channel quality of each of the beams of the second TRP. The base station may compare a channel quality of each beam to determine a beam with a highest channel quality as the secondary beam.

Configuring of respective beams of different TRPs as the primary beam pair and the secondary beam pair may lead to an increase in a probability that a path between the primary beam pair and the secondary beam pair is independent. Even if reception performance of the primary beam pair deteriorates, the base station and the terminal may maintain a connectivity through the secondary beam pair.

One or more embodiments in which the base station determines the primary beam and the secondary beam are described with reference to FIGS. 14 to 16. However, operations of the base station for determining the primary beam and the secondary beam are not limited to the aforementioned embodiments. For example, unlike in FIG. 15, the base station may receive feedback information including N beams (where N is an integer) and may identify two beams satisfying a mutual path independency among the N beams. The base station may identify a beam with a highest channel quality between the two beams as the primary beam and a beam with a next highest channel quality as the secondary beam. That is, determination on the path independency may be prioritized over determination on the channel quality. In one or more embodiments, the base station may first determine the path independency to configure fast multi-beam pair reception according to a quality of a service being provided (e.g., whether the service is a streaming service or a file upload service). Accordingly, even if it is not a beam with highest RSRP among the beams included in the feedback information, the base station may determine the beam as the primary beam.

Figure 17:
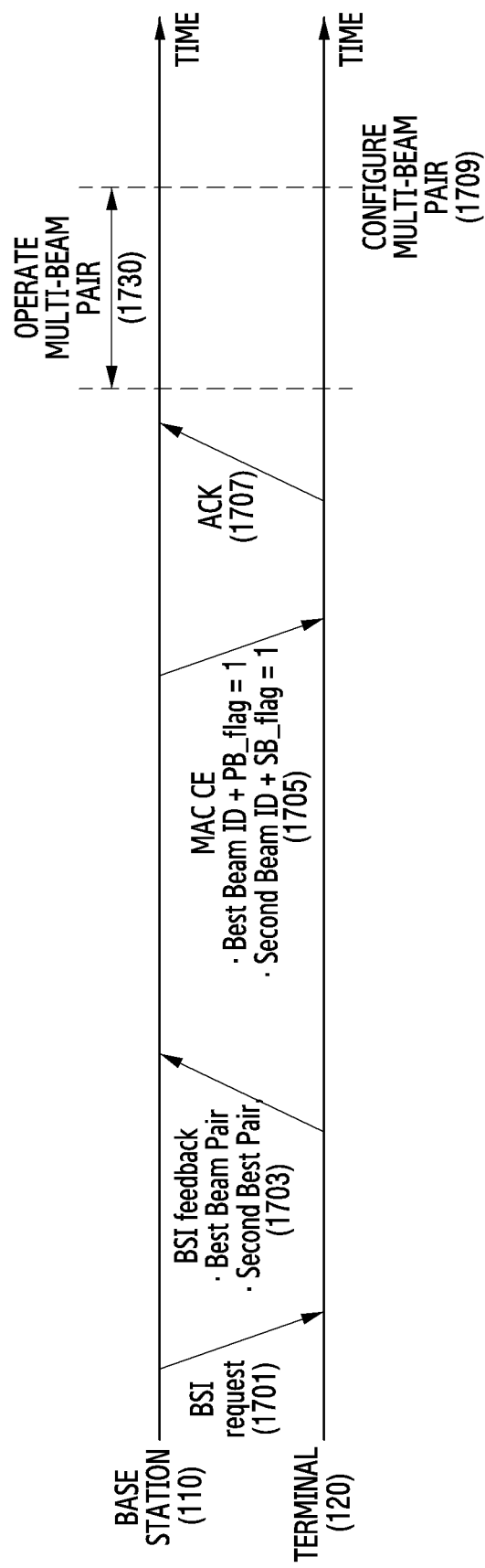
FIG. 17 illustrates an example of indicating a multi-beam pair according to an embodiment of the disclosure.

FIG. 17 illustrates an example of indicating a multi-beam pair according to an embodiment of the disclosure. A base station may be an example of the base station 110 of FIG. 1, and a terminal may be the terminal 120 of FIG. 1. In FIG. 17, an 'always mode' for always configuring multi-beam pair reception without an additional active duration after a beam search procedure is described as an example of an operation mode, and a Beam State Information (BSI) procedure is described as an example of the beam search procedure.

Referring to FIG. 17, in operation 1701, the base station may transmit a BSI request to the terminal. For example, the base station may transmit the BSI request to the terminal through DCI. For another example, the base station may transmit the BSI request through a Random Access Response (RAR) grant.

In operation 1703, the terminal may transmit BSI as feedback information from the base station. The terminal may measure a channel quality for each beam pair. The terminal may transmit BSI indicating a beam with a highest channel quality and a beam with a second highest channel quality among measured channel qualities to the base station. In one or more embodiments, the BSI may additionally include a channel quality for a beam to be transmitted, in addition to a beam index indicating the beam. According to an embodiment, the terminal may transmit BSI including two or more beams and a channel quality of each beam to the base station.

In operation 1705, the base station may transmit a MAC CE to the terminal as indication information indicating a primary beam and a secondary beam. The base station may determine the primary beam and the secondary beam on the basis of the BSI. The base station may determine the primary beam and the secondary beam as shown in the procedures described with reference to FIGS. 14 to 16. The base station may transmit to a MAC CE including a first beam Identifier (ID) (or a beam index) for the primary beam and a second beam ID for the secondary beam to the terminal. To operate reception of the multi-beam pair, the terminal may need to determine which beam is the primary beam and which beam is the secondary beam among beams included in the indication information. Therefore, the indication information may include a flag (e.g., PB_flag=1) which is set to indicate the primary beam, in addition to the first beam ID for the primary beam. In addition, the indication information may include a flag (e.g., SB_flag=1) which is set to indicate the secondary beam, in addition to the second beam ID for the secondary beam.

In operation 1707, the terminal may transmit ACK for the indication information to the base station. In operation S1709, after transmitting the ACK for the indication information, the base station and the terminal may be configured to operate the multi-beam pair after a pre-configured operation time 1703. Herein, the operation time 1730 may be set on a TTI basis. According to an embodiment, the base station may transmit a configuration message including a parameter indicating the operation time to the terminal.

Multi-Beam Pair Initiation

Figure 18:
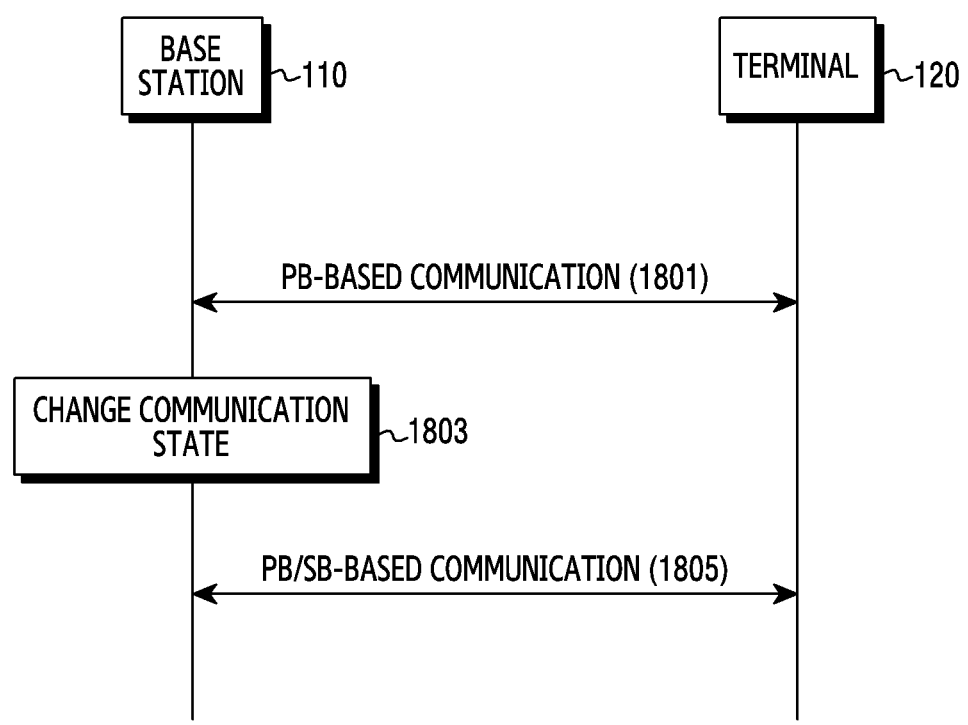
FIG. 18 illustrates a signal flow for initiating a multi-beam pair operation according to an embodiment of the disclosure.

FIG. 18 illustrates a signal flow for initiating a multi-beam pair operation according to an embodiment of the disclosure. A base station may be the base station 110 of FIG. 1. A terminal may be the terminal 120 of FIG. 1.

Referring to FIG. 18, in operation 1801, the base station and the terminal may perform PB-based communication. The PB-based communication may imply that the base station and the terminal transmit or receive a signal by using a primary beam (or a primary beam pair) indicated by the indication information described with reference to FIGS. 13 to 17. For example, the base station may transmit a DL signal to the terminal by using the primary beam of the indication information. The terminal may receive the DL signal from the base station by using a first reception beam corresponding to the primary beam. For another example, the base station may receive a UL signal from the terminal by using the primary beam. The terminal may transmit the UL signal to the base station by using the first reception beam.

In operation 1803, the base station may detect a change of a communication state. Herein, the communication state may imply a channel state of a wireless communication channel which uses the primary beam. The base station may determine that a communication state of the primary beam is a communication disabled state. The communication disabled state using a beam or beam pair may be referred to as detection of a beam error, a beam failure, or physical layer problems. The base station may determine a beam failure of the primary beam (hereinafter, a primary beam failure) on the basis of a channel quality of the primary beam.

The base station may determine a change of a channel quality. Herein, the channel quality may be a channel quality for a signal transmitted using the primary beam of operation 1801. Herein, the signal may be at least one of a DM-RS, a CSI-RS, and an SS block. The base station may transmit the signal to monitor the communication state of the primary beam. The channel quality may include a quality-related metric such as Hybrid Automatic Repeat reQuest (HARQ) information and feedback information (e.g., CSI, Measurement Report (MR)) including a measurement result of the terminal.

When a channel-related metric for the primary beam is changed by at least a threshold or when a specific event occurs by at least a threshold count or is continued for at least a threshold time (e.g., a timer value), the base station may determine that the communication state for the primary beam has changed. That is, when it is determined that required communication quality cannot be acquired by using the primary beam, the base station may determine that the communication state for the primary beam has changed to the communication disabled state.

In operation 1805, the base station and the terminal may perform PB/SB-based communication. The PB/SB-based communication implies that the base station and the terminal transmits or receives a signal by using a primary beam pair and secondary beam pair indicated by the indication information described with reference to FIGS. 13 to 17. The PB/SB-based communication may be referred to as multi-beam pair-based communication. The base station may activate the multi-beam pair to serve the terminal with a required channel quality. The base station may activate an operation of the secondary beam. The base station may transmit or receive a signal with respect to the terminal by using not only the primary beam but also the secondary beam.

Although not shown in FIG. 18, according to an embodiment, in case of dynamically activating the multi-beam pair, the base station may additionally transmit control information for instructing the terminal to activate the multi-beam pair. The terminal may attempt to receive a resource region of a signal for transmitting the secondary beam, in response to reception of the control information. The signal may be received through not only a reception beam corresponding to the primary beam but also a reception beam corresponding to the secondary beam.

Figure 19:
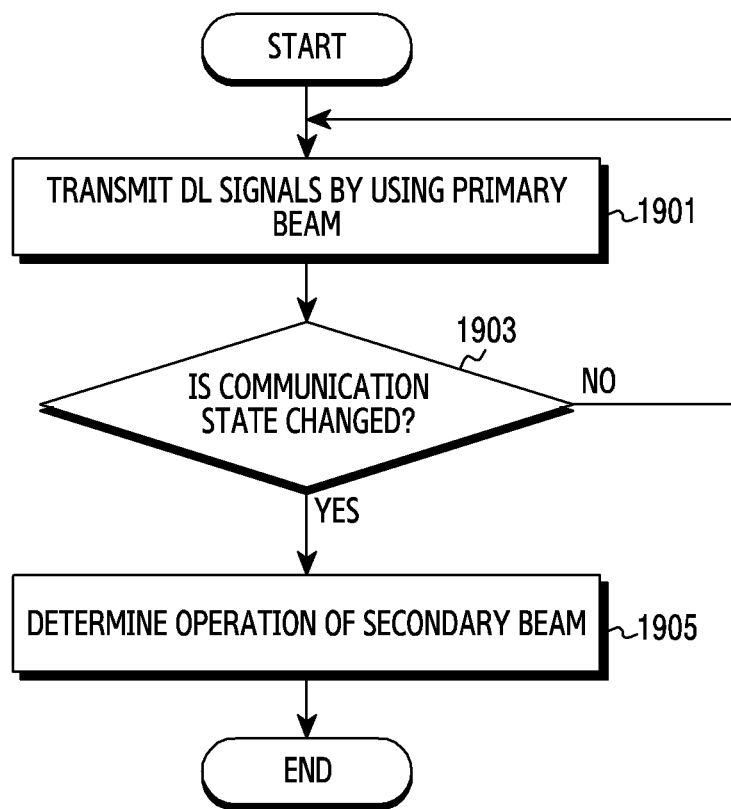
FIG. 19 is a flowchart illustrating a procedure for initiating a multi-beam pair operation by a base station according to an embodiment of the disclosure.

FIG. 19 is a flowchart illustrating a procedure for initiating a multi-beam pair operation by a base station according to an embodiment of the disclosure. A base station may be the base station 110 of FIG. 1. A terminal may be the terminal 120 of FIG. 1. Although operations of the base station are described on a DL basis in FIG. 19, hereinafter, operations of the base station may also be equally applied to a UL case.

Referring to FIG. 19, in operation 1901, the base station may transmit DL signals by using a primary beam. For example, as a control signal, the DL signal may be transmitted through a PDCCH.

In operation 1903, the base station may determine whether a communication state is changed. Whether the communication state for the primary beam is changed may be determined in response to each of DL signals transmitted using the primary beam. That is, the base station may determine whether a primary beam failure is detected. Herein, the primary beam failure may imply that a service which requires a channel state of a link between the base station and terminal using the primary beam cannot be provided.

In one or more embodiments, when a response (e.g., ACK) is not received at least N times in a resource in which a feedback is expected for data or a control signal, the base station may determine a link failure of the primary beam. For example, if a response (e.g., ACK, NACK) for control signals (e.g., PDCCH) transmitted using the primary beam is not received during a count N determined by the base station, the base station may determine that a wireless channel established by the primary beam is not reliable. That is, the base station may detect a link failure of the primary beam. The link failure for the primary beam may be referred to as a beam failure for the primary beam or a primary beam failure. According to an embodiment, N may vary depending on a type of a service provided by the terminal. When a long-term service which relatively less requires continuity is provided (e.g., a File Transfer Protocol (FTP), a Peer-to-Peer (P2P) file sharing), N may be set to be relatively great. Meanwhile, when a service which relatively requires continuity is provided (e.g., a streaming service), N may be set to be relatively small.

In one or more embodiments, when a reception ratio (e.g., 0.1 when 10 DL signals are transmitted and one piece of HARQ information is received) of HARQ information for a DL signal is less than a threshold, the base station may determine that a connection with the terminal is disconnected. According to an embodiment, the threshold may be determined based on a type of a service which is being provided to the terminal and a level of Quality of Service (QoS) required in the service.

Upon detecting a change of a communication state of the primary beam (e.g., a primary beam failure), the base station may perform step 1905. Upon not detecting the change of the communication state of the primary beam (e.g., the primary beam failure), the base station may perform operation 1901 again.

In operation 1905, the base station may determine an operation of the secondary beam. The base station may activate an operation of a multi-beam pair of the base station. The base station may transmit a DL signal to the terminal by using not only the primary beam but also the secondary beam. The base station may maintain a connectivity with the terminal by using a predetermined secondary beam even if a beam failure of the primary beam is detected. Without an additional recovery procedure, the base station may switch to the secondary beam or activate an operation of the multi-beam pair in response to detection of a beam failure of the primary beam.

In FIGS. 18 and 19, the base station detects that a communication state of the primary beam is disabled (a primary beam failure). According to an embodiment, not only the base station but also the terminal may detect the primary beam failure according to a measurement result on a beam. Hereinafter, procedures in which the terminal detects a beam failure on the primary beam and performs communication with the base station by using the secondary beam are described in FIG. 20 and FIG. 21.

Figure 20:
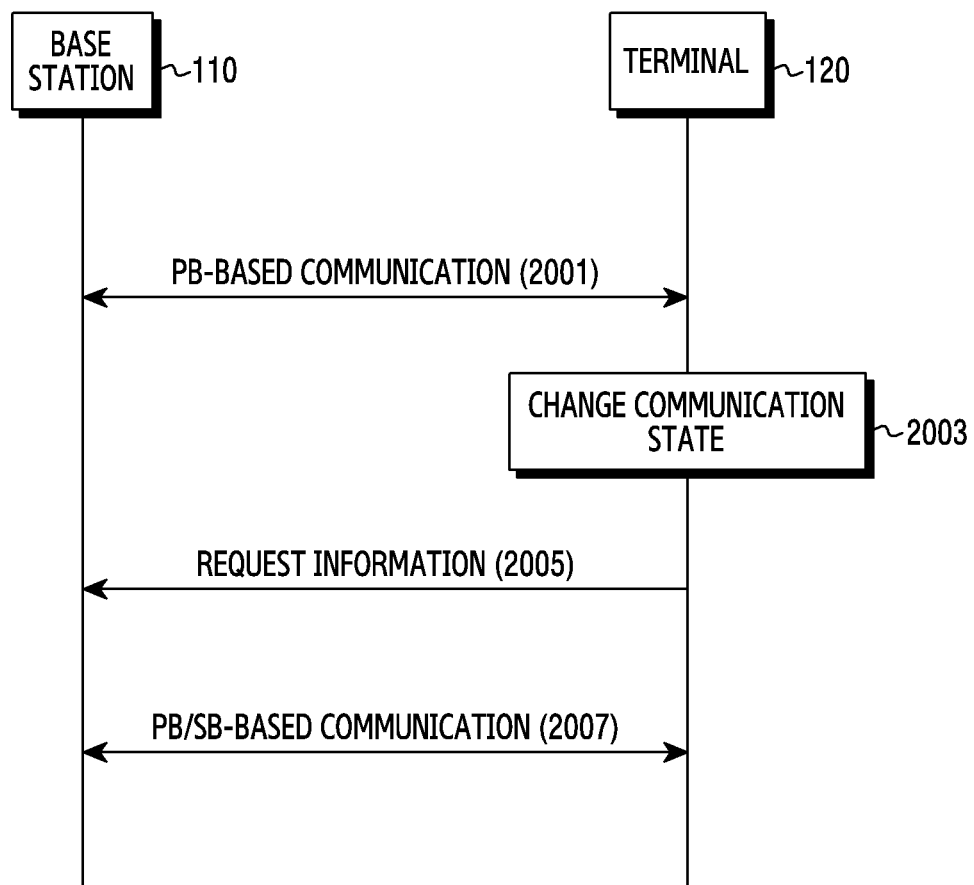
FIG. 20 illustrates another signal flow for initiating a multi-beam pair according to an embodiment of the disclosure.

FIG. 20 illustrates another signal flow for initiating a multi-beam pair according to an embodiment of the disclosure. A base station may be the base station 110 of FIG. 1. A terminal may be the terminal 120 of FIG. 1.

Referring to FIG. 20, in operation 2001, the base station and the terminal may perform PB-based communication. Since operation 2001 corresponds to operation 1801 of FIG. 18, detailed descriptions of operation 2001 will be omitted.

In operation 2003, the terminal may determine a change of a communication state. The terminal may determine a change of a communication state of a primary beam on the basis of a channel quality for the primary beam. Herein, the channel quality may be channel quality for a signal to be transmitted using the primary beam. For example, the terminal may determine the change of the channel quality for the primary beam on the basis of reception strength (e.g., RSRP) of synchronization signals (e.g., SS-block) and reference signals (e.g., CSI-RS, DM-RS) to be transmitted from the base station by using the primary beam. For another example, the terminal may determine the change of the channel quality for the primary beam on the basis of a reception quality (e.g., SINR) of data to be transmitted using the primary beam. Herein, the change of the communication state may imply that a beam failure for a serving beam is detected. In other words, the terminal may detect the beam failure for the primary beam. For example, if a state where a channel quality value for the control channel is lower than a threshold is maintained until a timer expires, the terminal may determine that a primary beam failure is detected.

In operation 2005, the terminal may transmit request information to the base station. The request information may be information for requesting for a secondary beam operation. The terminal may acquire information regarding a secondary beam with reference to FIGS. 13 to 17. The terminal may identify a beam of a terminal corresponding to the secondary beam (hereinafter, a second terminal beam). Since communication is not smoothly performed at present by using a primary beam pair in a primary beam path, the terminal may transmit the request information to the base station by using the second terminal beam. Herein, the second terminal beam may be used as a DL reception beam and a UL transmission beam.

The terminal may transmit request information to the base station through a resource allocated to the terminal. For example, the terminal may transmit the request information to the base station through a PUCCH. For another example, the terminal may transmit the request information to the base station through a Physical Random Access Channel (PRACH).

The base station may activate a multi-beam pair in response to reception of the request information. The base station may transmit a signal to the terminal by using not only the primary beam but also the secondary beam. For example, the base station may transmit a signal to the terminal by using the primary beam and the secondary beam after a specific duration elapses from a time resource (e.g., a subframe, a slot) for transmitting ACK for the request information. The terminal may perform operation 2007 after the request information is transmitted. For example, the terminal may perform operation 2007 after a specific duration elapses from a time resource (e.g., a subframe, a slot) for receiving ACK for the request information from the base station.

In operation 2007, the base station and the terminal may perform PB/SB-based communication. Since operation 2007 corresponds to operation 1805 of FIG. 18, detailed descriptions on operation 2007 will be omitted.

Figure 21:
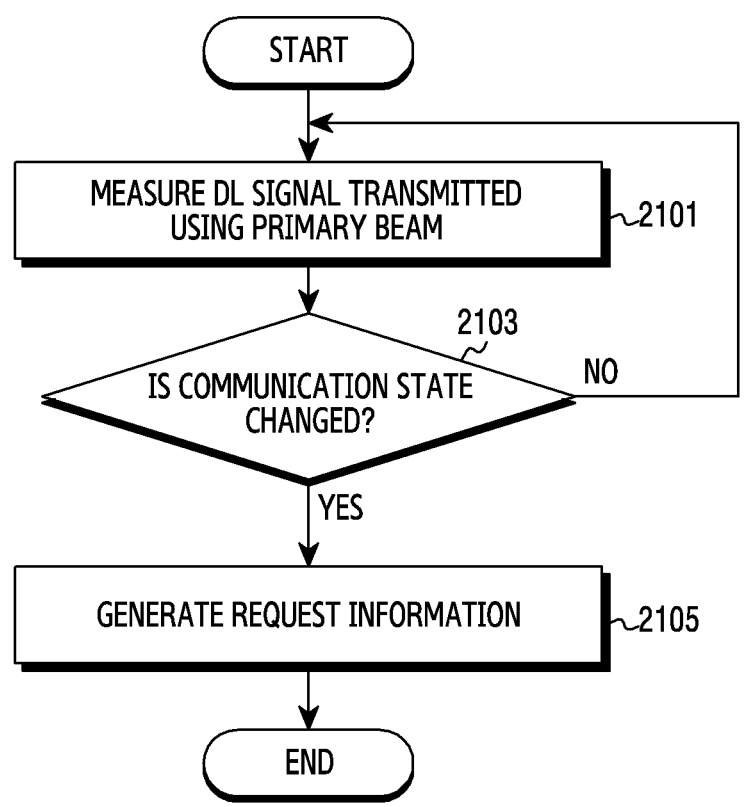
FIG. 21 is a flowchart of a terminal for initiating a multi-beam pair operation according to an embodiment of the disclosure.

FIG. 21 is a flowchart illustrating a procedure for initiating a multi-beam pair operation by a terminal according to an embodiment of the disclosure. A terminal may be the terminal 120 of FIG. 1. Although operations of the terminal are described on a DL basis in FIG. 21, hereinafter, operations of the terminal may also be equally applied to a UL case.

Referring to FIG. 21, in operation 2101, the terminal may measure a channel quality of a DL signal to be transmitted using a primary beam. For example, the DL signal may be data. The data may be transmitted through a PDSCH. The channel quality may be an SINR. For another example, the DL signal may be a control signal. The control signal may be transmitted through a synchronization channel or a broadcast channel. The channel quality may be RSRP.

In operation 2103, the terminal may determine whether the communication state is changed. The terminal may determine whether a primary beam failure is detected. The terminal may determine whether the primary beam failure is detected on the basis of a channel quality of the primary beam measured in operation 2101. The terminal may determine a link failure of the primary beam according to whether a channel quality is less than a threshold. For example, the terminal may determine whether an SINR of data to be received is less than a threshold. In addition, the terminal may determine whether a state where the channel quality is less than the threshold is continued for at least a threshold time. The threshold time may be set to a timer value determined by a high layer. For example, if a state where RSRP of a control signal to be received is less than or equal to a threshold is continued for 100 ms, the terminal may detect the primary beam failure.

If it is determined that the communication state is changed, the terminal may perform operation 2105. If it is determined that the communication state is not changed, the terminal may perform operation 2101 again. That is, the terminal may repeat operations 2101 to 2103.

In operation 2105, the terminal may generate request information. Upon detecting the primary beam failure, the terminal may generate the request information for requesting the base station to activate the multi-beam pair. The request information may include information for activating the multi-beam pair, that is, for triggering signal transmission to the base station by using the secondary beam. For example, the request information may include a trigger bit of 1 bit.

Signal Processing Associated with Multi-Beam Pair

Figure 22:
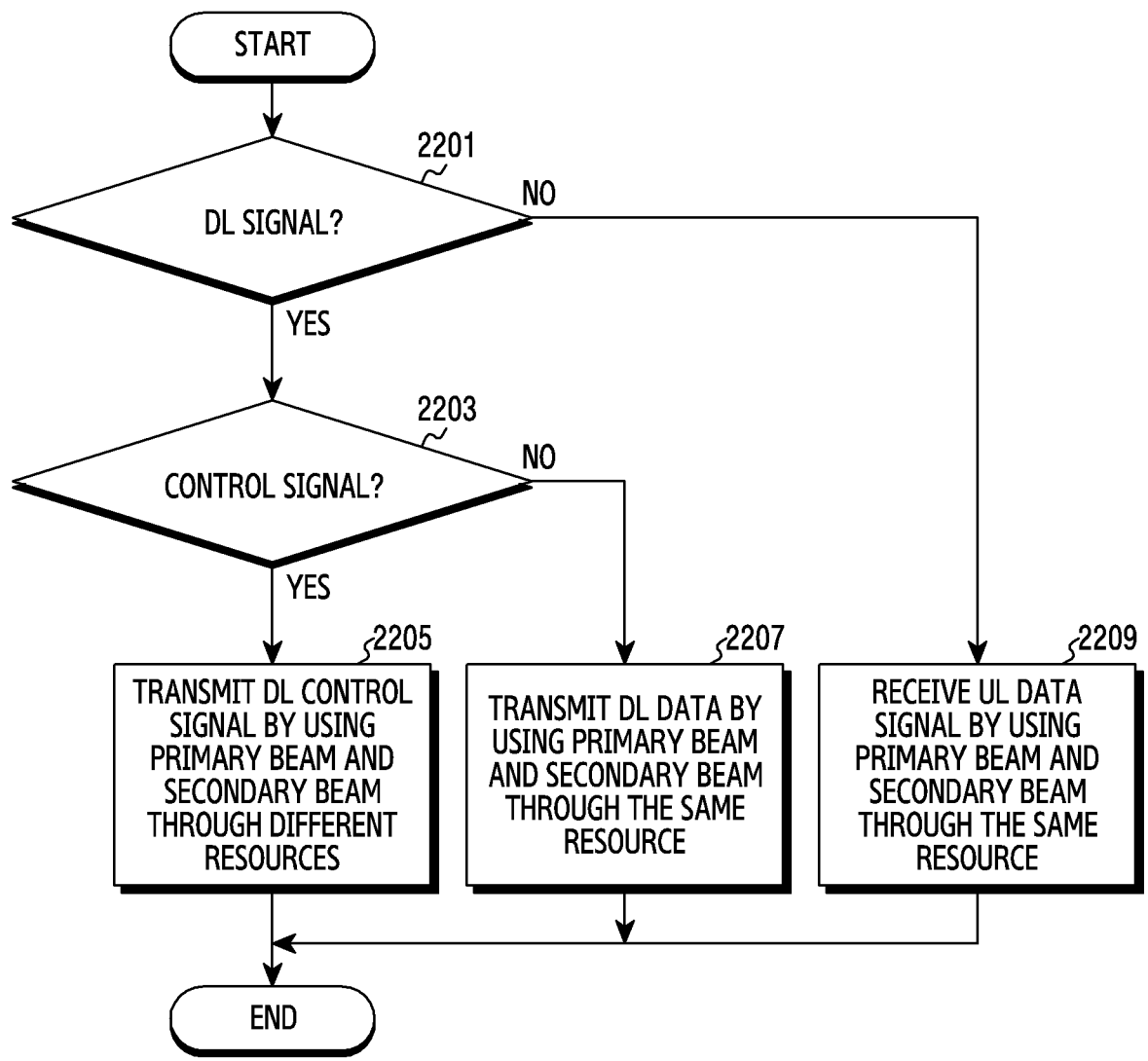
FIG. 22 is a flowchart illustrating a procedure for signal processing when operating a multi-beam pair by a base station according to an embodiment of the disclosure.

FIG. 22 is a flowchart illustrating a procedure for signal processing by the base station when operating a multi-beam pair according to an embodiment of the disclosure. The base station may be the base station 110 of FIG. 1. The base station may operate the multi-beam pair adaptively according to a type of a signal to be processed.

Referring to FIG. 22, in operation 2201, the base station may determine whether the signal to be processed is a DL signal or a UL signal. If the signal to be processed is the DL signal, the base station may perform operation 2203. If the signal to be processed is the UL signal, the base station may perform operation 2209.

In operation 2203, the base station may determine whether the DL signal to be processed is a control signal. If the DL signal to be processed is the control signal, the base station may perform operation 2205. If the signal to be processed is not the control signal, that is, if it is a data signal (e.g., a payload on a PDSCH), the base station may perform operation 2207.

In operation 2205, the base station may transmit a DL control signal by using a primary beam and a secondary beam through different resources (e.g., a time resource, a time-frequency resource). A DL control signal to be transmitted using the primary beam may be referred to as a first control signal, and a DL control signal to be transmitted using the secondary beam may be referred to as a second control signal. The first control signal and the second control signal may include the same control information.

The base station may maintain a robust channel state with respect to the terminal by transmitting the control signal using a plurality of beams. Even if there is a deterioration in channel quality of a wireless path constructed through the primary beam, the terminal may receive the control signal from the base station through a wireless path constructed through the secondary beam. Since reception of the control signal is guaranteed, a connectivity between the base station and the terminal may be maintained.

When a signal is received using a plurality of beams in the same time resource, an additional hardware configuration (e.g., RF chain) is required. Therefore, complexity may more increase than a case of PB-based communication when the terminal performs PB/SB-based communication. The base station may allocate a different resource to a signal transmitted using each beam, thereby being able to increase robustness of a channel between the base station and the terminal while decreasing complexity of the terminal. For example, the terminal may attempt to receive each of a first control signal and a second control signal by varying a symbol, thereby being able to decrease a change of a hardware configuration and to increase a reception success rate for a DL control signal.

According to an embodiment, the terminal may be configured to monitor both of the first control signal and the second control signal in some durations and to monitor only the first control signal or the second control signal in some other durations. The base station and the terminal may be configured to perform monitoring periodically. For example, a monitoring period of the second control signal may be shorter than a monitoring period of the first control signal. The terminal may perform monitoring more frequently on the secondary beam in comparison with the primary beam, thereby being able to increase a usage rate of the secondary beam. For another example, the monitoring period of the first control signal may be shorter than the monitoring period of the second control signal. Since the terminal performs monitoring more frequently on the first control signal in comparison with the second control signal, the terminal may rapidly determine whether to release a connection for the primary beam.

In operation 2207, the base station may transmit a DL data signal by using the primary beam and the secondary beam through the same resource. DL data transmitted using the primary beam may be referred to as a first data signal, and DL data transmitted using the secondary beam may be referred to as a second data signal. The first data signal and the second data signal may correspond to the same Transport Block (TB). After receiving a control signal, the terminal can selectively operate the primary beam and the secondary beam. However, the base station cannot acquire a specific beam pair of which a reception beam is used to receive a DL signal. Therefore, the base station may transmit the first data signal and the second data signal by using the same resource for resource efficiency.

In operation 2209, the base station may receive a UL signal from the terminal by using the primary beam and the secondary beam through the same resource. Herein, the UL signal may be a reference signal, a control signal, or a data signal. A UL signal transmitted through a communication path of the primary beam may be referred to as a first UL signal, and a UL signal transmitted through a communication path of the secondary beam may be referred to as a second UL signal. The base station cannot know a specific communication path of which a corresponding beam is used to transmit a signal (e.g., a first reception beam corresponding to the primary beam or a second reception beam corresponding to the secondary beam). The base station may receive a UL signal from the terminal by using both of the primary beam and the secondary beam. According to an embodiment, the terminal may transmit the UL signal through one path (e.g., a beam pair). The base station cannot acquire a specific beam pair of which beam is used to transmit the UL signal. Therefore, the base station may attempt to receive the UL signal transmitted from the terminal by using both of the primary beam and the secondary beam in the same resource.

Although a method of allocating different resources to the primary beam and the secondary beam is described for example in FIG. 22, another resource allocation method may also be applied. The base station may allocate a resource to the terminal differently from the method of FIG. 22 according to efficiency of resource allocation, a policy related to the terminal, reception capability of the terminal, or the like. In one or more embodiments, the same time resource may be allocated according to the reception capability of the terminal. For example, when the terminal is capable of supporting two or more beams in the same time resource (e.g., symbol, slot), the base station may transmit a DL control signal by using the primary beam and the secondary beam trough the same resource. The base station may receive, from the terminal, a UE capability information message including multi-beam reception information related to reception capability of the terminal. The multi-beam reception information indicates whether the terminal can transmit/receive a signal by using a plurality of beams in the same time resource. When the terminal is capable of supporting two or more beams in the same time resource, the base station may allocate the same time resource to the first control signal and the second control signal.

Figure 23:
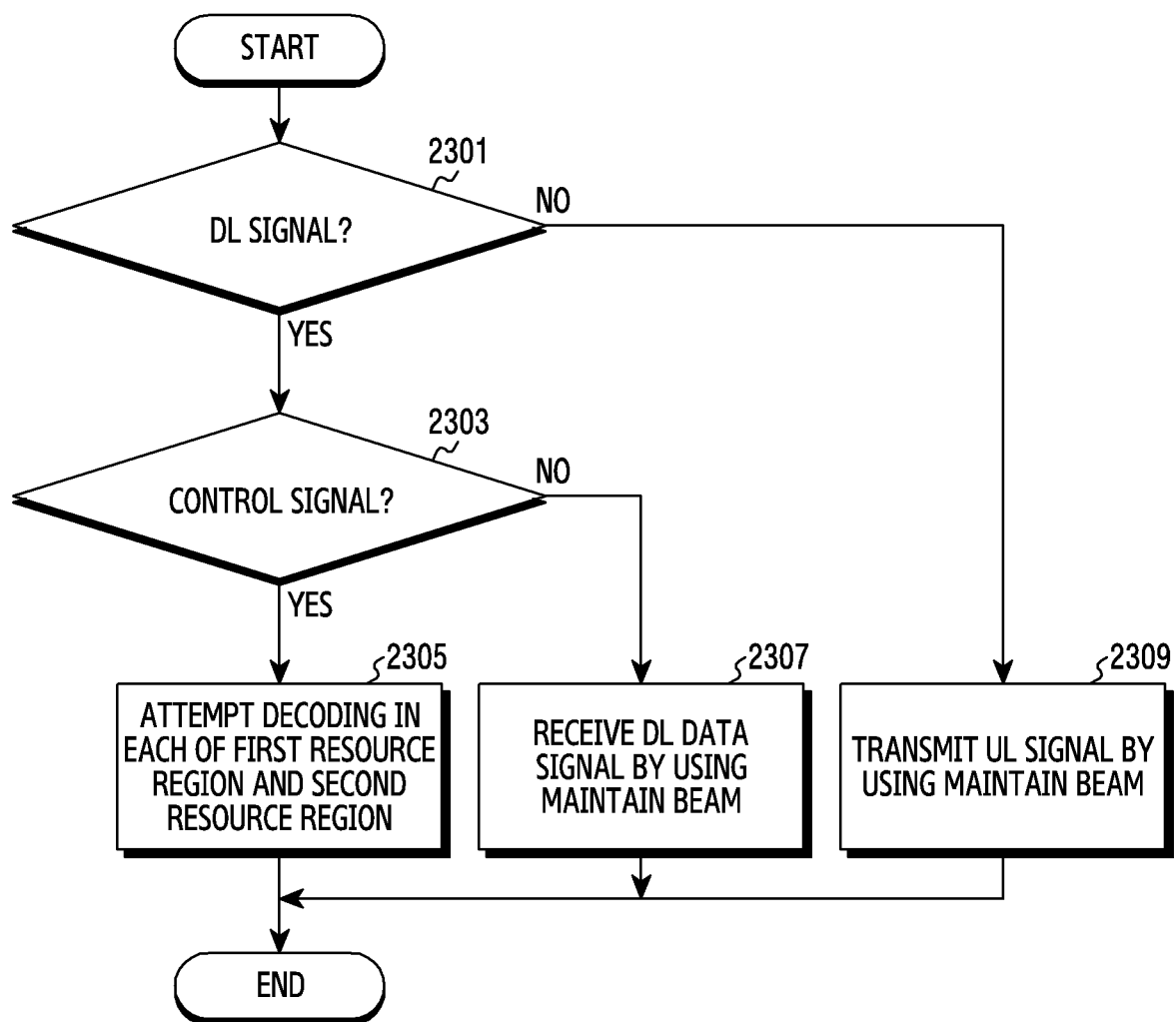
FIG. 23 is a flowchart illustrating a procedure for signal processing when operating a multi-beam pair by a terminal according to an embodiment of the disclosure.

FIG. 23 is a flowchart illustrating a procedure for signal processing when operating a multi-beam pair by a terminal according to an embodiment of the disclosure. The terminal may be the terminal 120 of FIG. 1. The terminal may operate a multi-beam pair adaptively according to a type of a signal to be processed.

Referring to FIG. 23, in operation 2301, the terminal may determine whether the signal to be processed is a DL signal or a UL signal. The terminal may determine a type of a processing method according to a type of a channel (e.g., a physical channel) and a resource to be allocated from the base station. When the signal to be processed is the DL signal, the terminal may perform operation 2303. When the signal to be processed is the UL signal, the terminal may perform operation 2311.

In operation 2303, the terminal may determine whether the DL signal to be processed is a control signal. When the DL signal to be processed is the control signal, the terminal may perform operations 2305 and 2307. When the signal to be processed is not the control signal, that is, when the signal is a data signal (e.g., a payload on a PDSCH), the terminal may perform operation 2309.

In operation 2305, the terminal may attempt decoding in each of a first resource region and a second resource region. The terminal may receive a DL control signal from each of the first resource region and the second resource region. The first resource region and the second resource region may be configured according to configuration information of the base station or may be pre-configured. The terminal may receive a first control signal by using a first terminal beam and a second control signal by using a second terminal beam. The first terminal beam may be a reception beam of a terminal corresponding to the primary beam. The first terminal beam is a terminal beam which establishes a primary beam and primary beam pair (PB) of the base station. The second terminal beam may be a reception beam of a terminal corresponding to the secondary beam. The second terminal beam is a terminal beam which establishes a secondary beam and secondary beam pair (SB) of the base station. The terminal may receive the first control signal by using the first terminal beam in the first resource region, and may receive the second control signal by using the second terminal beam in the second resource region.

The terminal may attempt decoding in a resource region corresponding to each of signals to be received. The terminal may attempt decoding in the first resource region. The terminal may attempt decoding in the second resource region. The terminal may not stop decoding in the second resource region even if decoding is successful in the first resource region. In other words, the terminal may attempt decoding in the second resource region even if control information is detected in the first resource region. The terminal may not discard detected control information. Since the terminal performs decoding of a control signal for each of a plurality of paths, a probability of successfully receiving a control signal can be increased even if a wireless channel changes rapidly. The operation of the terminal in operation 2305 corresponds to the operation of the base station in operation 2205 of FIG. 22.

In operation 2307, the terminal may receive a DL data signal by using a maintain beam. Herein, the maintain beam is a beam for maintaining a connection state between the base station and the terminal. Since it is difficult for the base station to accurately acquire a time of starting a multi-beam pair, the terminal may determine the maintain beam between a first reception beam corresponding to the primary beam and a second reception beam corresponding to the secondary beam in order to maintain a connection state with optimal channel quality. The terminal may determine the maintain beam among beams of the terminal. The beams of the terminal may include a first reception beam and a second reception beam. Herein, the first reception beam of the terminal may establish a primary beam and primary beam pair (PB) of the base station. The second reception beam of the terminal may establish a secondary beam and secondary beam pair (SB) of the base station. The terminal may determine one of the first reception beam of the terminal corresponding to the primary beam of the base station and the second reception beam of the terminal corresponding to the secondary beam as the maintain beam. The terminal may identify a beam with a higher channel quality (e.g., SINR) between the first reception beam and the second reception beam as the maintain beam.

According to an embodiment, upon receiving the first control signal and second control signal in operation 2305, the terminal may measure a channel quality of each of the first control signal and the second control signal. The terminal may identify one of the primary beam and the secondary beam according to a measurement result of channel quality. For example, the terminal may compare RSRP of the first control signal transmitted using the primary beam and RSRP of the second control signal transmitted using the secondary beam to identify a beam (a resource region) with greater RSRP. The terminal may determine a beam of a terminal corresponding to the identified beam of the base station as the maintain beam. The identified beam of the base station forms the determined maintain beam and beam pair.

The terminal may receive DL data by using a beam more robust to a channel change, that is, the maintain beam. The base station may transmit DL data by using both of the primary beam and the secondary beam. Therefore, the terminal may receive DL data through a more reliable beam pair. The operation of the terminal of operation 2307 corresponds to the operation of the base station of operations 2207 of FIG. 22.

In operation 2309, the terminal may transmit a UL signal by using the maintain beam. The maintain beam may be identified identically or similarly to operation 2307. By transmitting a UL signal by using a beam more robust to a channel change, that is, a maintain beam, the terminal may provide the base station with a UL signal in a more robust channel environment. The base station may receive the UL signal by using both the primary beam and the secondary beam. The operation of the terminal of operation 2309 corresponds to the operation of the base station of operation 2209 of FIG. 22.

Although an example in which the terminal determines the maintain beam through the control signal, and receives DL data or transmits a UL signal through the maintain beam is described with reference to FIG. 23, this is not for the purpose of limitation. For example, the terminal may transmit/receive a signal in a second transmission instance, by using a maintain beam identified in a first transmission instance (e.g., TTI). In other words, the terminal may transmit/receive a signal by using a maintain beam identified in a previous TTI during a designated duration, instead of repeatedly decoding a control signal for the primary beam and a control signal for the secondary beam for every TTI.

A communication flow of the base station and the terminal on the basis of a multi-beam pair is described with reference to FIGS. 22 and 23. The base station and the terminal may perform communication by using a primary beam pair. When a communication state change event such as a beam failure occurs, communication may be performed by using a secondary beam pair. Although it is described in FIG. 22 and FIG. 23 that communication is performed by utilizing both of the primary beam and the secondary beam when a communication state is changed, this is not for the purpose of limitation. For example, the base station and the terminal may perform communication by using only the secondary beam pair when a channel quality of the primary beam pair is persistently low. In addition, a beam pair change may be performed. In addition, when it is not guaranteed that both of the primary beam pair and the secondary beam pair have a channel quality greater than or equal to a threshold, the terminal may initiate a beam recovery procedure for discovering a new optimal beam or may declare RLF and perform RRE.

Figure 24:
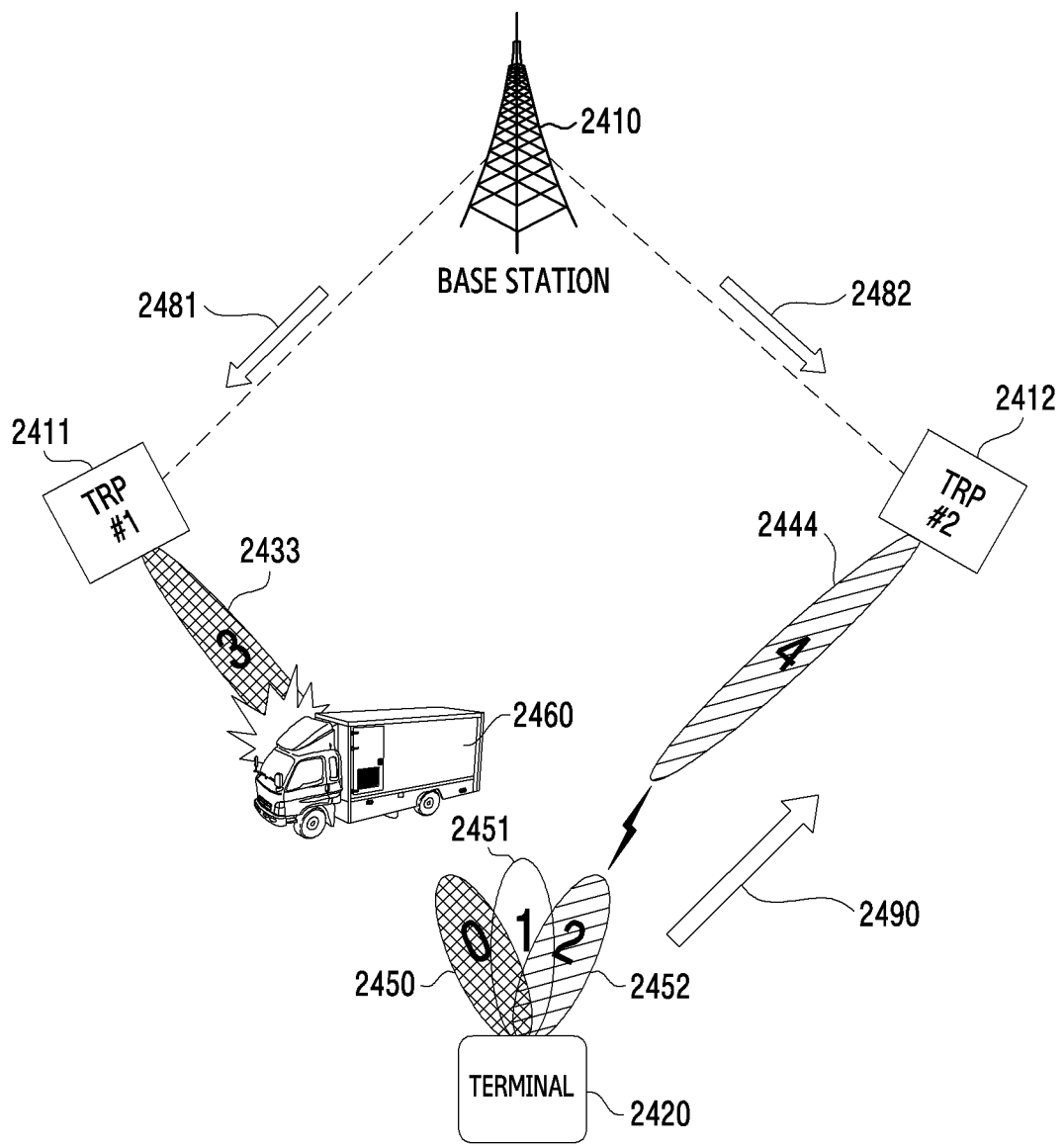
FIG. 24 illustrates an example of operating a multi-beam pair according to an embodiment of the disclosure.

FIG. 24 illustrates an example of operating a multi-beam pair according to an embodiment of the disclosure. An example described with reference to FIG. 24 is only an embodiment of the disclosure, and a scope of the disclosure is not limited thereto. A base station 2410 may be the base station 110 of FIG. 1. A terminal 2420 may be the terminal 120 of FIG. 2. Hereinafter, it is assumed a situation in which a configuration for operating a multi-beam pair is complete in the base station 2410 and the terminal 2420. The base station 2410 may configure a first resource region of a first control signal transmitted using a primary beam pair and a second resource region of a second control signal transmitted using a secondary beam pair, for the terminal 2420. For example, the first resource region may be a first symbol 2471 of a PDCCH. The second resource region may be a second symbol 2472 of the PDCCH.

Referring to FIG. 24, the base station 2410 may be coupled with a first TRP 2411 and a second TRP 2412. The primary beam of the base station may be a beam3 2433 of the first TRP 2411. The secondary beam of the base station may be a beam4 2444 of the second TRP 2412. That is, the primary beam pair may include the beam3 2433 of the first TRP 2411 and a beam0 2450 of the terminal 2420. The secondary beam pair may include the beam4 2444 of the second TRP 2412 and a beam2 2452 of the terminal 2420.

The base station 2410 and the terminal 2420 may perform communication through the primary beam pair. For example, the base station 2410 may transmit DL data to the first TRP 2411. The first TRP 2411 may transmit the DL data to the terminal 2420.

A moving object 2460 may enter a channel between the base station 2410 and the terminal 2420. The moving object 2460 may be located on a wireless communication path established by the primary beam pair. The base station 2410 and the terminal 2420 may detect that a channel quality for the primary beam pair is decreased to be lower than or equal to a threshold. With a decrease in the channel quality for the primary beam pair, activation of the multi-beam pair may be initiated.

The base station 2410 may use the primary beam (e.g., the beam3 2433 of the first TRP 2411) and the secondary beam (e.g., the beam4 2444 of the second TRP 2412) to transmit a DL signal or to receive a UL signal. For example, the base station 2410 may transmit a first DL signal 2481 to the first TRP 2411 and a second DL signal 2482 to the second TRP 2412.

The first TRP 2411 may use the primary beam to transmit the first DL signal 2481 to the terminal 2420. The second TRP 2412 may use the secondary beam to transmit the second DL signal 2482 to the terminal 2420. The first DL signal and the second DL signal may include the same DL control information or the same transport block.

A control signal of the first DL signal 2481 may be included in the first symbol 2471 of a PDCCH. A control signal of the second DL signal 2482 may be included in the second symbol 2472 of the PDCCH. The terminal 2420 may perform decoding of the control signal for both of the primary beam and the secondary beam in the PDCCH. Even if decoding of the control signal of the primary beam fails, the terminal 2420 may successfully decode the control signal for the secondary beam. The terminal 2420 may receive the control signal in a robust channel environment according to a configuration of the multi-beam pair.

The terminal 2420 may determine a maintain beam according to a channel quality of a control signal received by using each beam. For example, the terminal 2420 may receive the control signal for the primary beam by using the beam0 2450 of the terminal. The control signal for the secondary beam may be received by using the beam2 2452 of the terminal. If it is determined that a channel quality for the secondary beam pair is higher than a channel quality for the primary beam pair, the terminal 2420 may determine the beam2 2452 of the terminal as the maintain beam.

The terminal 2420 may receive DL data by using the maintain beam. For example, the terminal 2420 may receive DL data of the second DL signal 2482 by using the beam2 2452 which is the maintain beam. The terminal 2420 may transmit a UL signal by using the maintain beam. For example, the terminal 2420 may transmit a UL signal 2490 by using the beam2 2452.

Control information (PDCCH) of the base station 2410 is transmitted to the terminal by using a pre-configured symbol. The base station 2410 transmits the control information by using a symbol (e.g., the first symbol 2471) for the primary beam via the first TRP 2411. The base station 2410 transmits the control information by using a symbol (e.g., the second symbol 2472) for the secondary beam via the second TRP 2412. If a mode of a multi-beam pair of the terminal 2420 is set to an 'always mode', the terminal may attempt reception by using a $1^{st}/2^{nd}$ symbol in all subframes. Since the primary beam pair is in a communication disabled state, the terminal 2420 may receive only a PDCCH from the secondary beam pair. The terminal 2420 may successfully decode only the PDCCH from the secondary beam pair.

The base station 2410 cannot acquire information regarding which beam pair can be utilized at this time point. That is, the base station 2410 cannot determine a specific beam pair in which the maintain beam determined by the terminal 2420 is included between the primary beam pair and the secondary beam pair. Therefore, the base station 2410 may transmit a DL signal to the terminal 2420 by using both of the primary beam and the secondary beam.

The terminal 2420 may determine a beam with a higher channel quality between the primary beam and the secondary beam, for example, a beam received with higher strength, as a currently available beam, that is, a maintain beam. Therefore, the terminal 2420 may receive DL data by using the secondary beam pair in which the PDCCH is received.

Upon receiving the DL data, the terminal 2420 may transmit feedback information (e.g., HARQ information) corresponding to the DL data by using a beam of the terminal of the secondary beam pair in which the PDCCH is received. The base station 2410 cannot acquire information regarding a specific beam pair through which a UL signal is delivered, and thus may receive the UL signal by using both of the primary beam and the secondary beam. On the basis of a beam in which the UL signal is received, the base station may determine a beam pair including the maintain beam, that is, a maintain beam pair (or a preferred beam pair, a reliable beam pair). The base station may transmit a signal by using the secondary beam from a transmission instance. According to one or more embodiments, upon determining that the secondary beam pair is the available beam, the base station may not use the primary beam pair after the transmission instance. That is, the base station may receive a UL signal or transmit a DL signal by using only the secondary beam. According to some other embodiments, the base station or the terminal may transmit/receive a signal by using both of the primary beam and the secondary beam in terms of robustness of a channel.

According to operations of the aforementioned base station or the terminal, even if the primary beam pair is in a communication disabled state, communication between the base station and the terminal may not be lost but be maintained in a robust manner by instantly utilizing the secondary beam pair. Since the secondary beam pair is pre-configured, the terminal may perform communication without a disconnection duration. That is, the base station and terminal according to an embodiment of the disclosure may transmit/receive a signal by using a pre-configured secondary beam, without an additional beam identification procedure, in response to detecting that the primary beam pair is in the communication disabled state. According to an embodiment of the disclosure, a communication disabled situation caused by a rapid channel deterioration of a serving beam in a beamforming system can be effectively prevented.

Methods based on the embodiments described in the specification or claims specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned embodiments of the disclosure, a component included in the disclosure is expressed in a singular or plural form according to the specific example embodiment proposed herein. However, the singular or plural expression is selected properly for a situation proposed for the convenience of explanation, and thus an embodiment of the disclosure are not limited to a single or a plurality of components. Therefore, a component expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

What is claimed is:

1. A base station in a wireless communication system, the base station comprising:
   at least one transceiver; and
   at least one processor operatively coupled with the at least one transceiver, and configured to control the at least one transceiver to:
      transmit, to a terminal, configuration information including:
         first resource information for a first control region associated with a primary beam of a first transmission and reception point (TRP), and
         second resource information for a second control region associated with a secondary beam of a second TRP that is different from the first TRP;
      transmit, to the terminal, a first control signal using the primary beam on the first control region; and
      transmit, to the terminal, a second control signal using the secondary beam on the second control region.

2. The base station of claim 1,
   wherein the configuration information further includes duration information for indicating a time period in which a first signal is transmitted using the primary beam and a second signal is transmitted using the secondary beam, and
   wherein the duration information includes mode information indicating one of:
      a first mode configured to instruct the terminal to always attempt to receive the first signal and the second signal,
      a second mode configured to instruct the terminal to periodically attempt to receive the first signal and the second signal, and
      a third mode configured to instruct the terminal to attempt to receive the first signal and the second signal in a specific time period.

3. The base station of claim 1, wherein the at least one processor is further configured to control the at least one transceiver to:
   transmit a first data signal to the terminal using the primary beam; and
   transmit a second data signal to the terminal using the secondary beam,
   wherein the first data signal and the second data signal include same data and are transmitted in a same time-frequency resource, and
   wherein the first data signal or the second data signal is received by the terminal using a beam of the terminal corresponding to one of the primary beam and the secondary beam.

4. The base station of claim 1,
   wherein the at least one processor is further configured to control the at least one transceiver to receive, from the terminal, capability information including information for indicating that the terminal is capable of supporting a multi-TRP operation using the primary beam and the secondary beam, and
   wherein the configuration information is generated based on the capability information.

5. The base station of claim 1, wherein in order to determine the primary beam and the secondary beam, the at least one processor is configured to:
   identify a first beam with a highest channel quality among a first plurality of beams of the first TRP and a second beam with a highest channel quality among a second plurality of beams of the second TRP based on feedback information received from the terminal; and
   determine the first beam as the primary beam, and the second beam as the secondary beam, wherein the feedback information includes first information indicating at least one of the first plurality of beams of the first TRP and second information indicating at least one of the second plurality of beams of the second TRP.

6. The base station of the claim 1,
wherein the first control region comprises a first control resource set (CORESET),
wherein the second control region comprises a second CORESET for the second TRP,
wherein the first control signal is transmitted on a first physical downlink control channel, PDCCH, of the first CORESET, and
wherein the second control signal is transmitted on a second PDCCH of the second CORESET.

7. The base station of claim 1, wherein the at least one processor is further configured to:
perform a communication with the terminal by using the primary beam; and
perform a communication with the terminal by using the primary beam and the secondary beam based on a change of the communication state for the primary beam.

8. A terminal in a wireless communication system, the terminal comprising:
at least one transceiver; and
at least one processor operatively coupled with the at least one transceiver, and configured to control the at least one transceiver to:
receive, from a base station, configuration information including:
first resource information for a first control region associated with a primary beam of a first transmission and reception point (TRP), and
second resource information for a second control region associated with secondary beam of the base station of a second TRP different from the first TRP;
receive a first control signal using the primary beam on the first control region; and
receive a second control signal using the secondary beam on the second control region.

9. The terminal of claim 8,
wherein the configuration information further includes duration information indicating a time period in which the terminal attempts to receive a first signal transmitted using the primary beam and a second signal transmitted using the secondary beam, and
wherein the duration information includes mode information indicating one of:
a first mode configured to instruct the terminal to always attempt to receive the first signal and the second signal,
a second mode configured to instruct the terminal to periodically attempt to receive the first signal and the second signal, and
a third mode configured to instruct the terminal to attempt to receive the first signal and the second signal in a specific time period.

10. The terminal of claim 8, wherein the at least one processor is further configured to:
identify a beam of the terminal between a first beam of the terminal corresponding to the primary beam and a second beam of the terminal corresponding to the secondary beam based on a first channel quality of the first control signal received through the first beam of the terminal and a second channel quality of the second control signal received through the second beam of the terminal;
control the at least one transceiver to transmit an uplink signal to the base station or receiving a downlink signal from the base station based on the identified beam.

11. The terminal of claim 8,
wherein the at least one processor is further configured to control the at least one transceiver to transmit request information to the base station based on a determination that a channel quality of each of downlink signals transmitted from the base station using the primary beam is less than or equal to a threshold, and
wherein the request information is used to transmit a downlink signal to the terminal or receive an uplink signal by using the secondary.

12. The terminal of claim 8, wherein the at least one processor is further configured to control the at least one transceiver to:
transmit capability information to the base station, the capability information including information for indicating that the terminal is capable of supporting a multi-TRP operation using the primary beam and the secondary beam, and
wherein the configuration information is generated based on the capability information.

13. The terminal of the claim 8,
wherein the first control region comprises a first control resource set (CORESET),
wherein the second control region comprises a second CORESET for the second TRP,
wherein the first control signal is transmitted on a first physical downlink control channel, PDCCH, of the first CORESET, and
wherein the second control signal is transmitted on a second PDCCH of the second CORESET.

14. The terminal of the claim 8, wherein the at least one processor is further configured to:
identify the primary beam among a first plurality of beams of the first TRP;
identify the secondary beam among a second plurality of beams of the first TRP; and
transmit, to the base station, feedback information for indicating the primary beam and the secondary beam.

15. A method performed by a base station in a wireless communication system, the method comprising:
transmitting, to a terminal, configuration information including:
first resource information for a first control region associated with a primary beam of a first transmission and reception point (TRP); and
second resource information for a second control region associated with a secondary beam of a second TRP that is different from the first TRP;
transmitting, to the terminal, a first control signal using the primary beam on the first control region; and
transmitting, to the terminal, a second control signal using the secondary beam on the second control region.

16. The method of claim 15,
wherein the configuration information includes duration information for indicating a time period in which a first signal is transmitted using the primary beam and a second signal is transmitted using the secondary beam, and wherein the duration information includes mode information indicating one of:
- a first mode configured to instruct the terminal to always attempt to receive the first signal and the second signal,
- a second mode configured to instruct the terminal to periodically attempt to receive the first signal and the second signal, and
- a third mode configured to instruct the terminal to attempt to receive the first signal and the second signal in a specific time period.

17. The method of claim 15, further comprising:

transmitting a first data signal to the terminal using the primary beam; and transmitting a second data signal to the terminal using the secondary beam, wherein the first data signal and the second data signal include same data and are transmitted in a same time-frequency resource, and wherein the first data signal or the second data signal is received by the terminal using a beam of the terminal corresponding to one of the primary beam and the secondary beam.

18. The method of claim 15, further comprising receiving, from the terminal, capability information including information for indicating that the terminal is capable of supporting a multi-TRP operation using the primary beam and the secondary beam, wherein the configuration information is generated based on the capability information.

19. The method of claim 15, wherein the first control region comprises a first control resource set (CORESET), wherein the second control region comprises a second CORESET for the second TRP, wherein the first control signal is transmitted on a first physical downlink control channel, PDCCH, of the first CORESET, and wherein the second control signal is transmitted on a second PDCCH of the second CORESET.

20. The method of claim 15, wherein the at least one processor is further configured to:
- perform a communication with the terminal by using the primary beam; and
- perform a communication with the terminal by using the primary beam and the secondary beam based on a change of the communication state for the primary beam.

* * * * *